US010567866B1

(12) United States Patent
Liang et al.

(10) Patent No.: US 10,567,866 B1
(45) Date of Patent: Feb. 18, 2020

(54) SOUND PRODUCING DEVICE AND VALVE

(71) Applicant: xMEMS Labs, Inc., Los Altos, CA (US)

(72) Inventors: Jemm Yue Liang, Sunnyvale, CA (US); David Hong, Los Altos, CA (US)

(73) Assignee: xMEMS Labs, Inc., Los Altos, CA (US)

(*) Notice: Subject to any disclaimer, the term of this patent is extended or adjusted under 35 U.S.C. 154(b) by 0 days.

(21) Appl. No.: 16/368,870

(22) Filed: Mar. 29, 2019

Related U.S. Application Data

(60) Provisional application No. 62/719,315, filed on Aug. 17, 2018, provisional application No. 62/722,985, filed on Aug. 27, 2018.

(51) Int. Cl.
*H04R 1/28* (2006.01)
*F16K 11/10* (2006.01)

(52) U.S. Cl.
CPC ............ *H04R 1/28* (2013.01); *F16K 11/10* (2013.01)

(58) Field of Classification Search
CPC ...... H04R 19/00; H04R 19/01; H04R 19/013; H04R 19/02; H04R 19/005; H04R 7/12; H04R 7/122; H04R 7/14; H04R 1/28; F16K 11/10
USPC ........................................ 381/345, 339, 337
See application file for complete search history.

(56) References Cited

U.S. PATENT DOCUMENTS

| 3,636,278 | A | * | 1/1972 | Heil | H04R 7/14 381/163 |
| 9,661,422 | B2 | * | 5/2017 | Pinkerton, III | H04R 19/02 |
| 2014/0294218 | A1 | * | 10/2014 | Suvanto | H04M 1/03 381/337 |
| 2015/0208175 | A1 | * | 7/2015 | Pinkerton | H04R 19/02 381/165 |
| 2016/0381464 | A1 | * | 12/2016 | Elyada | H04R 19/02 381/97 |
| 2018/0179048 | A1 | | 6/2018 | Schenk | |
| 2018/0273372 | A1 | * | 9/2018 | Piechocinski | B81B 3/0072 |

FOREIGN PATENT DOCUMENTS

| EP | 3 474 572 A1 | 4/2019 |
| WO | 99/07183 A1 | 2/1999 |

* cited by examiner

*Primary Examiner* — Ahmad F. Matar
*Assistant Examiner* — Sabrina Diaz
(74) *Attorney, Agent, or Firm* — Winston Hsu

(57) ABSTRACT

A sound producing device includes an air pulse generating element and a control unit. The air pulse generating element includes an air chamber, a membrane, a first air entrance and a first valve. The membrane is disposed in the air chamber. The first air entrance is disposed at a side of the membrane in a first direction. The first valve is disposed between the first air entrance and the membrane. The control unit generates a driving signal to control a movement of the membrane, such that the air pulse generating element generates an air pulse in response to the driving signal. During an operation, an first airflow corresponding to the air pulse flows into or flows out of the air chamber through the first air entrance, and passes through the first air entrance substantially along a direction parallel to the first direction perpendicular to the moving direction of the membrane.

28 Claims, 34 Drawing Sheets

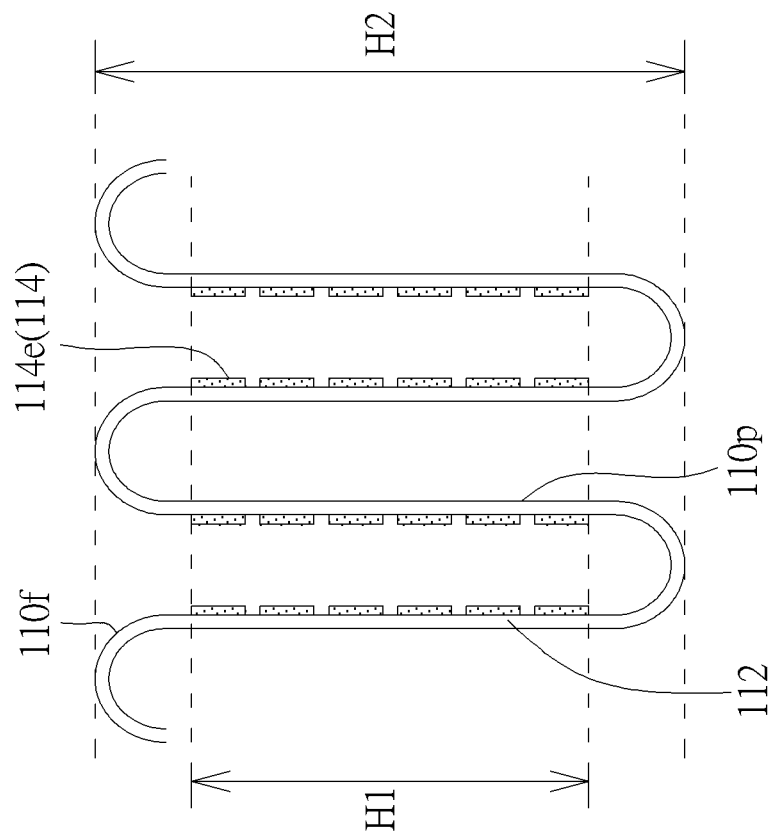
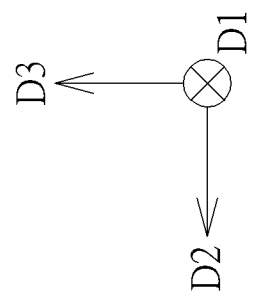
FIG. 5

SOUND PRODUCING DEVICE AND VALVE

CROSS REFERENCE TO RELATED APPLICATIONS

This application claims the benefit of U.S. provisional application No. 62/719,315, filed on Aug. 17, 2018 and U.S. provisional application No. 62/722,985, filed on Aug. 27, 2018, which are all incorporated herein by reference.

BACKGROUND OF THE INVENTION

1. Field of the Invention

The present invention relates to a sound producing device and an associated valve, and more particularly, to a sound producing device capable of producing high fidelity sound, and a valve associated to the sound producing device.

2. Description of the Prior Art

A speaker driver is always the most difficult challenge for high-fidelity sound reproduction in the speaker industry. The physics of sound wave propagation teaches that, within the human audible frequency range, the sound pressures generated by accelerating a membrane of a conventional speaker drive may be expressed as $P \propto S \cdot A$ (eq-1), where S is the membrane surface area and A is the acceleration of the membrane. Namely, the sound pressure P is proportional to the product of the membrane surface area S and the acceleration of the membrane A. In addition, the membrane displacement D may be expressed as $D \propto \frac{1}{2} \cdot A \cdot T^2 \propto 1/f^2$ (eq-2), where T and f are the period and the frequency of the sound wave respectively. The air volume movement $V_{A,CV}$ caused by the conventional speaker driver may then be expressed as $V_{A,CV} \propto S \cdot D$. For a specific speaker driver, where the membrane surface area is constant, the air movement $V_{A,CV}$ is proportional to $1/f^2$, i.e., $V_{A,CV} \propto 1/f^2$ (eq-3).

For example, in a conventional electrodynamics speaker driver, where its coils and magnets are used to produce membrane driving force, the sound of 18 KHz is produced by its membrane with a certain surface area vibrating at 18 KHz, while the sound of 30 Hz is also produced by the membrane vibrating at 30 Hz. As a result, the ratio of net air volumes moved by the membrane between these two frequencies (i.e., 30 Hz and 18 KHz) will be 360,000. In other words, in order to produce the same sound pressure level (SPL) at 30 Hz, the speaker driver will need to move 360,000 times the amount of air required for producing the same sound pressure level at 18 KHz.

To cover a full range of human audible frequency, e.g., from 20 Hz to 20 KHz, tweeter(s), mid-range driver(s) and woofer(s) have to be incorporated within a conventional speaker. All these additional components would occupy large space of the conventional speaker and will also raise its production cost. Hence, one of the design challenges for the conventional speaker is the impossibility to use a single driver to cover the full range of human audible frequency.

Another design challenge for producing high-fidelity sound by the conventional speaker is its enclosure. The speaker enclosure is often used to contain the back-radiating wave of the produced sound to avoid cancellation of the front radiating wave in certain frequencies where the corresponding wavelengths of the sound are significantly larger than the speaker dimensions. The speaker enclosure can also be used to help improve, or reshape, the low-frequency response. Therefore, with properly selected speaker driver and enclosure parameters, the combined enclosure-driver resonance peaking can be leveraged to boost the output of sound around the resonance frequency and therefore improve the performance of resulting speaker.

However, when the speaker enclosure's internal volume is not sufficiently large, the ratio of the air volume movement to the volume of the enclosure rises and the pressure fluctuation inside the enclosure also rises, which causes nonlinearity or distortion of membrane movement near the min-max peaks of its movement range. To avoid these problems, the conventional speaker enclosures are expected to contain sufficiently large volumes. For most high-fidelity speakers, the internal enclosure volumes are therefore generally vastly larger than the physical volumes of their speaker drivers.

Recently, micro-speakers are expected to be contained within devices such as smartphones, tablet notebooks, smartwatches, smartglasses or even earphones. In any of such compact devices, the volume of speaker is usually made extremely small due to the size constraint of its host devices. But, if the conventional speaker has a reduced size, the quality/fidelity of the sound produced by the conventional speaker is drastically degraded due to the above issues.

Therefore, how to provide a sound producing device to overcome the design challenges faced by conventional speakers as stated above is an important objective in the field.

SUMMARY OF THE INVENTION

It is therefore a primary objective of the present invention to provide a sound producing device capable of producing high fidelity sound.

An embodiment of the present invention provides a sound producing device including at least one air pulse generating element and a control unit. Each of the at least one air pulse generating element includes an air chamber, a membrane, a first air entrance and a first valve. The membrane is disposed in the air chamber and has a plurality side edges. The first air entrance is disposed at a side of the membrane in a first direction and adjacent to one of the side edges of the membrane. The first valve is disposed between the first air entrance and the membrane. The control unit is configured to generate at least one driving signal, wherein the driving signal controls a movement of the membrane of the air pulse generating element, such that the air pulse generating element generates an air pulse in response to the corresponding driving signal. During an operation of the sound producing device, an first airflow corresponding to the air pulse flows into or flows out of the air chamber through the first air entrance, the first airflow passes through the first air entrance substantially along a direction parallel to the first direction, the first direction is substantially perpendicular to a direction of the movement of the membrane, and the first valve is configured to control a path of the first airflow.

Another embodiment of the present invention provides a valve including a valve body, a blocking structure and a supporting structure. The valve body has a first valve entrance, a second valve entrance and a third valve entrance. The blocking structure is disposed in the valve body, wherein the blocking structure is configured to separate the second valve entrance from the third valve entrance in a first path status, and configured to separate the first valve entrance from the third valve entrance in a second path status. The supporting structure is connected between the blocking structure and the valve body, wherein the supporting structure is deformable. Wherein, the blocking structure is capable of rotating to change an operation status between the first path status and the second path status.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a schematic diagram of a cross sectional view of the membrane of the air pulse generating element of the sound producing device according to the first embodiment of the present invention.

DETAILED DESCRIPTION

Figure 1:
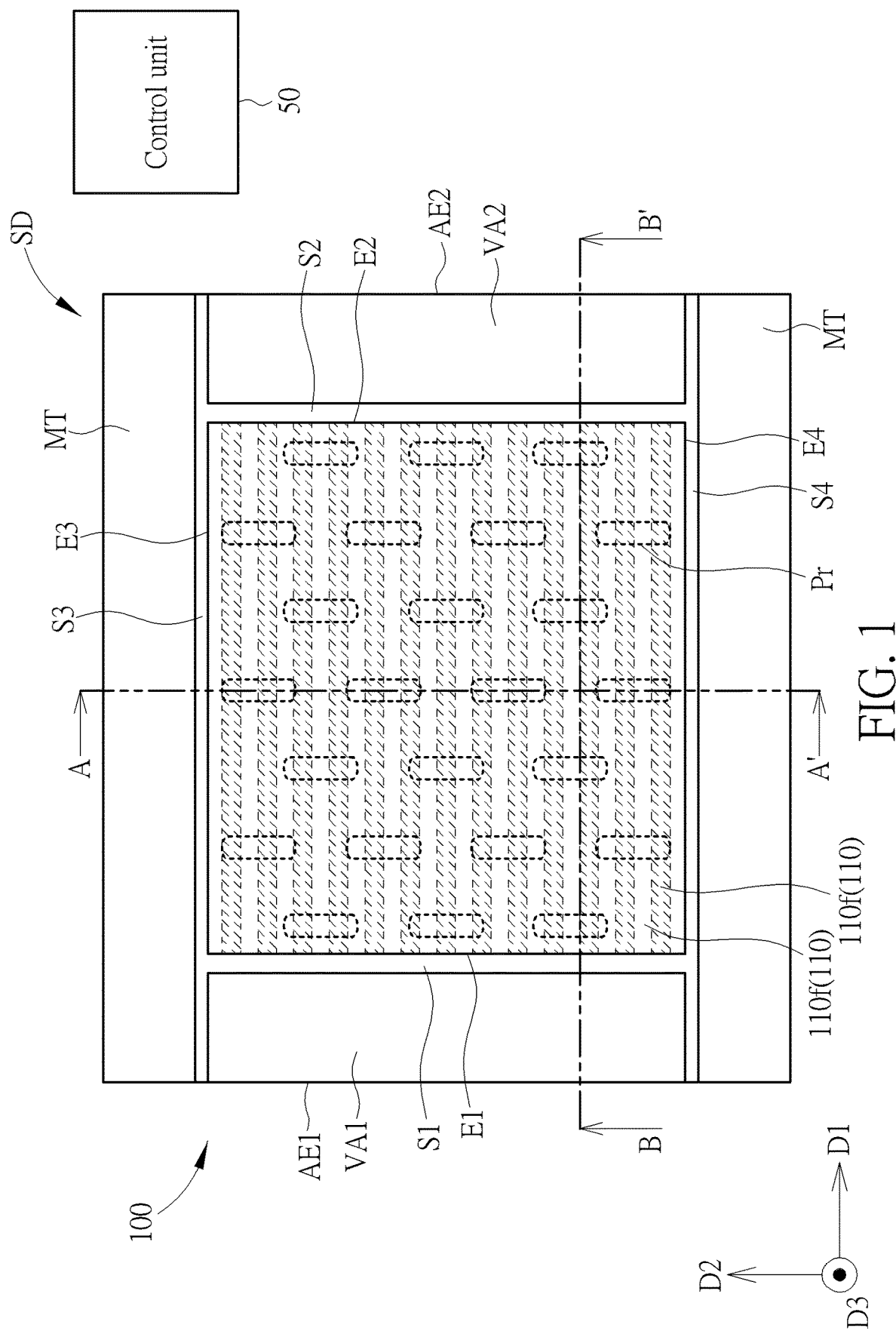
FIG. 1 is a schematic diagram of a sound producing device according to a first embodiment of the present invention.

To provide a better understanding of the present invention to those skilled in the art, preferred embodiments will be detailed in the follow description. The preferred embodiments of the present invention are illustrated in the accompanying drawings with numbered elements to elaborate on the contents and effects to be achieved. It should be noted that the drawings are simplified schematics, and therefore show only the components and combinations associated with the present invention, so as to provide a clearer description for the basic structure or implementing method of the present invention. The components would be more complex in reality. In addition, for ease of explanation, the components shown in the drawings may not represent their actual number, shape, and dimensions; details may be adjusted according to design requirements.

Figure 18:
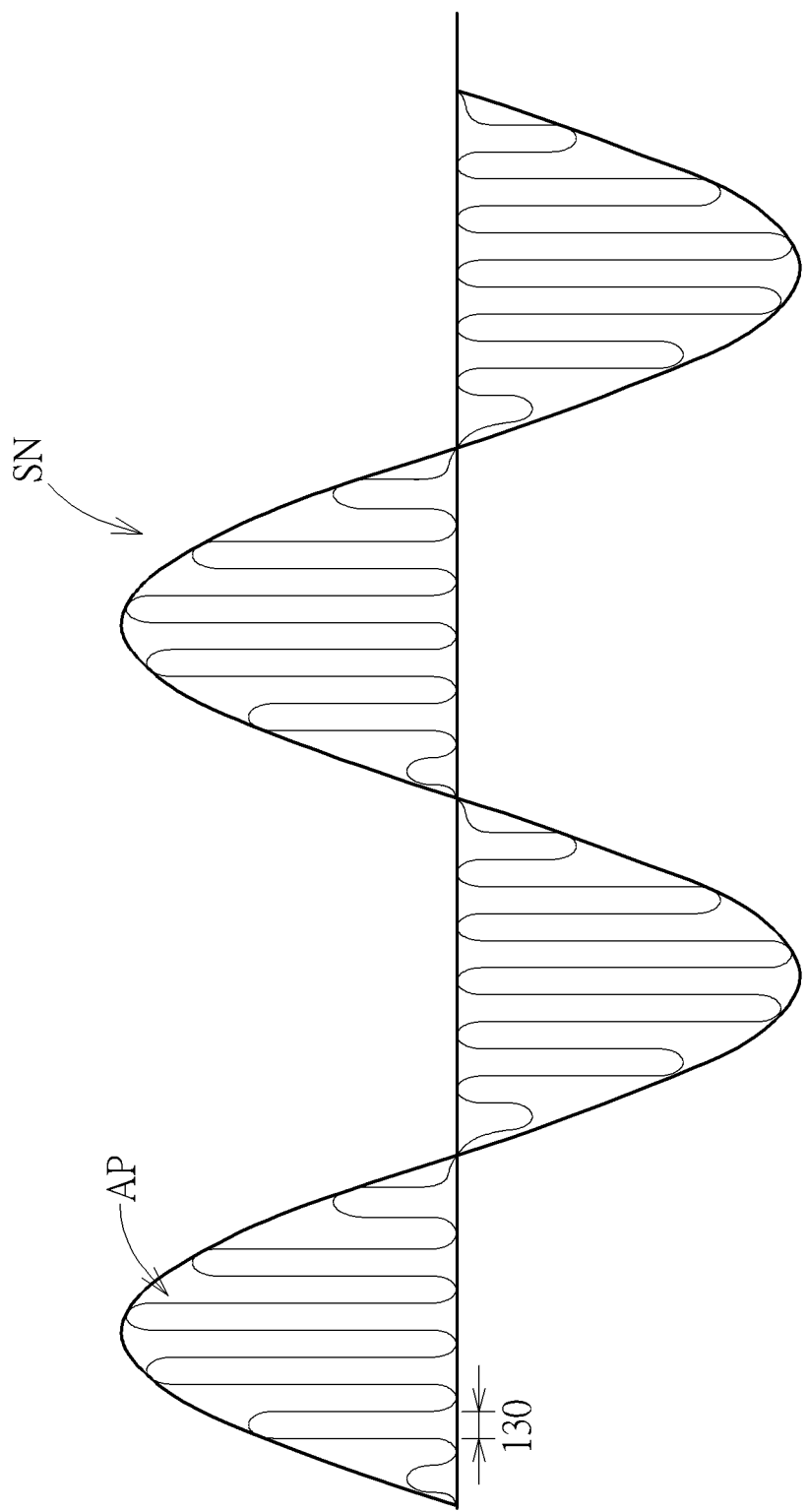
FIG. 18 is a schematic diagram of sound pressure levels of air pulses generated by the air pulse generating element according to an embodiment of the present invention.

Instead of producing a sound at the frequency of sound, i.e., generating a sound wave complying with the zero-mean-flow assumption of classic acoustic wave theorems, as the conventional sound producing devices would have done, the sound producing device of the present invention generates a series of air pulses at a pulse rate (as shown in FIG. 18), where the pulse rate is higher than a maximum human audible frequency. The air pulse represents a variation in air/sound pressure caused by the sound producing device within a pulse cycle, where the pulse cycle is an inverse/reciprocal of the pulse rate. In other words, the air pulse is in terms of a sound pressure level (SPL). In an embodiment, the pulse rate may be an ultrasonic rate, e.g., 96 KHz, significantly higher than twice of the maximum human audible frequency, which is generally considered to be 20 KHz. This pulse rate is determined based on Nyquist law, which states, in order to avoid frequency spectral aliasing, the pulse rate needs to be at least twice higher than the maximum frequency of the sound signal. The series/plurality of air pulses generated by the sound producing device may be referred as an ultrasonic pulse array (UPA).

Figure 2:
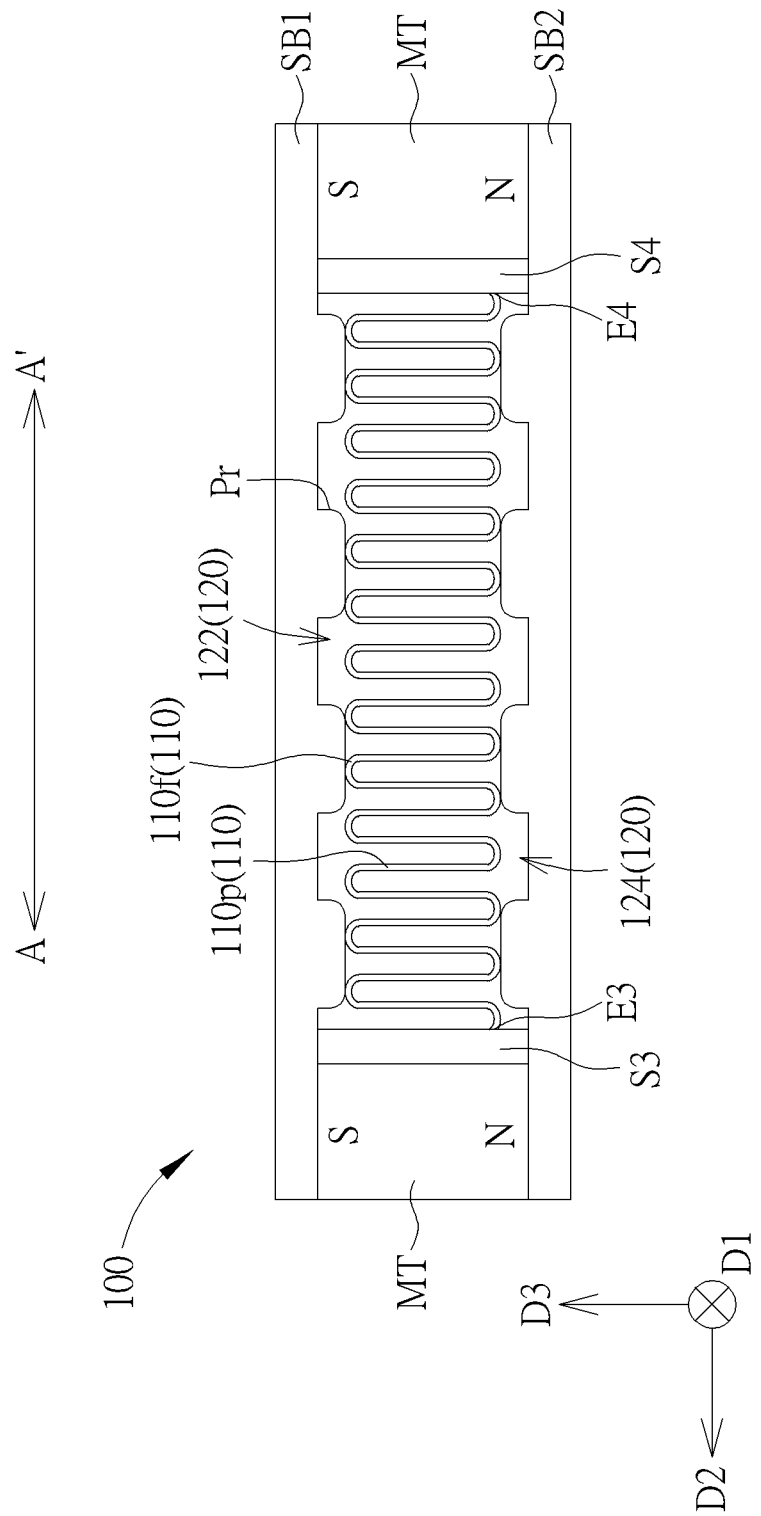
FIG. 2 is a schematic diagram of a cross sectional view taken along a cross-sectional line A-A' in FIG. 1.
Figure 3:
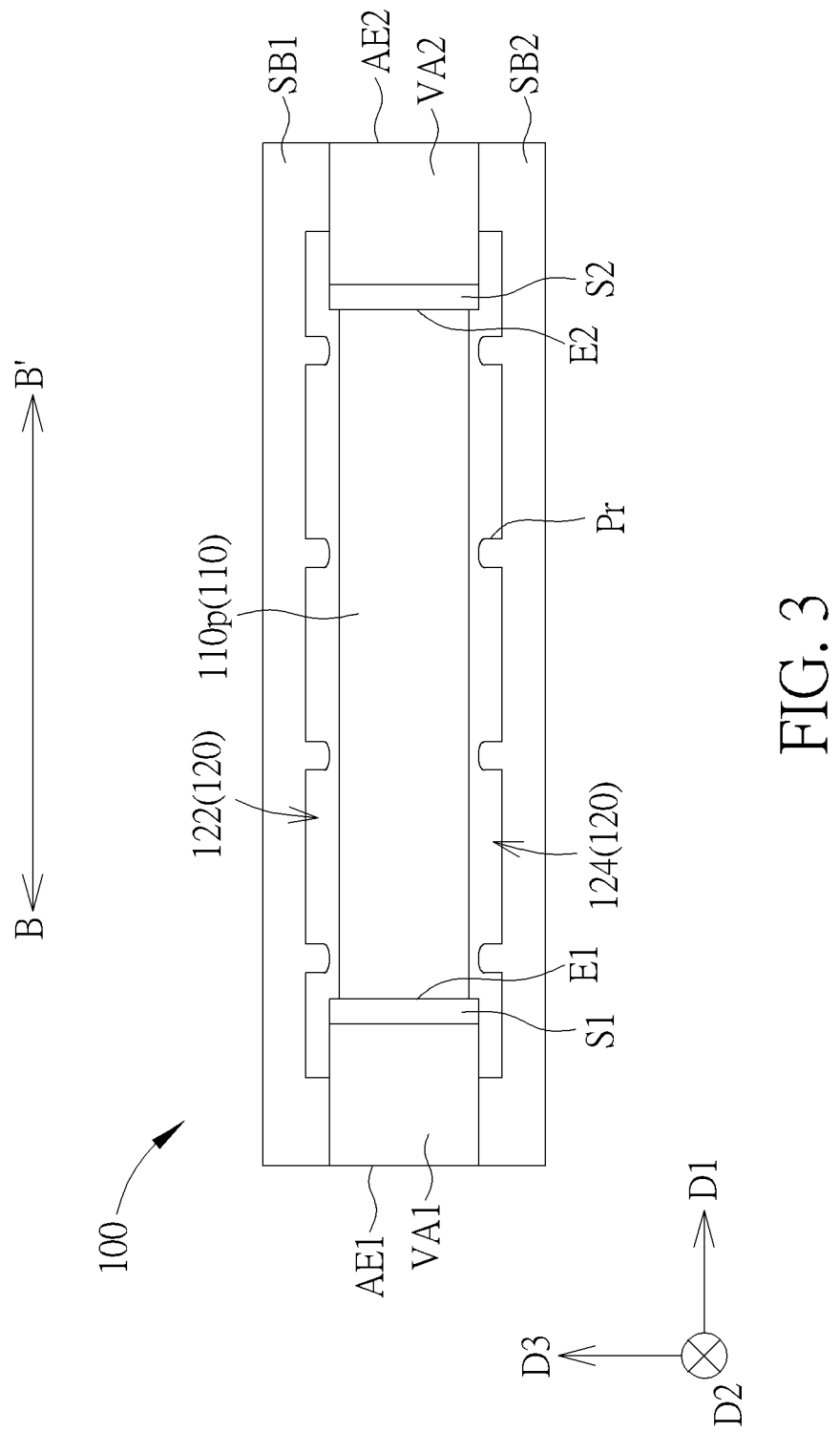
FIG. 3 is a schematic diagram of a cross sectional view taken along a cross-sectional line B-B' in FIG. 1.

Referring to FIG. 1 to FIG. 3, FIG. 1 is a schematic diagram of a sound producing device according to a first embodiment of the present invention, FIG. 2 is a schematic diagram of a cross sectional view taken along a cross-sectional line A-A' in FIG. 1, and FIG. 3 is a schematic diagram of a cross sectional view taken along a cross-sectional line B-B' in FIG. 1. As shown in FIG. 1 to FIG. 3, the sound producing device SD of this embodiment includes at least one air pulse generating element 100 and a control unit 50. In this embodiment, the sound producing device SD only includes one air pulse generating element 100, but not limited thereto. The air pulse generating element 100 includes an air chamber 120, a membrane 110, a first air entrance AE1, a second air entrance AE2, a first valve VA1 and a second valve VA2, and may optionally include a first plate SB1 and a second plate SB2 opposite to the first plate SB1. These structures in the air pulse generating element 100 will be discussed later. The control unit 50 is configured to generate at least one driving signal and at least one valve control signal, wherein the driving signal controls a movement of the membrane 110 of the air pulse generating element 100 such that the air pulse generating element 100 generates an air pulse in response to the corresponding driving signal, and the valve control signal controls switching states (open/closed states) of the first valve VA1 and the second valve VA2.

In this embodiment, the air chamber 120 is formed between the first plate SB1 and the second plate SB2, and the first air entrance AE1, the second air entrance AE2, the first valve VA1 and the second valve VA2 are situated between the first plate SB1 and the second plate SB2. Furthermore, the membrane 110 is disposed in the air chamber 120, the first air entrance AE1 and the second air entrance AE2 are disposed at opposite sides of the membrane 110 in a first direction D1 (that is, the membrane 110 is situated between the first air entrance AE1 and the second air entrance AE2), the first valve VA1 is disposed between the first air entrance AE1 and the membrane 110, and the second valve VA2 is disposed between the second air entrance AE2 and the membrane 110. In other words, the first air entrance AE1, the first valve VA1, the membrane 110, the second valve VA2 and the second air entrance AE2 are arranged in a first direction D1 in sequence. Herein, for example, the thicknesses of the first plate SB1 and the second plate SB2 may be 250 μm, but not limited thereto.

In this embodiment, the membrane 110 is a foldable membrane, and has a rectangular shape before folding, but the type and the shape of the membrane 110 are not limited thereto. In FIG. 1 to FIG. 3, the membrane 110 has a plurality of planar parts 110p and a plurality of folded parts 110f, each of the folded parts 110f is situated between two adjacent planar parts 110p among the plurality of planar parts 110p, and the planar parts 110p extend along the first direction D1 and are arranged along a second direction D2 substantially perpendicular to the first direction D1. In other words, the planar parts 110p and the folded parts 110f are alternately arranged along the second direction D2. Note that, in the top view of FIG. 1, two adjacent folded parts 110f are shown in different shadings. In order to have the membrane 110 maintain the folded type, four side edges (a first side edge E1 and a second side edge E2 extending along the second direction D2, and a third side edge E3 and a fourth side edge E4 extending along the first direction D1) of the membrane 110 are respectively connected to different spacers (thicknesses may be 75 μm for example). In details, the first side edge E1 is connected to a first spacer S1 situated between the membrane 110 and the first valve VA1, the second side edge E2 is connected to a second spacer S2 situated between the membrane 110 and the second valve VA2, the third side edge E3 is connected to a third spacer S3, and the fourth side edge E4 is connected to a fourth spacer S4, wherein the connecting method may be any suitable method. The shapes first spacer S1 and the second spacer S2 viewing along the first direction D1 are rectangle, but not limited thereto. Note that air passages respectively exist between the first spacer S1 and the first plate SB1, between the first spacer S1 and the second plate SB2, between the second spacer S2 and the first plate SB1 and between the second spacer S2 and the second plate SB2, so as to connect the air chamber 120 to the first air entrance AE1 and the second air entrance AE2. Note that the first side edge E1 and the second side edge E2 are folded to have a plurality of peaks and valleys, and the first air entrance AE1 and the second air entrance AE2 are respectively adjacent to the first side edge E1 and the second side edge E2. Moreover, at least some folded parts 110f of the membrane 110 may be supported by (for example, be in contact with) the first plate SB1 and the second plate SB2 to have the membrane 110 maintain the folded type. In this embodiment, each of the first plate SB1 and the second plate SB2 may have at least one protrusion Pr configured to be in contact with at least one of the folded parts 110f, so as to support the membrane 110. Also, the existence of the protrusion Pr may further increase the stiffness of the first plate SB1 and the second plate SB2 during an operation of the sound producing device SD. A height of the protrusion Pr herein may be greater than 100 μm (for example, 150 μm), each protrusion Pr may be corresponding to four or five folded parts 110f of the membrane 110 in FIG. 1, and the protrusions Pr may be arranged averagely in top view, but not limited thereto. Moreover, in order to minimize the abrasion and friction between the folded parts 110f of the membrane 110 and the plates SB1, SB2, the surface of the plates SB1, SB2 may be coated with polymer material such as bisphenol A (BPA), Teflon, etc.

In another aspect, since the side edges E1-E4 of the membrane 110 of this embodiment are connected to the spacers S1-S4, the air chamber 120 includes a first sub-chamber 122 and a second sub-chamber 124 separated by the membrane 110. The first sub-chamber 122 is situated between the first plate SB1 and the membrane 110, connected to the first air entrance AE1 through the first valve VA1 and the air passage between the first spacer S1 and the first plate SB1, and connected to the second air entrance AE2 through the second valve VA2 and the air passage between the second spacer S2 and the first plate SB1. The second sub-chamber 124 is situated between the second plate SB2 and the membrane 110, connected to the first air entrance AE1 through the first valve VA1 and the air passage between the first spacer S1 and the second plate SB2, and connected to the second air entrance AE2 through the second valve VA2 and the air passage between the second spacer S2 and the second plate SB2.

In the present invention, the membrane 110 is configured to move for generating an air pulse according to the driving signal generated by the control unit 50. Therefore, the membrane 110 may be actuated for producing the air move volume to generate the air pulse by any suitable actuating means included in or disposed on the membrane 110. Note that a magnitude of the SPL of the air pulse increases as the air move volume in a time unit increases. In this embodiment, the membrane 110 may be actuated by the Lorentz force (that is, a membrane actuated force actuating the membrane 110 is the Lorentz force). Therefore, during the operation of the sound producing device SD, the sound producing device SD provides a magnetic field where directions of magnetic flux lines are substantially parallel to a third direction D3 not parallel to the second direction D2 nor the first direction D1, and the control unit 50 provides a suitable driving current with suitable direction served as the driving signal for the membrane 110 to control the movement of the membrane 110. Note that the Lorentz force ($\vec{F}$) is proportional to the driving current ($\vec{I}$) and the magnetic field ($\vec{B}$), and shown as $\vec{F} \propto \vec{I} \times \vec{B}$ (eq-4) equivalently. In this embodiment, the magnetic field is provided by the first plate SB1 and the second plate SB2; for example, the first plate SB1 and the second plate SB2 include magnetic material (i.e. ferromagnetism or ferrimagnetism material) such as ferrous steel, and the first plate SB1 and the second plate SB2 are respectively served as a north magnetic pole and a south magnetic pole to provide the magnetic field (as shown in FIG. 1 and FIG. 2), wherein the protrusions Pr of the first plate SB1 and the second plate SB2 may change or manage the distribution of the magnetic flux lines within the air chamber 120, but the formation of the magnetic field is not limited thereto. In this embodiment, magnets MT are contact with the first plate SB1 and the second plate SB2 to form the magnetic field. In another embodiment, the magnetic field may be an electromagnetic field formed by coils in the first plate SB1 and the second plate SB2.

Figure 4:
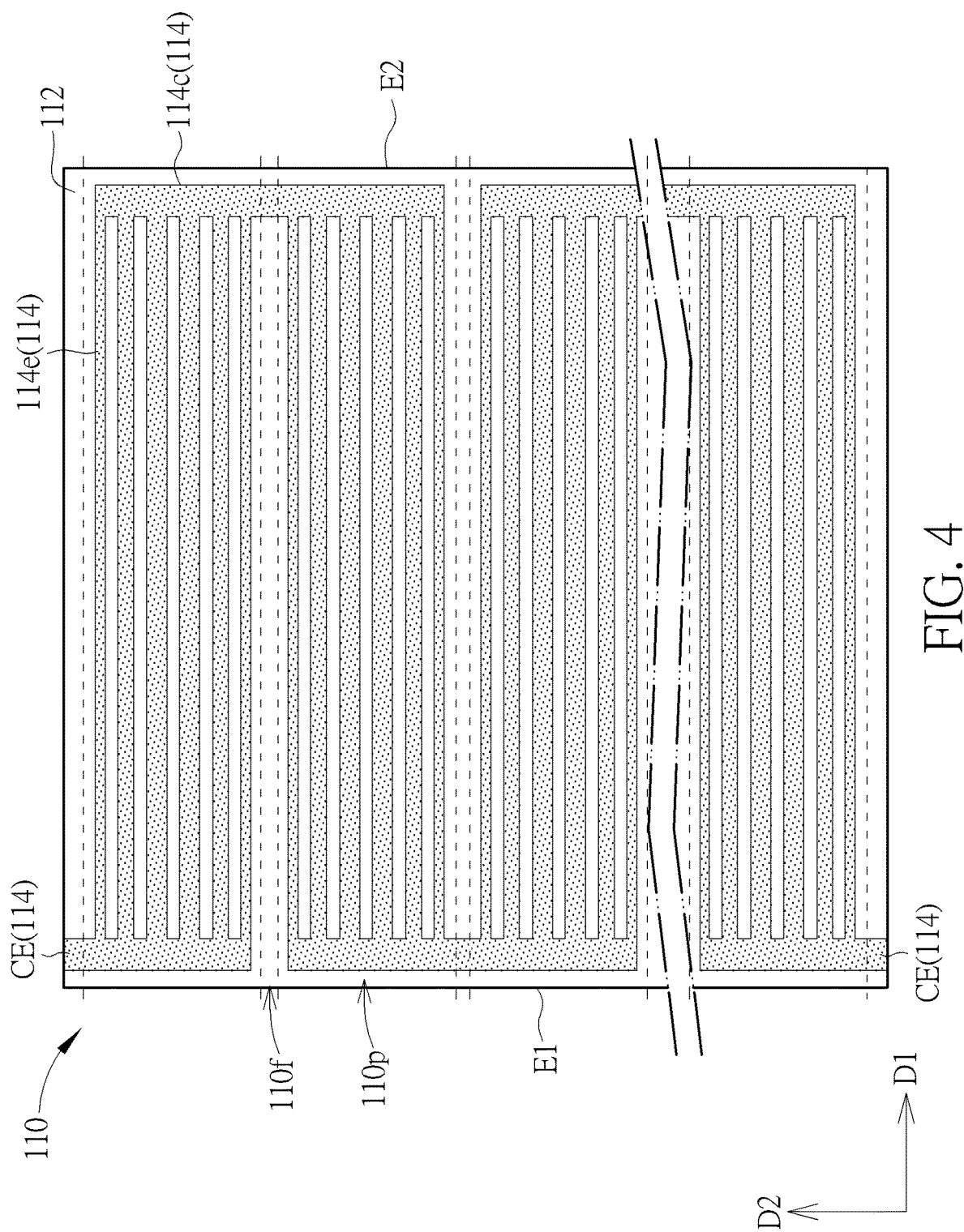
FIG. 4 is a schematic diagram of a membrane of the air pulse generating element of the sound producing device according to the first embodiment of the present invention.

Referring to FIG. 4 to FIG. 5 and further referring to FIG. 1 to FIG. 3, FIG. 4 is a schematic diagram of a membrane of the air pulse generating element of the sound producing device according to the first embodiment of the present invention, and FIG. 5 is a schematic diagram of a cross sectional view of the membrane of the air pulse generating element of the sound producing device according to the first embodiment of the present invention, wherein FIG. 4 shows the top-view of the membrane 110 before folding the membrane 110, FIG. 5 only shows a portion of the membrane 110. As shown in FIG. 1 to FIG. 5, the membrane 110 of this embodiment may include a flexible membrane substrate 112 and a conductive layer 114 disposed on the flexible membrane substrate 112, wherein the conductive layer 114 is electrically connected to the control unit 50 for receiving the driving signal. The material of the flexible membrane substrate 112 may include polycarbonate, polypropylene, Kapton or Teflon, the thickness of the flexible membrane substrate 112 may range from 8 μm to 12 μm (herein, 10 μm for example), and the material of the conductive layer 114 may have highly conductive property and light weight, such as aluminum, but the present invention is not limited thereto.

The conductive layer 114 may include a plurality of trace extending patterns 114e and a plurality of trace connecting patterns 114c, each of the trace extending patterns 114e is situated on one of the planar parts 110p of the membrane 110, and each of the trace connecting patterns 114c crosses over one of the folded parts 110f of the membrane 110 and is electrically connected between two of the trace extending patterns 114e respectively situated on two different planar parts 110p among the planar parts 110p. The trace extending patterns 114e substantially extend along the first direction D1, such that the current direction of the driving current flowing in each planar part 110p of the membrane 110 may be substantially parallel to the first direction D1, and the driving current directions in two adjacent planar parts 110p are substantially opposite. In addition, each of the trace connecting patterns 114c of this embodiment is positioned adjacent to the first side edge E1 or the second side edge E2 of the membrane 110 (the trace connecting patterns 114c are alternately positioned adjacent to the first side edge E1 and the second side edge E2 in FIG. 4), and each of the trace connecting patterns 114c is directly connected to all trace extending patterns 114e situated in the two planar parts 110p, such that the trace extending patterns 114e and the trace connecting patterns 114c form a zigzag pattern, which make the driving current zigzag flow in the membrane 110, but not limited thereto. Note that the conductive layer 114 may include two connected ends CE electrically connected to the control unit 50.

Figure 6:
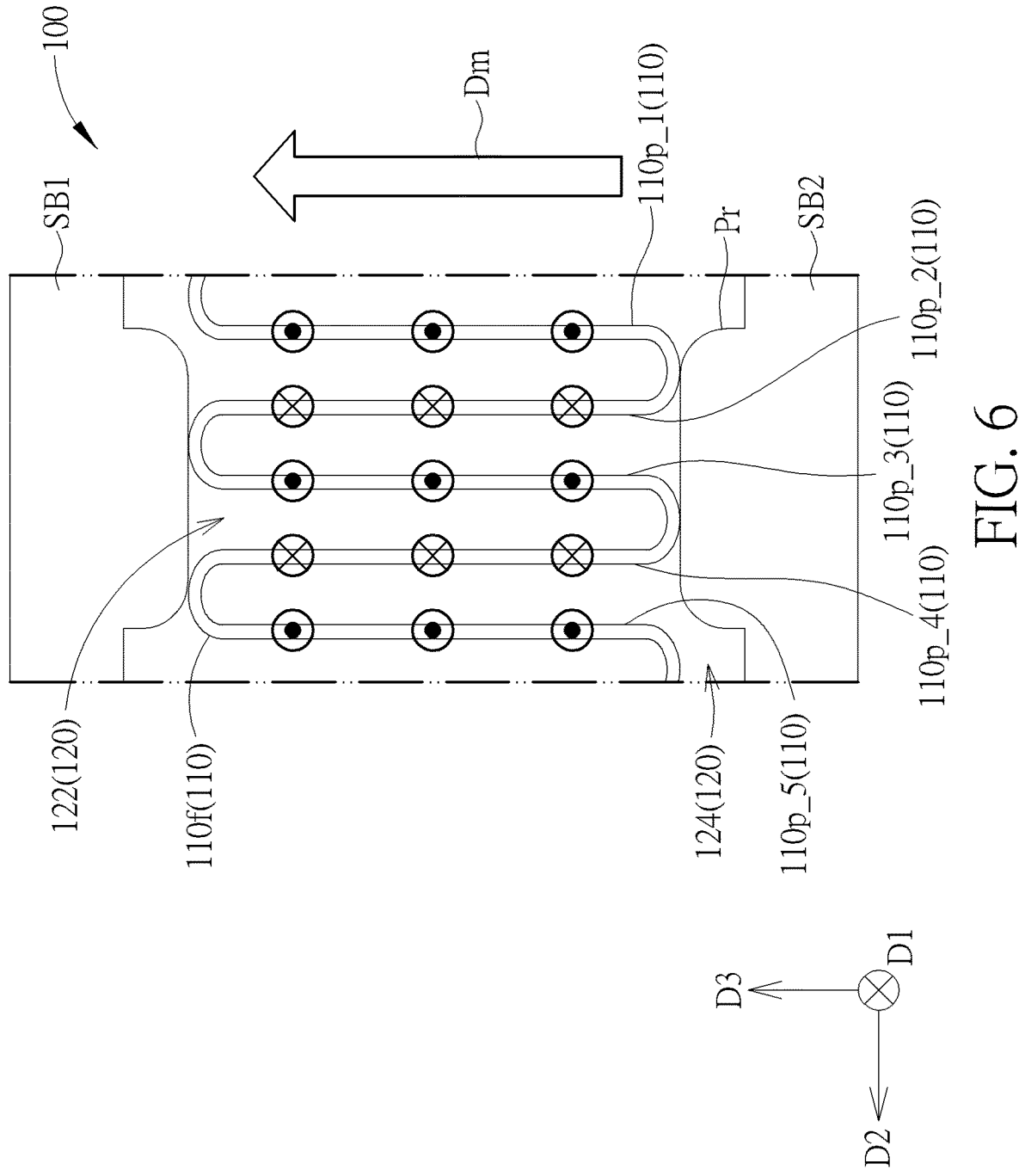
FIG. 6 is a schematic diagram of a cross sectional view of the relation between the movement of the membrane and the driving current according to the first embodiment of the present invention.

Referring to FIG. 6 and further referring to FIG. 1 to FIG. 5, FIG. 6 is a schematic diagram of a cross sectional view of the relation between the movement of the membrane and the driving current according to the first embodiment of the present invention, wherein FIG. 6 only shows a portion of the membrane 110. As shown in FIG. 6, during the operation of the sound producing device SD, since the planar parts 110p of the membrane 110 are arranged along the second direction D2, the current direction of the driving current is substantially parallel to the first direction D1, and the directions of the magnetic flux lines of the magnetic field are substantially along the third direction D3 (as shown in a magnetic field direction Dm of FIG. 6), the membrane actuated force (the Lorentz force) is generated by the driving current and the magnetic field to have the membrane 110 be actuated along a direction parallel to the second direction D2 (in other words, the direction of the movement of the membrane 110 is substantially parallel to the second direction D2 and substantially perpendicular to the first direction D1), which produces the air pulse. Also, because the driving current directions in two adjacent planar parts 110p are substantially opposite, the two adjacent planar parts 110p may be close to or away from each other depending on their driving current directions. For example, in FIG. 6, if the driving current directions in the first planar part 110p_1, third planar part 110p_3 and fifth planar part 110p_5 (from right to left in FIG. 6) are a direction opposite to the first direction D1, and the driving current directions in the second planar part 110p_2 and fourth planar part 110p_4 are the first direction D1 (as shown in FIG. 6), the distance between the first planar part 110p_1 and second planar part 110p_2 and the distance between the third planar part 110p_3 and fourth planar part 110p_4 are decreased to reduce the volume of the first sub-chamber 122, and the distance between the second planar part 110p_2 and third planar part 110p_3 and the distance between the fourth planar part 110p_4 and fifth planar part 110p_5 are increased to enhance the volume of the second sub-chamber 124, such that a first air-pressure in the first sub-chamber 122 is increased, and a second air-pressure in the second sub-chamber 124 is decreased (hereafter, this condition is called that the membrane 110 is in a first actuating status). On the other hand, if the driving current directions in the first planar part 110p_1, third planar part 110p_3 and fifth planar part 110p_5 are the first direction D1, and the driving current directions in the second planar part 110p_2 and fourth planar part 110p_4 are a direction opposite to the first direction D1 (that is, the driving current is opposite to above), the distance between the first planar part 110p_1 and second planar part 110p_2 and the distance between the third planar part 110p_3 and fourth planar part 110p_4 are increased to enhance the volume of the first sub-chamber 122, and the distance between the second planar part 110p_2 and third planar part 110p_3 and the distance between the fourth planar part 110p_4 and fifth planar part 110p_5 are decreased to reduce the volume of the second sub-chamber 124, such that the first air-pressure in the first sub-chamber 122 is decreased, and a second air-pressure in the second sub-chamber 124 is increased (hereafter, this condition is called that the membrane 110 is in a second actuating status). Thereby, the change of the first air-pressure corresponding to the air pulse makes the air flow in the first sub-chamber 122, and the change of the second air-pressure corresponding to the air pulse makes the air flow in the second sub-chamber 124, wherein air flowing in the first sub-chamber 122 and the second sub-chamber 124 may respectively pass through the first air entrance AE1/second air entrance AE2 and the second air entrance AE2/first air entrance AE1. In this embodiment, an airflow passing through the first air entrance AE1 and flowing into/out of the air chamber 120 (for example, one of the first sub-chamber 122 and the second sub-chamber 124) may be defined as a first airflow, an airflow passing through the second air entrance AE2 and flowing into/out of the air chamber 120 (for example, one of the first sub-chamber 122 and the second sub-chamber 124) may be defined as a second airflow, and the first airflow and the second airflow may be corresponding to the air pulse. In addition, because the first airflow and the second airflow may flow in paths between any two planar parts 110p along a direction parallel to the first direction D1, and pass through the air entrances AE1, AE2 substantially along a direction parallel to the first direction D1, the first airflow and the second airflow in the air pulse generating element 100 are smooth. Note that the relation of the paths of the airflows, the valves and the entrances will be discussed later.

Specifically, in this embodiment, the magnitude of the SPL (or the air move volume) of the air pulse is substantially proportional to the difference between the first air-pressure and the second air-pressure (or the displacement of the planar part 110p), this air-pressure difference (or the displacement of the planar part 110p) is substantially proportional to the magnitude of the membrane actuated force and the applying time of the membrane actuated force, and the magnitude of the membrane actuated force is substantially proportional to the magnitude of the driving current and magnetic field. Therefore, within the pulse cycle, the SPL (or the air move volume) of the air pulse can be modulated by adjusting the magnitude and/or the applying time of the driving current. The air pulse generating element 100 of this embodiment may directly generate the air pulse having the suitable SPL. Furthermore, in the situation of actuating membrane 110, because a changing value of the air-pressure in the sub-chamber ($\Delta P$) is proportional to a ratio of a change value of the volume of this sub-chamber ($\Delta V$) to the initial volume of this sub-chamber ($V_0$), which is shown as $\Delta P \propto \Delta V/V_0$ (eq-5) equivalently, the dimension of the protrusion Pr may influence the change value of the air-pressure in the sub-chamber.

As can be seen from the above, in order to increase the moving velocity and/or acceleration of the membrane 110 for diminishing the power consumption (such as diminishing driving current), advantaging the moving distance of the membrane 110 or enhance the response speed of the membrane 110, the mass of the membrane 110 cannot too high. Thus, the material of the flexible membrane substrate 112 and the material of the conductive layer 114 may have a light weight property.

In addition, regarding the trace connecting patterns 114c on the folded parts 110f, because the current direction of the driving current flowing in each of the trace connecting patterns 114c is perpendicular to the first direction D1 (e.g. the current direction is substantially parallel to the second direction D2), when the driving current passes through the trace connecting patterns 114c, the movements of the folded parts 110f cannot be generated.

As shown in FIG. 4 to FIG. 5, the folded parts 110f of the membrane 110 of this embodiment may not have the trace extending patterns 114e, such that the flexibility of the folded parts 110f of the membrane 110 is enhanced (i.e. the membrane 110 may be folded easily), and the movement of the folded parts 110f may be decreased to maintain the folded type of the membrane 110. For example, in FIG. 5, the height H1 (based on the third direction D3) of a portion of the membrane 110 having the trace extending patterns 114e may be ⅔ of the total height H2 of the membrane 110, wherein the sum of the heights of two folded parts 110f may be less than or equal to ⅓ of the total height H2 of the membrane 110, but not limited thereto. Furthermore, since the folded parts 110f of the membrane 110 of this embodiment may not have the trace extending patterns 114e, the metal fatigue due to actuating the membrane 110 may be reduced.

Moreover, in this embodiment, each of the planar parts 110p may have more than one trace extending patterns 114e, and at least two trace extending patterns 114e situated in one of the planar parts 110p may have different widths; for example, each of the planar parts 110p in FIG. 4 has six trace extending patterns 114e, wherein the third and fourth trace extending patterns 114e (from up to down in FIG. 4) in one planar parts 110p have the max-width, the first and sixth trace extending patterns 114e in one planar parts 110p have the min-width, and the widths of the twice and fifth trace extending patterns 114e are less than the max-width and greater than the min-width, but the present invention is not limited thereto. In this case, the membrane actuated force (the Lorentz force) situated at the center of each planar part 110p is greatest due to the max-width trace extending pattern 114e. In another embodiment, each of the planar parts 110p may have only one trace extending pattern 114e. In still another embodiment, each of the planar parts 110p may have more than one trace extending patterns 114e, and the trace extending patterns 114e situated in one of the planar parts 110p may have the same width.

Note that, in order to prevent two adjacent planar parts 110p from being in contact with (or being stuck to) each other during the operation of the sound producing device SD for influencing the regular operation, the ratio of the minimum distance between two adjacent planar parts 110p during the operation to the initial distance between two adjacent planar parts 110p may be equal to or less than such as, but not limited to, ½.

Figure 7:
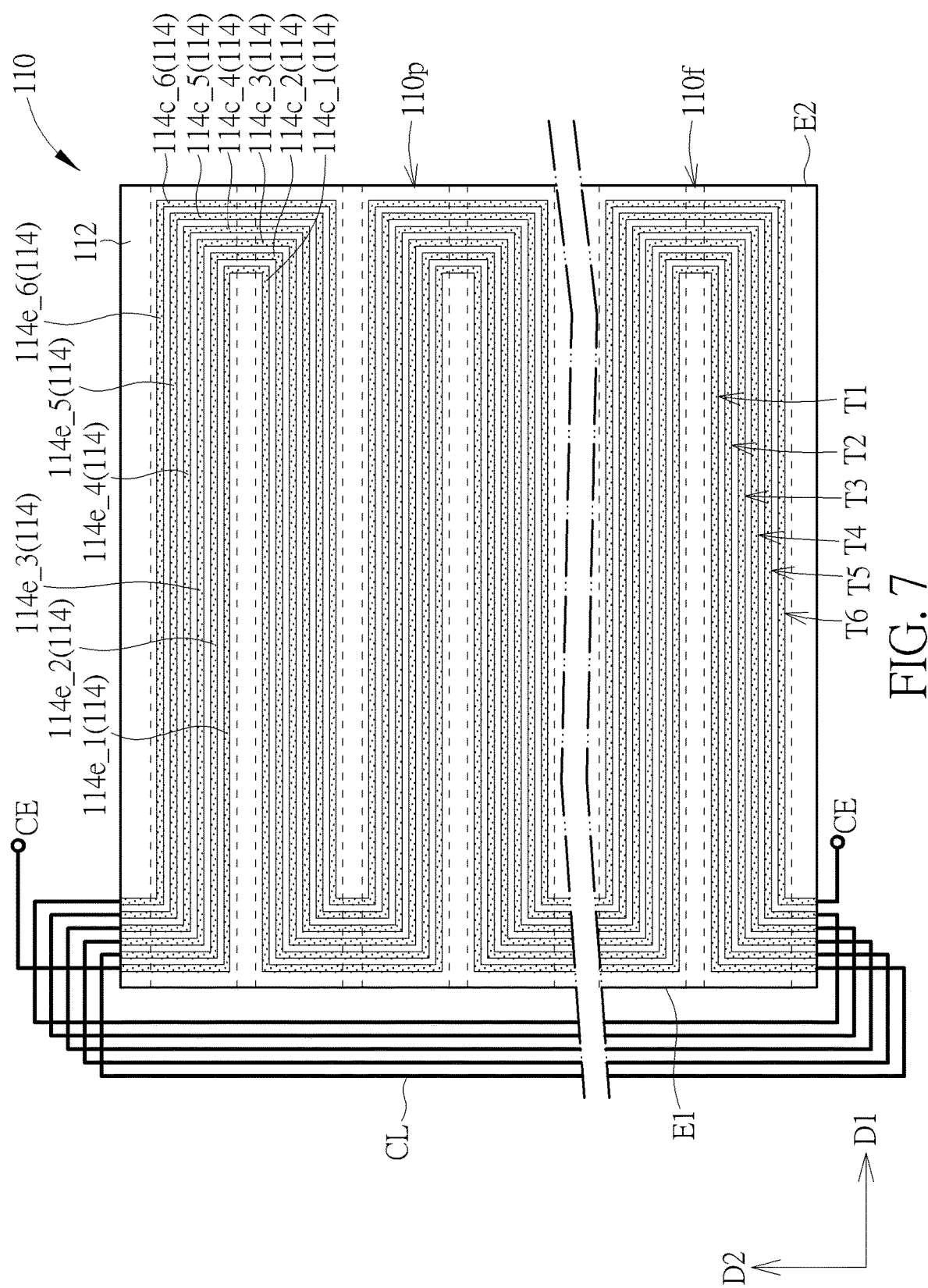
FIG. 7 is a schematic diagram of a membrane of the air pulse generating element of the sound producing device according to a variant embodiment of the first embodiment of the present invention.

Referring to FIG. 7, FIG. 7 is a schematic diagram of a membrane of the air pulse generating element of the sound producing device according to a variant embodiment of the first embodiment of the present invention, wherein FIG. 7 shows the top-view of the membrane 110 before folding the membrane 110. As shown in FIG. 7, the present invention provides another embodiment of the conductive layer 114 of the membrane 110. In this variant embodiment, the trace extending patterns 114e may include a plurality of first trace extending patterns 114e_1 and a plurality of second trace extending patterns 114e_2, and the trace connecting patterns 114c may include a plurality of first trace connecting patterns 114c_1 and a plurality of second trace connecting patterns 114c_2. Optionally, the trace extending patterns 114e may further include such as a plurality of third, fourth, fifth and sixth trace extending patterns 114e_3-114e_6, and the trace connecting patterns 114c may further include a plurality of third, fourth, fifth and sixth trace connecting patterns 114c_3-114c_6. In FIG. 7, each planar part 110p of the membrane 110 has one first trace extending pattern 114e_1, one second trace extending pattern 114e_2, one third trace extending pattern 114e_3, one fourth trace extending pattern 114e_4, one fifth trace extending pattern 114e_5 and one sixth trace extending pattern 114e_6, and each folded part 110f of the membrane 110 has one first trace connecting pattern 114c_1, one second trace connecting pattern 114c_2, one third trace connecting pattern 114c_3, one fourth trace connecting pattern 114c_4, one fifth trace connecting pattern 114c_5 and one sixth trace connecting pattern 114c_6. In detail, the first trace extending patterns 114e_1 in different planar parts 110p and the first trace connecting patterns 114c_1 in different folded parts 110f are alternately connected to form a first trace T1, and the second trace extending patterns 114e_2 in different planar parts 110p and the second trace connecting patterns 114c_2 in different folded parts 110f are alternately connected to form a second trace T2. Similarly, a third trace T3 is formed of the third trace extending patterns 114e_3 and the third trace connecting patterns 114c_3, a fourth trace T4 is formed of the fourth trace extending patterns 114e_4 and the fourth trace connecting patterns 114c_4, a fifth trace T5 is formed of the fifth trace extending patterns 114e_5 and the fifth trace connecting patterns 114c_5, and a sixth trace T6 is formed of the sixth trace extending patterns 114e_6 and the sixth trace connecting patterns 114c_6.

In this variant embodiment, the air pulse generating element 100 may further include at least one connecting line CL crossing over the membrane 110, wherein the connecting line CL is disposed outside the membrane 110; for example, the connecting line CL is disposed on the first plate SB1, the second plate SB2 or other suitable position of the air pulse generating element 100 in addition to the membrane 110. In FIG. 7, the air pulse generating element 100 includes five connecting lines CL for example. Each connecting line CL is electrically connected between an end of one trace and an end of another trace, such that two traces of the membrane 110 can be electrically connected through one of the connecting lines CL. In other word, the first trace T1, the second trace T2, the third trace T3, the fourth trace T4, the fifth trace T5 and the sixth trace T6 are not directly connected to each other, but these traces are electrically connected through the connecting lines CL. Thus, in this variant embodiment, the driving current may flow through the first trace T1, one connecting line CL, the second trace T2, another connecting line CL, the third trace T3, still another connecting line CL, the fourth trace T4, still another connecting line CL, the fifth trace T5, the other connecting line CL and sixth trace T6 in sequence. Moreover, the widths of the trace extending patterns 114e may be the same or different in this variant embodiment.

Compared with the conductive layer 114 shown in FIG. 4, in the condition that each trace extending pattern 114e provides the membrane actuated force (the Lorentz force) with the same value, the driving current provided to the conductive layer 114 of the membrane 110 shown in FIG. 7 may be approximate ⅙ times of the driving current provided to the conductive layer 114 of the membrane 110 shown in FIG. 4, so as to reduce the power consumption. Moreover, since the driving current used in FIG. 7 is less than the driving current used in FIG. 4, a driving circuit corresponding to the design of FIG. 7 may be simpler and/or smaller than a driving circuit corresponding to the design of FIG. 4; for example, the driving circuit corresponding to the design of FIG. 4 may further include an additional voltage transformer for increasing the current, but not limited thereto.

Moreover, the membrane 110 may be manufactured by any suitable method. In this embodiment, the membrane 110 may be a micro electro mechanical system (MEMS), and the membrane 110 may be manufactured by a suitable MEMS process.

In addition, other suitable actuating means included in or disposed on the membrane 110 is provided to cause the movement of the membrane 110, such that the membrane 110 is actuated for producing the air move volume to generate the air pulse, wherein the actuating means include such as a piezoelectric material, a planar coil or a conducting plate, but not limited thereto. For example, in another embodiment, at least one piezoelectric material layer may be disposed on the flexible membrane substrate 112, and the piezoelectric material layer may actuate the membrane 110 by receiving a driving voltage. In still another embodiment, the conductive layer 114 of the membrane 110 may include a plurality of planar coils, and each of the planar coils may be situated at one of the planar parts 110p. Thus, if the planar coils receive the suitable driving current, each of the planar coils may generate a suitable magnetic field to actuate the membrane 110 (i.e. the membrane 110 may be actuated by the magnetic force). In still another embodiment, the conductive layer 114 of the membrane 110 may include a plurality of conducting plates, and each of the conducting plates may be situated at one of the planar parts 110p. Thus, if the conducting plates receive the suitable driving voltage, each of the conducting plates may generate a suitable electrostatic field to actuate the membrane 110 (i.e. the membrane 110 may be actuated by the electrostatic force).

Figure 8:
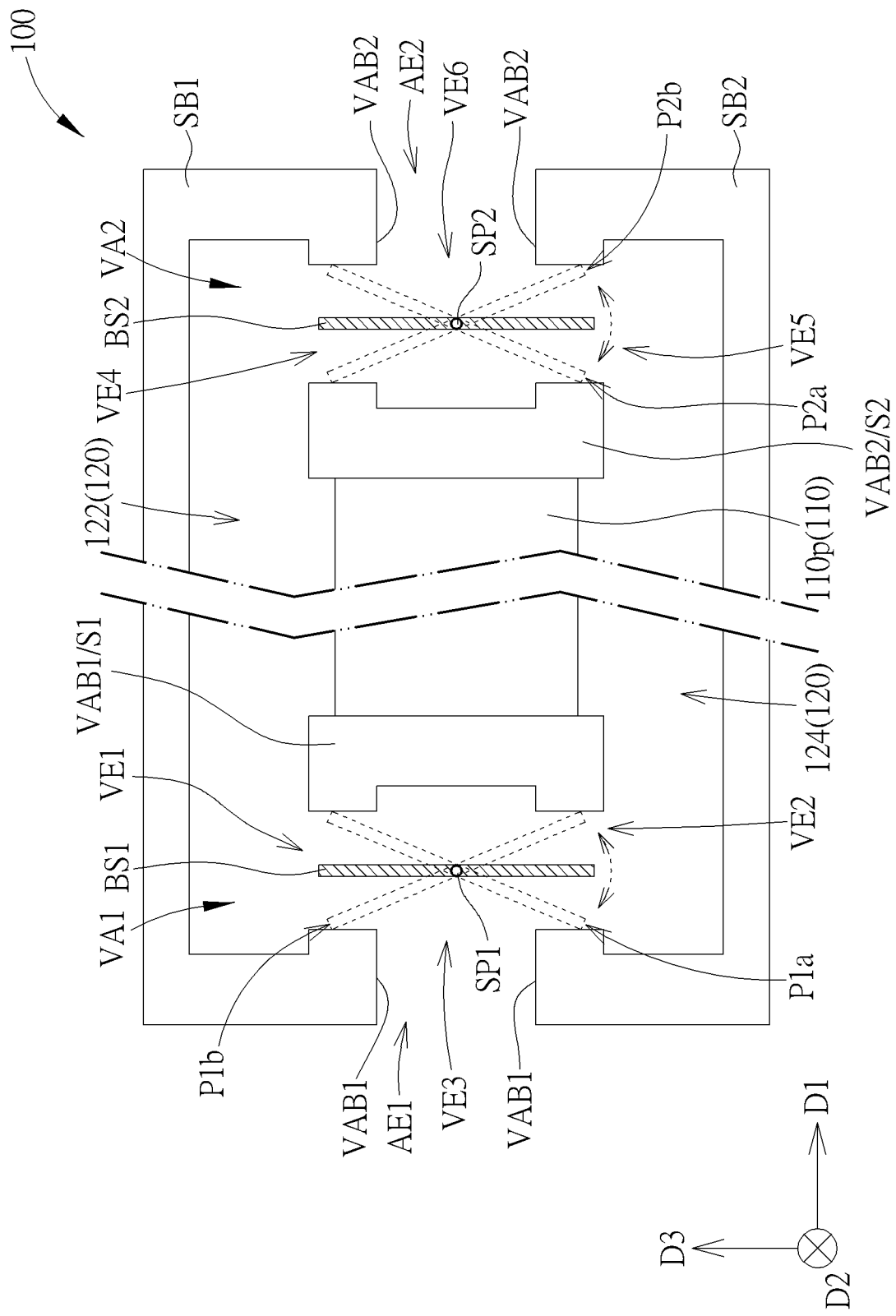
FIG. 8 is a schematic diagram of a cross sectional view of the first valve and the second valve of the air pulse generating element according to the first embodiment of the present invention.
Figure 9:
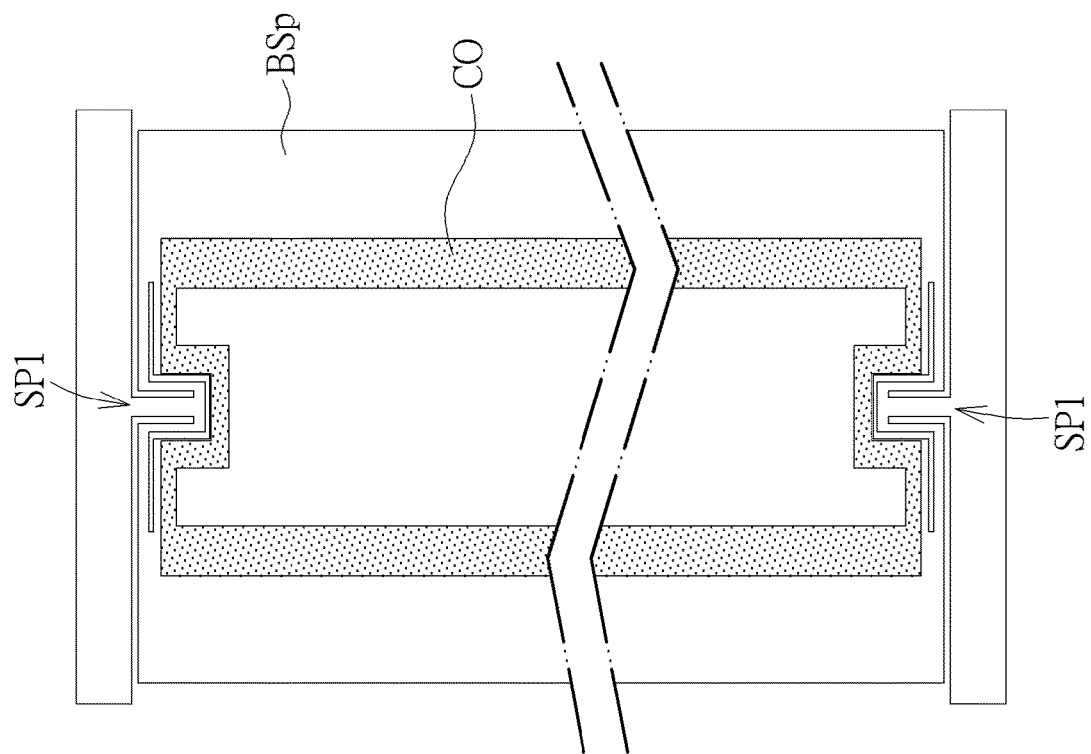
FIG. 9 is a schematic diagram of a top view of the first valve of the air pulse generating element according to the first embodiment of the present invention.
Figure 10:
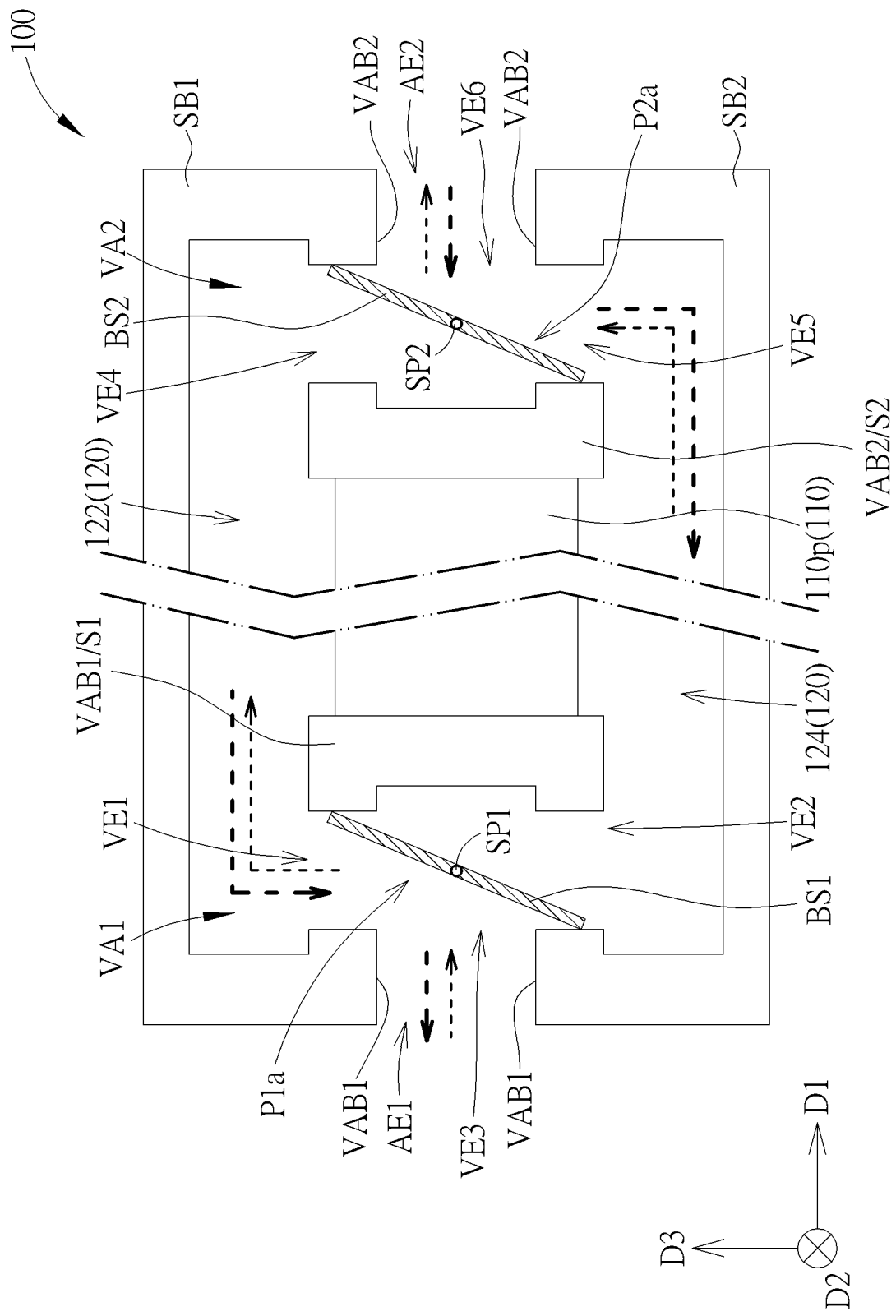
FIG. 10 is a schematic diagram of a cross sectional view of the first valve and the second valve in first path status according to the first embodiment of the present invention.
Figure 11:
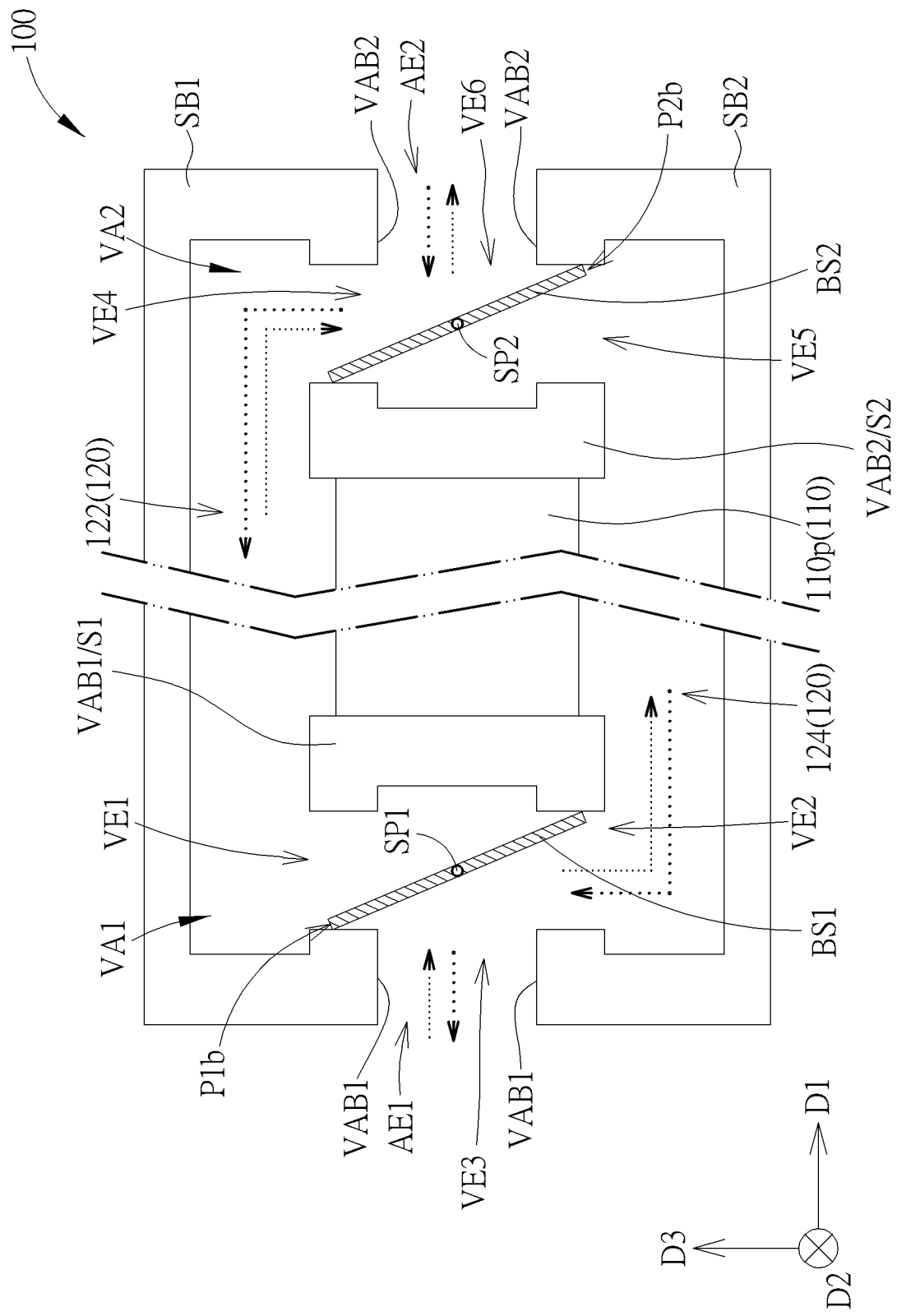
FIG. 11 is a schematic diagram of a cross sectional view of the first valve and the second valve in second path status according to the first embodiment of the present invention.

Referring to FIG. 8 to FIG. 11, FIG. 8 is a schematic diagram of a cross sectional view of the first valve and the second valve of the air pulse generating element according to the first embodiment of the present invention, FIG. 9 is a schematic diagram of a top view of the valve of the air pulse generating element according to the first embodiment of the present invention, FIG. 10 is a schematic diagram of a cross sectional view of the first valve and the second valve in first path status according to the first embodiment of the present invention, and FIG. 11 is a schematic diagram of a cross sectional view of the first valve and the second valve in second path status according to the first embodiment of the present invention, wherein the cross sectional direction of the FIG. 8, FIG. 10, FIG. 11 are the same as the cross sectional direction of the FIG. 3. As shown in FIG. 8 and FIG. 9, the first valve VA1 is configured to control a path of the first airflow according to a first valve control signal provided from the control unit 50, and the second valve VA2 is configured to control a path of the second airflow according to a second valve control signal provided from the control unit 50. In this embodiment, the first valve VA1 may be connected to the first sub-chamber 122, the second sub-chamber 124 and the first air entrance AE1, and the first valve VA1 may control the first airflow corresponding to the air pulse to flow into the first sub-chamber 122 through the first air entrance AE1, to flow into the second sub-chamber 124 through the first air entrance AE1, to flow out of the first sub-chamber 122 through the first air entrance AE1, or to flow out of the second sub-chamber 124 through the first air entrance AE1. Similarly, the second valve VA2 may be connected to the first sub-chamber 122, the second sub-chamber 124 and the second air entrance AE2, and the second valve VA2 may control the second airflow corresponding to the air pulse to flow into the first sub-chamber 122 through the second air entrance AE2, to flow into the second sub-chamber 124 through the second air entrance AE2, to flow out of the first sub-chamber 122 through the second air entrance AE2, or to flow out of the second sub-chamber 124 through the second air entrance AE2.

In detail, the first valve VA1 of this embodiment may include a first valve body VAB1, a first blocking structure BS1 and at least one first supporting structure SP1. The first valve body VAB1 has a first valve entrance VE1 connected to the first sub-chamber 122, a second valve entrance VE2 connected to the second sub-chamber 124 and a third valve entrance VE3 connected to the first air entrance AE1. The first blocking structure BS1 is disposed in the first valve body VAB1, and the first blocking structure BS1 includes a blocking plate BSp (for example, may be a silicon on insulator (SOI) substrate) for changing the path of the first airflow. The first supporting structure SP1 is connected between the first blocking structure BS1 and the first valve body VAB1, such that the first blocking structure BS1 can be supported by the first supporting structure SP1 and the first valve body VAB1. In this case, the first valve body VAB1 may be served as a holding structure to support the first blocking structure BS1 through the first supporting structure SP1. Similarly, the second valve VA2 of this embodiment may include a second valve body VAB2, a second blocking structure BS2 and at least one second supporting structure SP2. The second valve body VAB2 has a fourth valve entrance VE4 connected to the first sub-chamber 122, a fifth valve entrance VE5 connected to the second sub-chamber 124 and a sixth valve entrance VE6 connected to the second air entrance AE2. The second blocking structure BS2 is disposed in the second valve body VAB2, and the second blocking structure BS2 includes a blocking plate BSp for changing the path of the second airflow. The second supporting structure SP2 is connected between the second blocking structure BS2 and the second valve body VAB2, such that the second blocking structure BS2 can be supported by the second supporting structure SP2 and the second valve body VAB2. Note that, in this embodiment, the first spacer S1 may be served as a portion of the first valve body VAB1, and the second spacer S2 may be served as a portion of the second valve body VAB2, but not limited thereto.

In order to make the valves control the airflows, the positions of the blocking structures may be changed by any suitable valve-actuating means included in or disposed on the blocking structures, and the valve-actuating means includes such as a piezoelectric material, a planar coil or a conducting plate. In this embodiment, for the first valve VA1, the first blocking structure BS1 may include a planar coil CO disposed on its blocking plate BSp, and the first valve control signal provided from the control unit 50 to the planar coil CO of the first blocking structure BS1 may be a first valve control current. During the operation of the sound producing device SD, the first valve control current flowing in the planar coil CO and the magnetic field of the sound producing device SD may generate the Lorentz force to actuate the first blocking structure BS1 (i.e. a first valve actuated force actuating the first blocking structure BS1 is the Lorentz force). In this embodiment, the first blocking structure BS1 rotates to change between a position P1$a$ and a position P1$b$ in response to the first valve control current, and the rotating direction of the first blocking structure BS1 is according to a current direction of the first valve control current. Moreover, the planar coil CO may have at least one loop. In FIG. 9, the planar coil CO has one loop for example, but not limited thereto. In another embodiment, the planar coil CO may have eight loops for example, such that the first valve control current flowing in the planar coil CO having eight loops may be approximate ⅛ times of the first valve control current flowing in the planar coil CO having one loop in the condition that two planar coils CO provide the same first valve actuated force. Similarly, for the second valve VA2, the second blocking structure BS2 may include a planar coil CO disposed on the blocking plate BSp, and the second valve control signal provided from the control unit 50 to the planar coil CO of the second blocking structure BS2 may be a second valve control current. During the operation of the sound producing device SD, a second valve actuated force (e.g. Lorentz force) actuating the second blocking structure BS2 may be generated due to the second valve control current and the magnetic field. In this embodiment, the second blocking structure BS2 rotates to change between a position P2$a$ and a position P2$b$ in response to the second valve control current, and the rotating direction of the second blocking structure BS2 is according to a current direction of the second valve control current. In addition, rotation axes of the first valve VA1 and the second valve VA2 are respectively corresponding to the first supporting structure SP1 and the second supporting structure SP2, but not limited thereto.

Specifically, as shown in FIG. 10 and FIG. 11, the first blocking structure BS1 is configured to separate the second valve entrance VE2 from the first valve entrance VE1 and the third valve entrance VE3 in a first path status, and configured to separate the first valve entrance VE1 from the second valve entrance VE2 and the third valve entrance VE3 in a second path status. In this embodiment, the first blocking structure BS1 is capable of rotating to change the valve status from the first path status to the second path status or from the second path status to the first path status. During the first path status of the operation (shown in FIG. 10), the first blocking structure BS1 rotates to reach the position P1$a$, thus to make an air path between the first air entrance AE1 and the first sub-chamber 122 be an open state and make an air path between the first air entrance AE1 and the second sub-chamber 124 be a closed state, such that the first airflow may flow into or flow out of the first sub-chamber 122 through the first air entrance AE1; during the second path status of the operation (shown in FIG. 11), the first blocking structure BS1 rotates to reach the position P1$b$, thus to make the air path between the first air entrance AE1 and the first sub-chamber 122 be a closed state and make the air path between the first air entrance AE1 and the second sub-chamber 124 be an open state, such that the first airflow may flow into or flow out of the second sub-chamber 124 through the first air entrance AE1. Similarly, the second blocking structure BS2 is configured to separate the fourth valve entrance VE4 from the fifth valve entrance VE5 and the sixth valve entrance VE6 in the first path status, and configured to separate the fifth valve entrance VE5 from the fourth valve entrance VE4 and the sixth valve entrance VE6 in the second path status. In this embodiment, during the first path status of the operation (shown in FIG. 10), the second blocking structure BS2 rotates to reach the position P2a, thus to make an air path between the second air entrance AE2 and the first sub-chamber 122 be a closed state and make an air path between the second air entrance AE2 and the second sub-chamber 124 be an open state, such that the second airflow may flow into or flow out of the second sub-chamber 124 through the second air entrance AE2; during the second path status of the operation (shown in FIG. 11), the second blocking structure BS2 rotates to reach the position P2b, thus to make the air path between the second air entrance AE2 and the first sub-chamber 122 be an open state and make the air path between the second air entrance AE2 and the second sub-chamber 124 be a closed state, such that the second airflow may flow into or flow out of the first sub-chamber 122 through the second air entrance AE2. Note that the current directions of the first valve control currents in the first path status and the second path status are opposite, and the current directions of the second valve control currents in the first path status and the second path status are opposite.

As the result of the two operation statuses of the valves, during the first path status, the first blocking structure BS1 and the second blocking structure BS2 respectively rotate to reach the position P1a and the position P2a, such that the first airflow may flow into or flow out of the first sub-chamber 122 through the first air entrance AE1, and the second airflow may flow into or flow out of the second sub-chamber 124 through the second air entrance AE2. Thus, the flowing condition of the first airflow and the second airflow during the first path status may be shown in a dashed arrow of FIG. 10. During the second path status, the first blocking structure BS1 and the second blocking structure BS2 respectively rotate to reach the position P1b and the position P2b, such the first airflow may flow into or flow out of the second sub-chamber 124 through the first air entrance AE1, and the second airflow may flow into or flow out of the first sub-chamber 122 through the second air entrance AE2. Thus, the flowing condition of the first airflow and the second airflow during the second path status may be shown in a dotted arrow of FIG. 11. Furthermore, in this embodiment, because angles which are not 90 degrees exist between the blocking structures BS1-BS2 and the valve bodies VAB1-VAB2, the first airflow and the second airflow may flow smoother. Moreover, in order to make the valves VA1-VA2 change between the first path status and the second path status rapidly, the first blocking structure BS1 and the second blocking structure BS2 may be lightweight, for example, reducing the thickness and/or using material with light weight. In this embodiment, the valves VA1-VA2 shown in FIG. 8 and FIG. 9 may have short response time and lower power consumption.

As can be seen from the above, since the membrane 110 can be actuated to be in two actuating statuses (i.e. the first actuating status and the second actuating status), and the valves VA1-VA2 can have two operation statuses (i.e. the first path status and the second path status), four operation modes of the air pulse generating element 100 are generated and tabulated in following Table 1. In the first actuating status of the membrane 110, since the first air-pressure in the first sub-chamber 122 is increased, and the second air-pressure in the second sub-chamber 124 is decreased, the air in the first sub-chamber 122 is pushed out, and the outside air is pulled in the second sub-chamber 124. In this case, when the valve operation status is the first path status (shown in FIG. 10), the first airflow is generated to flow out of the first sub-chamber 122 through the first air entrance AE1, so as to make the air in the first sub-chamber 122 be pushed out, and the second airflow is generated to flow into the second sub-chamber 124 through the second air entrance AE2, so as to make the outside air be pulled in the second sub-chamber 124, such that a right-to-left air pulse is generated (as shown in coarse dashed arrow of FIG. 10); when the valve operation status is the second path status (shown in FIG. 11), the first airflow is generated to flow into the second sub-chamber 124 through the first air entrance AE1, so as to make the outside air be pulled in the second sub-chamber 124, and the second airflow is generated to flow out of the first sub-chamber 122 through the second air entrance AE2, so as to make the air in the first sub-chamber 122 be pushed out, such that a left-to-right air pulse is generated (as shown in fine dotted arrow of FIG. 11). On the other hand, in the second actuating status of the membrane 110, since the first air-pressure in the first sub-chamber 122 is decreased, and the second air-pressure in the second sub-chamber 124 is increased, the outside air is pulled in the first sub-chamber 122, and the air in the second sub-chamber 124 is pushed out. In this case, when the valve operation status is the first path status (shown in FIG. 10), the first airflow is generated to flow into the first sub-chamber 122 through the first air entrance AE1, so as to make the outside air be pulled in the first sub-chamber 122, and the second airflow is generated to flow out of the second sub-chamber 124 through the second air entrance AE2, so as to make the air in the second sub-chamber 124 be pushed out, such that a left-to-right air pulse is generated (as shown in the fine dashed arrow of FIG. 10); when the valve operation status is the second path status (shown in FIG. 11), the first airflow is generated to flow out of the second sub-chamber 124 through the first air entrance AE1, so as to make the air in the second sub-chamber 124 be pushed out, and the second airflow is generated to flow into the first sub-chamber 122 through the second air entrance AE2, so as to make the outside air be pulled in the first sub-chamber 122, such that a right-to-left air pulse is generated (as shown in coarse dotted arrow of FIG. 11).

TABLE 1

Four operation modes of the air pulse generating element

| | Valve status | |
|---|---|---|
| Membrane status | First path status | Second path status |
| First actuating status | Right-to-left air pulse | Left-to-right air pulse |
| Second actuating status | Left-to-right air pulse | Right-to-left air pulse |

In the present invention, the membrane status and the valve status may determine a polarity/direction of the air pulse within one pulse cycle. In other words, the air pulse within one pulse cycle may be a positive pulse (denoted as a "+" state), a negative pulse (denoted as a "−" state) or a null pulse (denoted as a "0" state), and the polarity/direction of the air pulse may be controlled by the membrane status and the valve status. The flowing direction of the positive pulse is opposite to the flowing direction of the negative pulse. Thus, the flowing direction of the first airflow corresponding to the positive pulse and the flowing direction of the first airflow corresponding to the negative pulse are opposite based on the first air entrance AE1, and the flowing direction of the second airflow corresponding to the positive pulse and the flowing direction of the second airflow corresponding to the negative pulse are opposite based on the second air entrance AE2. Then, the first airflow and the second airflow corresponding to the null pulse have no air mass velocity. In this embodiment, the right-to-left air pulse is defined as the positive pulse, and the left-to-right air pulse is defined as the negative pulse, but not limited thereto.

In addition, the polarity/direction of the air pulse generated within the current pulse cycle may be independent of the polarity/direction of the air pulse generated within the previous pulse cycle. For example, if the membrane status is the first actuating status and the valve status is the first path status for generating a positive pulse (a right-to-left air pulse) within the previous pulse cycle, the air pulse generating element 100 within the current pulse cycle may generate a positive pulse (a right-to-left air pulse) by controlling the membrane status to be the second actuating status and the valve status to be the second path status, or the air pulse generating element 100 within the current pulse cycle may generate a negative pulse (a left-to-right air pulse) by controlling the membrane status to be the second actuating status and the valve status to be the first path status. Similarly, if the membrane status is the second actuating status and the valve status is the first path status for generating a negative pulse (a left-to-right air pulse) within the previous pulse cycle, the air pulse generating element 100 within the current pulse cycle may generate a positive pulse (a right-to-left air pulse) by controlling the membrane status to be the first actuating status and the valve status to be the first path status, or the air pulse generating element 100 within the current pulse cycle may generate a negative pulse (a left-to-right air pulse) by controlling the membrane status to be the first actuating status and the valve status to be the second path status. In other words, the air pulse generating element 100 may arbitrarily generate a positive pulse, a negative pulse, or even a null pulse, regardless of the polarity/direction of the air pulse within the previous pulse cycle. That is, the polarity/direction of the air pulse corresponding to the current pulse cycle is independent of the polarity/direction of the air pulse corresponding to the previous pulse cycle. Note that, in this embodiment, the operation mode within the previous pulse cycle may be different from the operation mode within the current pulse cycle, but not limited thereto.

In another embodiment, the sound producing device SD may include a plurality of the air pulse generating elements 100, the polarity/direction of the air pulse generated by each air pulse generating element 100 may be controlled respectively, and a SPL of a compositing air pulse of the sound producing device SD may be combined by all air pulses generated by the air pulse generating elements 100. For example, if some air pulse generating elements 100 generate positive pulses, and others generate negative pulses, the compositing air pulse may be generated by offsetting the sum of the positive pulses by the sum of the negative pulses.

Figure 12:
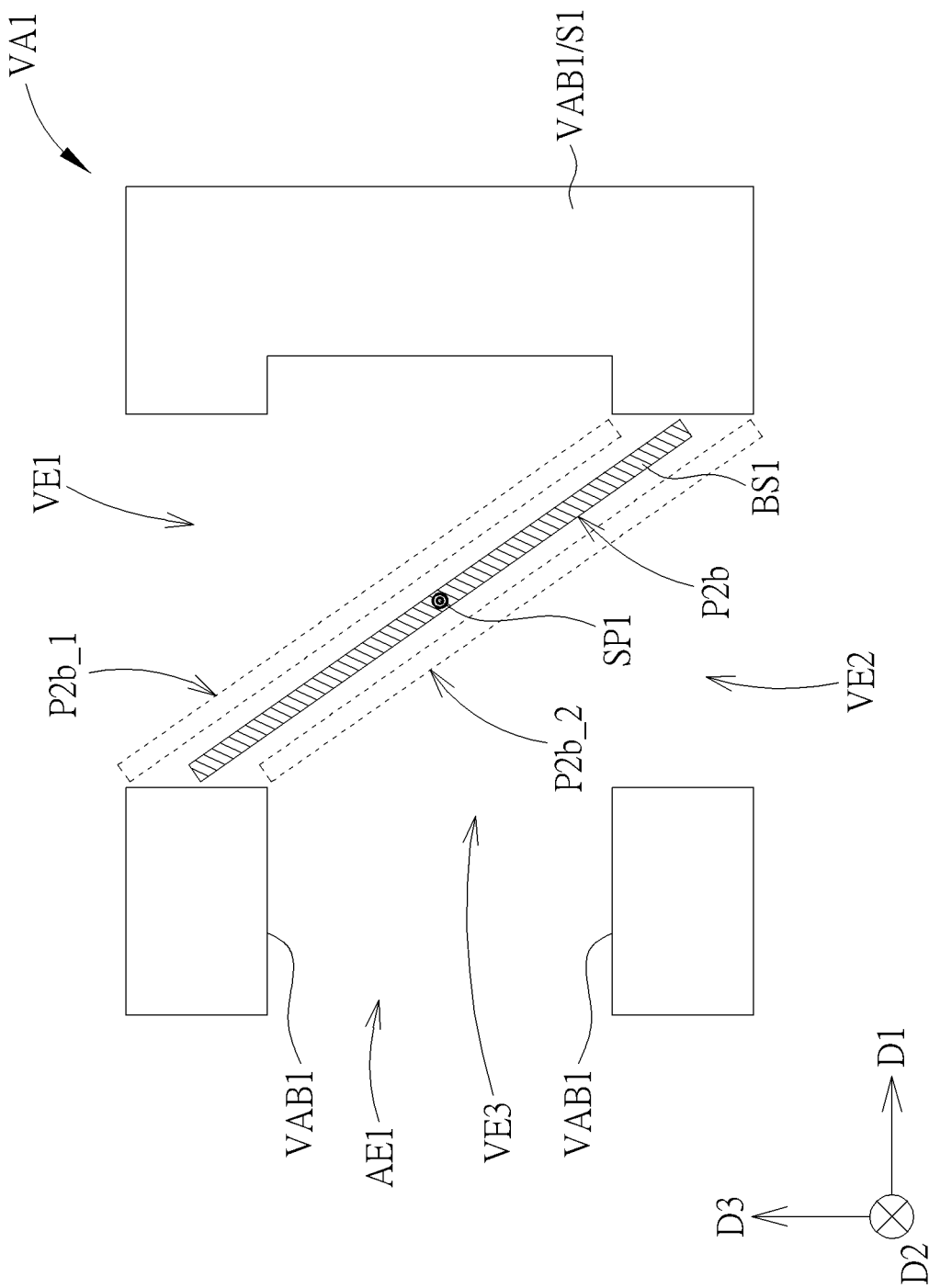
FIG. 12 is a schematic diagram of a cross sectional view of the first valve of the air pulse generating element in the second path status according to the first embodiment of the present invention.

Referring to FIG. 12, and further referring to FIG. 9, FIG. 12 is a schematic diagram of a cross sectional view of the first valve of the air pulse generating element in the second path status according to the first embodiment of the present invention. As shown in FIG. 9 and FIG. 12, the supporting structures SP1-SP2 of this embodiment are deformable, but not limited thereto. In FIG. 12, the valve status is the second path status for example. The first air-pressure of the first sub-chamber 122 and the second air-pressure of the second sub-chamber 124 may provide a resulting pressure applying on the first blocking structure BS1 of the first valve VA1. In this embodiment, if the resulting pressure is higher in the second path status, the resulting pressure may cause the deformation of the first supporting structure SP1 because the first supporting structure SP1 is deformable, such that at least a portion of the first blocking structure BS1 has a displacement. In this embodiment, the entire first blocking structure BS1 has a displacement due to the deformation of the first supporting structure SP1 and the higher resulting pressure. In FIG. 12, two deformation situations P2$b$_1-P2$b$_2 based on the direction of the resulting pressure are shown. When the deformation of the first supporting structure SP1 occurs in the second path status, the deformation may reinforce the closed state of the air path between the first air entrance AE1 and the first sub-chamber 122. Also, the deformation of the first supporting structure SP1 also occurs in the first path status, such that the deformation may reinforce the closed state of the air path between the first air entrance AE1 and the second sub-chamber 124. Similarly, the deformation also occurs at the second supporting structure SP2 of the second valve VA2 when the resulting pressure is higher. Since the deformation situation of the second supporting structure SP2 is similar to the first supporting structure SP1, this will not be redundantly described. In addition, according to another embodiment, the supporting structures SP1-SP2 of this embodiment may not be deformable.

Moreover, the valves VA1-VA2 may be manufactured by any suitable method. In this embodiment, the blocking structures BS1-BS2, the supporting structures SP1-SP2 and/or other suitable structures of the valves VA1-VA2 may be a MEMS structure, and these structures may be manufactured by a suitable MEMS process.

Figure 13:
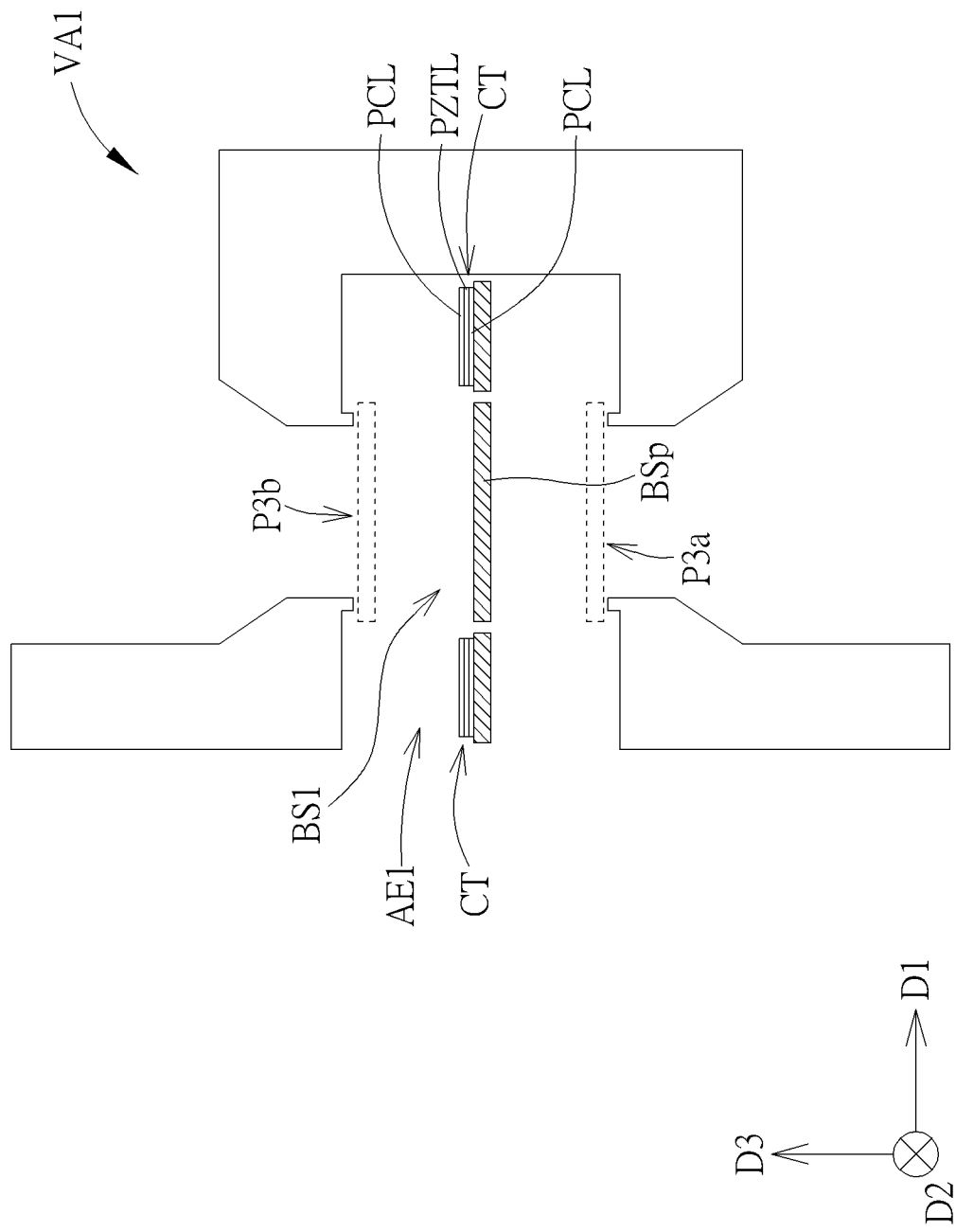
FIG. 13 is a schematic diagram of a cross sectional view of the first valve of the air pulse generating element according to a variant embodiment of the first embodiment of the present invention.

Referring to FIG. 13, FIG. 13 is a schematic diagram of a cross sectional view of the first valve of the air pulse generating element according to a variant embodiment of the first embodiment of the present invention. According to the present invention, the valve of a variant embodiment is provided. As shown in FIG. 13, the first blocking structure BS1 of the first valve VA1 of this variant embodiment further has at least one cantilever CT connected to the first blocking plate BSp, and the first blocking structure BS1 includes two valve conductive layers PCL disposed on the cantilever CT and a piezoelectric layer PZTL sandwiched the two valve conductive layers PCL. The piezoelectric layer PZTL may receive the first valve control signal through the valve conductive layers PCL, so as to actuate the first blocking plate BSp. In FIG. 13, the first blocking plate BSp may be situated a position P3$a$ in the first path status, and may be situated a position P3$b$ in the second path status. Also, the second blocking structure BS2 of the second valve VA2 of this variant embodiment may be similar to the first blocking structure BS1, and thus, this will not be redundantly described.

Moreover, in another embodiment, the air pulse generating element 100 may further include more valves. For example, the air pulse generating element 100 may further include a third valve and a fourth valve, the third valve is disposed between the first air entrance AE1 and the membrane 110 and configured to control the path of the first airflow, and the fourth valve is disposed between the second air entrance AE2 and the membrane 110 and configured to control the path of the second airflow. The first valve is connected to the first sub-chamber 122 and the first air entrance AE1, the second valve is connected to the first sub-chamber 122 and the second air entrance AE2, the third valve is connected to the second sub-chamber 124 and the first air entrance AE1, and the fourth valve is connected to the second sub-chamber 124 and the second air entrance AE2. In this case, the first valve and the third valve control the air path of the first airflow, and the second valve and the fourth valve control the air path of the second airflow. For example, if the first valve and fourth valve are in the open state, and the second valve and third valve are in the closed state, the valve status is the first path status; if the first valve and fourth valve are in the closed state, and the second valve and third valve are in the open state, the valve status is the second path status.

Figure 14:
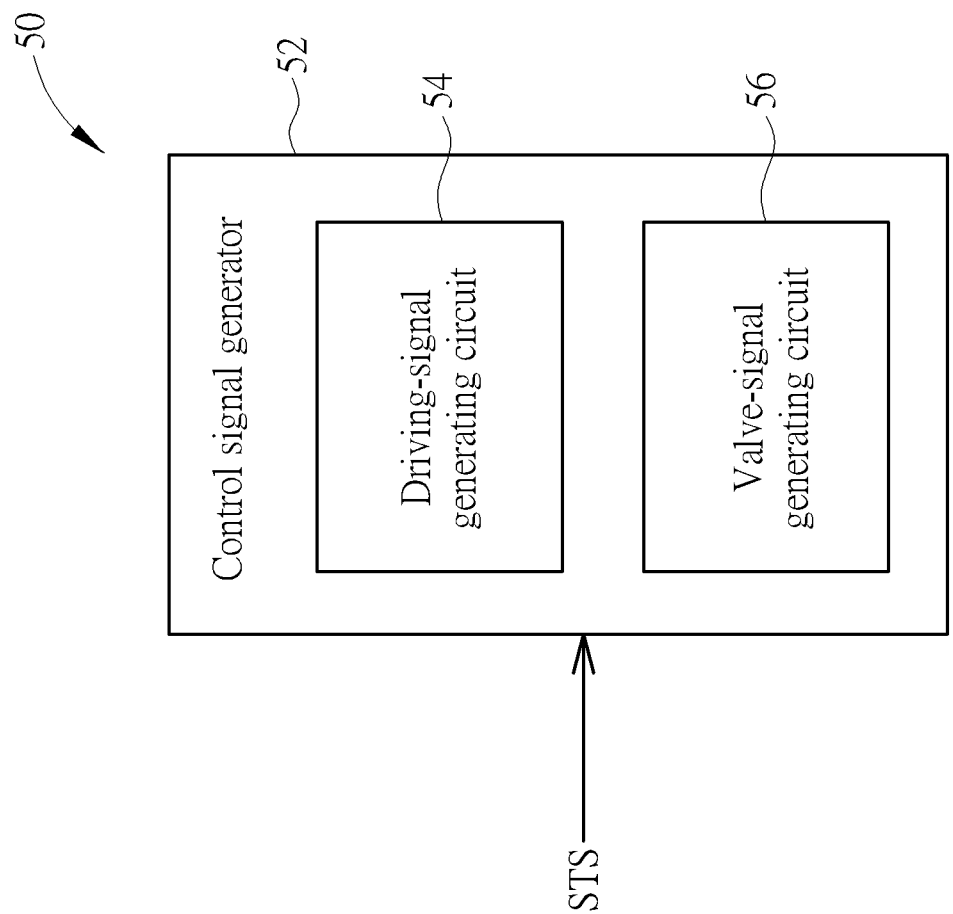
FIG. 14 is a schematic diagram of a control unit of the sound producing device according to the first embodiment of the present invention.
Figure 15:
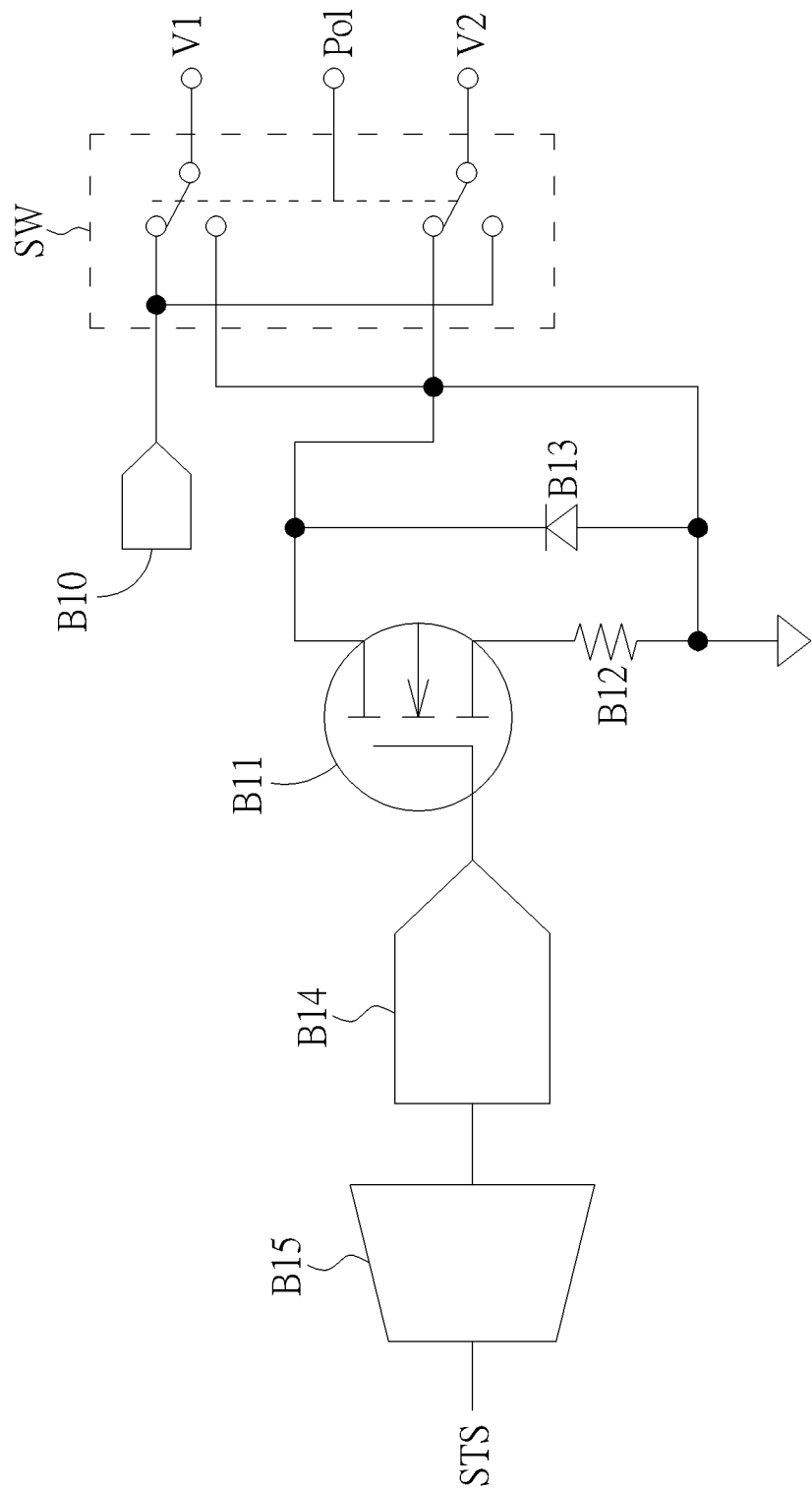
FIG. 15 is a schematic diagram of a driving-signal generating circuit in the control unit according to the first embodiment of the present invention.

Referring to FIG. 14 and FIG. 15, FIG. 14 is a schematic diagram of a control unit of the sound producing device according to the first embodiment of the present invention, and FIG. 15 is a schematic diagram of a driving-signal generating circuit in the control unit according to the first embodiment of the present invention. As shown in FIG. 14, the control unit 50 of this embodiment includes a control signal generator 52 configured to generate at least one driving signal and at least one valve control signal according to one of time-samples STS of the sound signal, wherein the control signal generator 52 may include a driving-signal generating circuit 54 configured to generate the at least one driving signal and a valve-signal generating circuit 56 configured to generate the at least one valve control signal. In addition, the control unit 50 may further include any other suitable component. Note that, the time-sample STS of the sound signal may include a magnitude and a sign, and may be represented by a plurality of bits in the binary system, and the bit depth may be design based on the audio quality or other requirements, such as 24-bit, 16-bit or any other suitable bit depth. For instance, the sound signal may be sampled at 96 ksps (i.e. the sound signal in 10.4 S may be represented by one time-sample STS), and the time-sample STS may be represented by 24-bit, wherein 1 bit represents the sign of the time-sample STS, and 23 bits represent the magnitude of the time-sample STS, but not limited thereto. Note that the magnitude of the time-sample STS is related to the magnitude of the SPL (or the air move volume) of the air pulse, and the sign of the time-sample STS is related to the polarity/direction of the air pulse. In this embodiment, regarding one time-sample STS of the sound signal, since the sound producing device SD of this embodiment only has one air pulse generating element 100 having the first valve VA1 and the second valve VA2, the driving-signal generating circuit 54 may generate one driving signal to the membrane 110, and the valve-signal generating circuit 56 may generate two valve control signals (i.e. the first valve control signal and the second valve control signal) to the first valve VA1 and the second valve VA2 respectively. Furthermore, since the structure of the air pulse generating element 100 of this embodiment is shown in FIG. 1 to FIG. 4, the driving-signal generating circuit 54 may be referred as a driving-current generating circuit to provide the driving current served as the driving signal, but not limited thereto. In another embodiment, if the membrane 110 is actuated by any other suitable means, the driving-signal generating circuit 54 may provide the driving current, the driving voltage or any other suitable driving signal. Moreover, the valves may use the structure shown in FIG. 8 or FIG. 13, or the valves may be any other suitable structure, the valve control signal may be the valve control current, the valve control voltage or any other suitable valve control signal. In this embodiment, the valves may use the structure shown in FIG. 8, the valve-signal generating circuit 56 may be referred as a valve-current generating circuit to provide the valve control current served as the valve control signal, but not limited thereto.

As shown in FIG. 15, an example of the driving-signal generating circuit 54 providing the driving current is shown, but the driving-signal generating circuit 54 is not limited thereto, and any other suitable circuit may be served as the driving-signal generating circuit 54 according to the type of the driving signal and the type of the air pulse generating element 100. In this embodiment, the driving-signal generating circuit 54 may include a power source B10, a switching component B11 (such as a transistor), a resistor B12, a diode B13, a digital to analog converter (DAC) B14, a mapping component B15 and a current direction switching element SW, but not limited thereto. The driving-signal generating circuit 54 may further include any other suitable component. Note that nodes V1, V2 are electrically connected to the conductive layer 114 of the membrane 110 (i.e. the nodes V1, V2 are electrically connected to the connected ends CE of the conductive layer 114 of the membrane 110 respectively, shown in FIG. 4 or FIG. 7).

In this embodiment, a magnitude of the driving current provided from the power source B10 may be controlled by a voltage difference between a gate and a source (i.e. $V_{GS}$) of the switching component B11, and a flowing direction of the driving current in the membrane 110 may be controlled by the current direction switching element SW. Regarding the magnitude of the driving current, since the magnitude of the driving current is depending on the time-sample STS of the sound signal, and the magnitude of the driving current is related to the square the voltage difference $V_{GS}$ of the switching component B11 (i.e. $I_D \propto (V_{GS} - V_{th})^2$ (eq-6), wherein $I_D$ is current flowing through the switching component B11, $V_{th}$ is a threshold voltage of the switching component B11), if the digital time-samples STS of the sound signals are directly converted as analog gate voltages, some of these gate voltages cannot be corresponding to the demand driving currents. Therefore, the digital time-sample STS of the sound signal need to be transformed to a suitable analog voltage before transmitting to the gate of the switching component B11. In this embodiment, the time-sample STS of the sound signal may be transformed by the mapping component B15 and the digital to analog converter B14 electrically connected between the switching component B11 and the mapping component B15. In detail, when the time-sample STS of the sound signal is transmitted to the mapping component B15, the bits representing the magnitude of the time-sample STS (i.e. 23 bits in this embodiment) may be transformed to one or more mapping-sample(s) with another bit depth, and the represented magnitude of the time-sample STS may be the same as or different from the represented magnitude(s) of the transformed mapping-sample(s). Note that, the mapping component B15 can compensate for the non-linearity property between the $V_{GS}$ and the driving current ($I_D$) of the switching component B11 (according to the eq-6) by above transforming, such that the driving current ($I_D$) can be proportional to the time-sample STS. Then, the digital to analog converter B14 may convert the digital mapping-sample(s) to gate voltage(s), such that the gate voltage(s) may be corresponding to the demand driving current(s).

On the other hand, regarding the flowing direction of the driving current in the membrane 110, the current direction switching element SW may be controlled by signals provided from a node Pol. In this embodiment, if the node Pol provides a first polarity signal (e.g. positive signal), the driving current may flow through the power source B10, the node V1, the membrane 110 and the node V2 in sequence, so as to make the membrane status be the first actuating status; if the node Pol provides a second polarity signal (e.g. negative signal), the driving current may flow through the power source B10, the node V2, the membrane 110 and the node V1 in sequence, so as to make the membrane status be the second actuating status.

Regarding the valve control signals provided from the valve-signal generating circuit 56, the first valve control signal is applied on the first valve VA1, the second valve control signal is applied on the second valve VA2, but the applied method of these valve control signals is not limited. As an example, the valve-signal generating circuit 56 may respectively generate the first valve control signal and the second valve control signal, and these valve control signals may be respectively applied on the first valve VA1 and the second valve VA2 through different trace. As another example, if the first valve control signal and the second valve control signal are the same, the first valve control signal and the second valve control signal may be generate simultaneously, and these valve control signals may be respectively applied on the first valve VA1 and the second valve VA2 through different trace (the first valve VA1 and the second valve VA2 are connected in parallel). As another example, the valve-signal generating circuit 56 may generate a valve control signal which is applied on the first valve VA1 and the second valve VA2 in sequence (the first valve VA1 and the second valve VA2 are connected in series), wherein this valve control signal is served as the first valve control signal when applied on the first valve VA1, and this valve control signal is served as the second valve control signal when applied on the second valve VA2.

Figure 16:
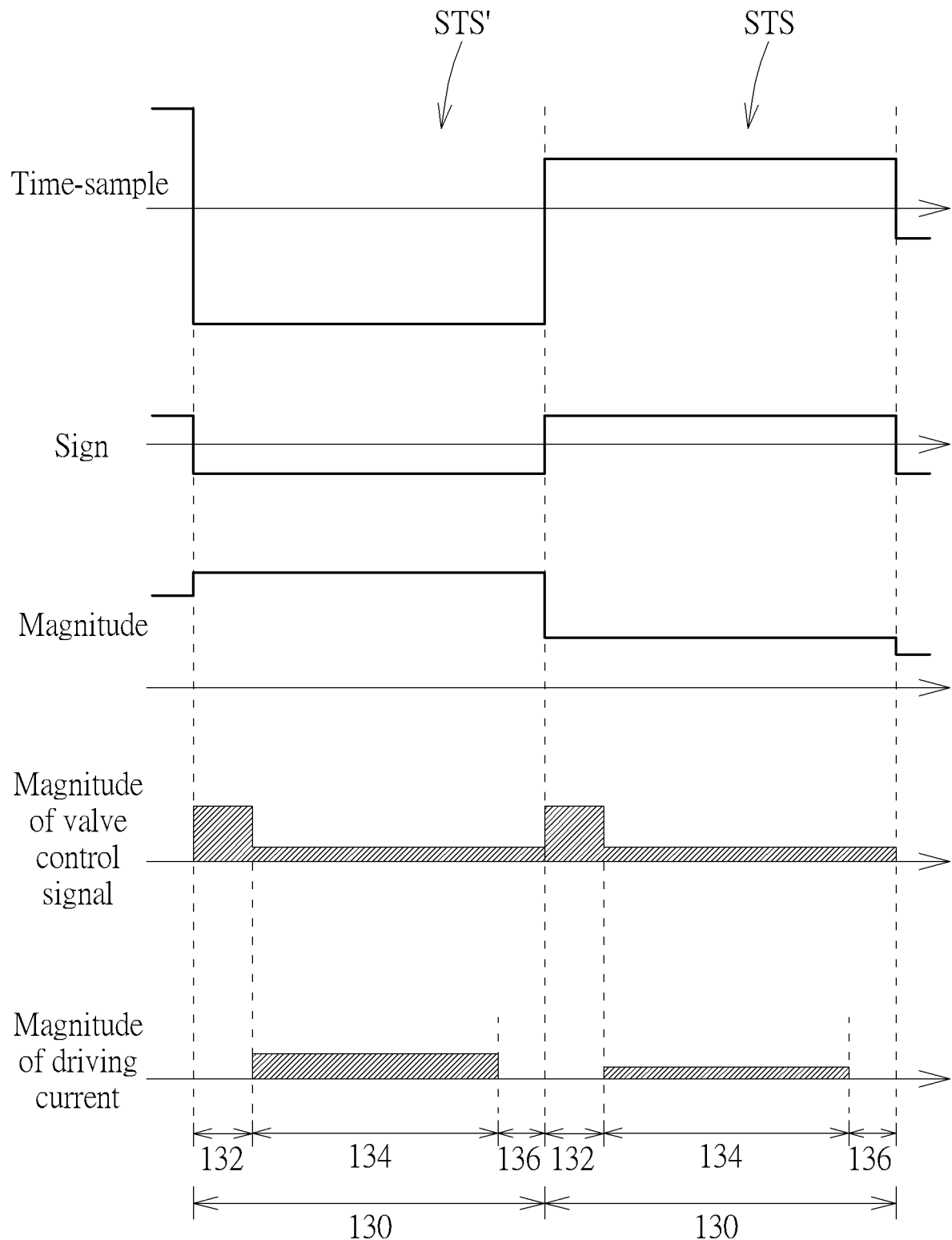
FIG. 16 is a schematic diagram of time-samples, magnitudes of valve control signals and magnitudes of driving currents according to an embodiment of the present invention.
Figure 17:
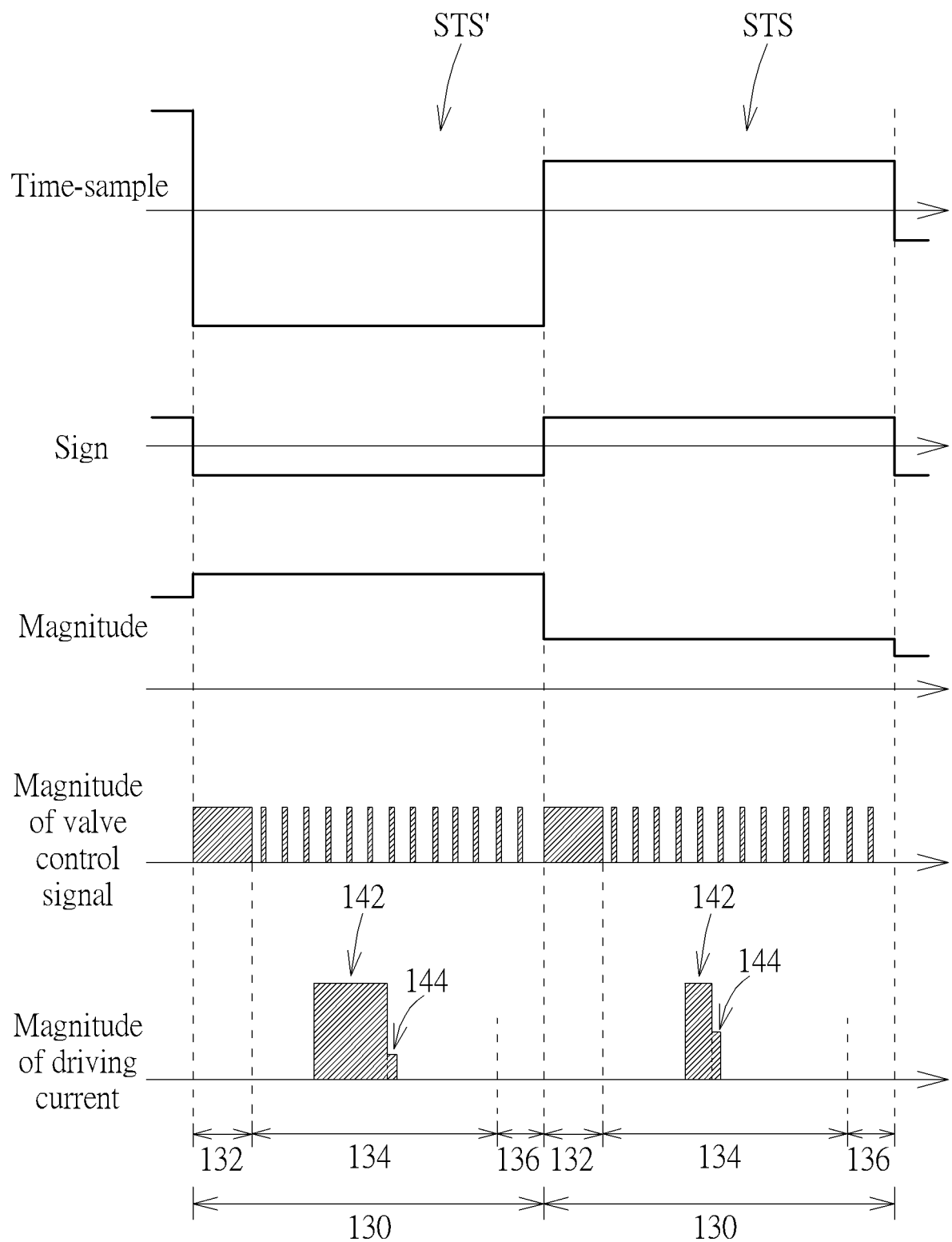
FIG. 17 is a schematic diagram of time-samples, valve control signals and driving currents according to another embodiment of the present invention.

The valve control signals provided from the valve-signal generating circuit 56 and the signals provided from a node Pol may be determined according to the sign of current time-sample STS and the operation mode within the previous pulse cycle, such that the polarity of the current air pulse wanted to be generated can be corresponding to the current time-sample STS, but not limited thereto. As shown in FIG. 16 and FIG. 17, an example having the current time-sample STS and the previous time-sample STS' is shown, wherein the sign of the previous time-sample STS' is negative, and the sign of the current time-sample STS is positive. As an example, if the membrane status within the previous pulse cycle is the first actuating status (the node Pol provides the first polarity signal) and the valve status within the previous pulse cycle is the second path status for making the previous air pulse be a negative pulse, the node Pol within the current pulse cycle provides the second polarity signal to make the membrane status be the second actuating status, and the valve-signal generating circuit 56 makes the valve status within the current pulse cycle be the second path status, such that the current air pulse is generated as a positive pulse, but not limited thereto.

In the present invention, the driving current provided from the driving-signal generating circuit 54 may be generated according to an amplitude modulation (AM), a pulse width modulation (PWM) or a combination thereof, and the valve control signal provided from the valve-signal generating circuit 56 may be generated according to another suitable method. In FIG. 16 and FIG. 17, two types of driving currents and two types of valve control signals are shown, wherein FIG. 16 and FIG. 17 only show the magnitudes of the driving currents and the magnitudes of the valve control signals. Note that, as an example, the valves use the structures shown in FIG. 8, and thus, the valve control signals of FIG. 16 and FIG. 17 are valve control currents, but not limited thereto. In FIG. 16 and FIG. 17, one pulse cycle 130 of this embodiment may be divided in three time segments, which are a valve-changing time segment 132, a membrane-driving time segment 134 and a pulse-propagating time segment 136 in sequence, but not limited thereto. Specifically, the valve status may be controlled for changing the valve status or maintaining the valve status during the valve-changing time segment 132, the driving current flows in the membrane 110 to generate the air pulse during the membrane-driving time segment 134, and the air pulse propagates to the outside of the air pulse generating element 100 during the pulse-propagating time segment 136. The pressure difference between the first air-pressure in the first sub-chamber 122 and the second air-pressure in the second sub-chamber 124 may be generated during the membrane-driving time segment 134, and the first air-pressure and the second air-pressure may be substantially the same at the end of the pulse-propagating time segment 136. Furthermore, the driving current of this embodiment may only flow in the membrane 110 during the membrane-driving time segment 134, and may not flow in the membrane 110 during the valve-changing time segment 132 and/or the pulse-propagating time segment 136, but not limited thereto. In addition, a length of the valve-changing time segment 132 may be determined by the design of valve, such as the mass of the blocking structure, traveling distance of the blocking structure, the stiffness of the blocking structure and the strength of the driving signal; a length of the pulse-propagating time segment 136 may be determined by such as the mass density and the length of the membrane 110, but not limited thereto.

As shown in FIG. 16, the driving current provided from the driving-signal generating circuit 54 may be generated according to the amplitude modulation. In FIG. 16, the magnitudes of the driving currents may be proportional to the magnitudes of the corresponding time-samples STS. In this embodiment, the driving-signal generating circuit 54 may continuously provide the driving current during the full membrane-driving time segment 134, such that the membrane 110 is actuated during the full membrane-driving time segment 134, but not limited thereto. As an example, because the time-sample STS of this embodiment may be represented by 24-bit (1 bit represents the sign of the time-sample STS, and 23 bits represent the magnitude of the time-sample STS), in the driving-signal generating circuit 54 shown in FIG. 15, the mapping component B15 may be a 23-bit to 24-bit mapper configured to convert 23 bits representing the magnitude of the time-sample STS as 24 bits, the digital to analog converter B14 may be a 24-bit DAC configured to convert the digital 24 bits provided from the mapping component B15 to an analog gate voltage, but not limited thereto. Thus, the suitable gate voltage may be generated, such that the magnitude of the driving current may be corresponding to the magnitude the time-sample STS. Note that, the cost of the driving-signal generating circuit 54 is enhanced as the bit depth is increased.

On the other hand, in FIG. 16, the valve control signal may be continuously applied on the valve during the full pulse cycle 130, wherein the valve control signal applied during the valve-changing time segment 132 is configured to change the valve status or maintain the valve status, and the valve control signal applied during the membrane-driving time segment 134 and the pulse-propagating time segment 136 is configured to maintain the valve status. For example, the magnitude of the valve control signal during the valve-changing time segment 132 is greater than the magnitude of the valve control signal during the membrane-driving time segment 134 and the pulse-propagating time segment 136, but not limited thereto.

As shown in FIG. 17, the driving current provided from the driving-signal generating circuit 54 may be generated according to a combination of the amplitude modulation and the pulse width modulation. In detail, the membrane-driving time segment 134 may be divided into a plurality of portions, and the driving current may be provided within one or more portion(s) of the membrane-driving time segment 134 if the magnitude of the time-sample STS is greater than 0, wherein the number of the portion(s) where the driving current is provided may be determined by the magnitude of the current time-sample STS, and this number is increased as the magnitude of the current time-sample STS is enhanced. That is to say, the magnitude of the time-sample STS may be related to the driving time of the driving current (i.e. actuating time of the membrane 110), and the membrane 110 may be actuated by the driving current during the full or partial membrane-driving time segment 134 based on the magnitude of the time-sample STS. Also, the magnitude of the time-sample STS is proportional to the sum of the magnitudes of the driving currents in each of the portions in one membrane-driving time segment 134. Specifically, each driving current in this generating method may include a PWM-part 142 and/or an AM-part 144 according to the magnitude of the current time-sample STS, wherein the magnitude of the PWM-part 142 of the driving current may be a predetermined value, and the magnitude of the AM-part 144 of the driving current may be proportional to the magnitude of at least a portion of the time-sample STS. If the PWM-part 142 exists in the driving current, the PWM-part 142 may be corresponding to at least one of the portions of the membrane-driving time segment 134; if the AM-part 144 exists in the driving current, the AM-part 144 may be corresponding to at least one of the portions in the membrane-driving time segment 134. In this embodiment, the PWM-part 142 and the AM-part 144 of the driving current may be provided in sequence if the PWM-part 142 and the AM-part 144 exist in the driving current, but not limited thereto. Moreover, the time-sample STS needs to be divided to two parts according to the number of the portions in the membrane-driving time segment 134.

As an example, in a design, the membrane-driving time segment 134 may be divided into 1024 portions, wherein the PWM-part 142 may be corresponding to 1-1023 portion(s) if the PWM-part 142 exists in the driving current, and the AM-part 144 of the driving current may be corresponding to the one portion if the AM-part 144 exists in the driving current. Then, because the time-sample STS of this embodiment may be represented by 24-bit (1 bit represents the sign of the time-sample STS, and 23 bits represent the magnitude of the time-sample STS), and the membrane-driving time segment 134 is divided into 1024 portions, the 23 bits representing the magnitude may be divided to a 10-bit-part and a 13-bit-part, wherein 10-bit-part includes $1^{st}$-$10^{th}$ bits, and the 13-bit-part includes $11^{th}$-$23^{rd}$ bits (the $23^{rd}$ bit is the least significant bit (LSB) of the time-sample STS). Regarding the driving current, the 10-bit-part is related to the PWM-part 142 of the driving current, and the 13-bit-part is related to the AM-part 144 of the driving current. If the magnitude of the 10-bit-part is greater than 0, the PWM-part 142 exists in the driving current, and the number of the portion(s) in the membrane-driving time segment 134 corresponding to the PWM-part 142 is proportional to the magnitude of the 10-bit-part. If the magnitude of the 13-bit-part is greater than 0, the AM-part 144 exists in the driving current, and the magnitude of the AM-part 144 is proportional to the magnitude of the 13-bit-part. For instance, if the magnitude of the 10-bit-part is 511 (i.e. the 10-bit-part is 0111111111), and the magnitude of the 13-bit-part is 256 (i.e. the 13-bit-part is 0000100000000 and the 23 bits representing the magnitude of the time-sample STS is 01111111110000100000000), the PWM-part 142 of the driving current is corresponding to 511 portions in the membrane-driving time segment 134, and a ratio of the magnitude of the AM-part 144 of the driving current to the magnitude of the PWM-part 142 of the driving current is $256/2^{13}-1$, as shown in the previous time-sample STS' of FIG. 17. For another instance, if the magnitude of the 10-bit-part is 127 (i.e. the 10-bit-part is 0001111111), and the magnitude of the 13-bit-part is 4094 (i.e. the 13-bit-part is 0111111111110 and the 23 bits representing the magnitude of the time-sample STS is 00011111110111111111110), the PWM-part 142 of the driving current is corresponding to 127 portions in the membrane-driving time segment 134, and a ratio of the magnitude of the AM-part 144 of the driving current to the magnitude of the PWM-part 142 of the driving current is $4094/2^{13}-1$, as shown in the current time-sample STS of FIG. 17. Thus, in FIG. 17, the driving time of the driving current corresponding to the previous time-sample STS' is longer than the driving time of the driving current corresponding to the current time-sample STS.

For another instance, if the magnitude of the 10-bit-part is 127, and the magnitude of the 13-bit-part is 0 (i.e. 23 bits representing the magnitude of the time-sample STS is 00011111110000000000000), the driving current only includes the PWM-part 142, and the PWM-part 142 of the driving current is corresponding to 127 portions in the membrane-driving time segment 134. For another instance, if the magnitude of the 10-bit-part is 0, and the magnitude of the 13-bit-part is 4094 (i.e. 23 bits representing the magnitude of the time-sample STS is 00000000000111111111110), the driving current only includes the AM-part 144, and a ratio of the magnitude of the AM-part 144 of the driving current to the magnitude of the above PWM-part 142 is $4094/2^{13}-1$. Particularly, since the magnitude of the PWM-part 142 of the driving current is a predetermined value, this predetermined value may be design for making the switching component B11 be controlled to turn on totally, such that the driving-signal generating circuit 54 may be used efficiently.

In order to achieve the above design, in the driving-signal generating circuit 54 shown in FIG. 15, the mapping component B15 may include a time-sample adjusting unit and a 13-bit to 14-bit mapper, and the digital to analog converter B14 may be a 14-bit DAC. The time-sample adjusting unit may be configured to adjust the bits representing the magnitude of the time-sample STS, so as to transmit the suitable adjusting bits to the 13-bit to 14-bit mapper. For example, in an adjusting method of the time-sample adjusting unit, if the magnitude of the 10-bit-part is greater than 0, the time-sample adjusting unit provides the 13 bits with a greatest magnitude (i.e. 1111111111111) for the 13-bit to 14-bit mapper, 1 is subtracted from the magnitude of 10-bit-part, and this judgment repeats until that the magnitude of the 10-bit-part is equal to 0; if the magnitude of the 10-bit-part is equal to 0, the time-sample adjusting unit provides the 13-bit-part of the time-sample STS for the 13-bit to 14-bit mapper, but adjusting method of the time-sample adjusting unit is not limited thereto. The 13-bit to 14-bit mapper is configured to convert 13 bits as suitable 14 bits. The digital to analog converter B14 is configured to convert the digital 14 bits provided from the mapping component B15 to an analog signal (i.e. the gate voltage), but not limited thereto. Compared with the driving-signal generating circuit 54 used in the pure amplitude modulation, the driving-signal generating circuit 54 used in the combination of the amplitude modulation and the pulse width modulation may utilize the digital to analog converter B14 with a lower resolution (e.g. 14-bit) for providing a high resolution time-sample STS (e.g. 24-bit), and the cost of the driving-signal generating circuit 54 used in the combination of the amplitude modulation and the pulse width modulation is reduced because the required resolution of the digital to analog converter B14 is reduced (for instance, from 24-bit to 14-bit).

On the other hand, in FIG. 17, the valve control signal may be continuously applied on the valve during the full valve-changing time segment 132, and the valve control signal may be intermittently applied on the valve during the membrane-driving time segment 134 and the pulse-propagating time segment 136, wherein the valve control signal applied during the valve-changing time segment 132 is configured to change the valve status or maintain the valve status, and the valve control signal applied during the membrane-driving time segment 134 and the pulse-propagating time segment 136 is configured to maintain the valve status, but not limited thereto.

In another embodiment, the driving-signal generating circuit 54 may be another type. In another embodiment, the driving current provided from the driving-signal generating circuit 54 may be generated according to the pulse width modulation. For example, the driving-signal generating circuit 54 may include a driving-pulse generating unit configured to generate a driving-pulse according to the time-sample STS, wherein the width of the driving-pulse is proportional to the magnitude of the time-sample STS, such that the driving current is generated according to the pulse width modulation, but not limited thereto. In addition, based on the requirements, the driving current may be generated according to one of the above methods or any other suitable method, and valve control signal may be generated according to one of the above methods or any other suitable method. Moreover, in FIG. 15, since the resistor B12 is existence in this embodiment, the driving current may be more linear.

Referring to FIG. 18, FIG. 18 is a schematic diagram of sound pressure levels of air pulses AP generated by the air pulse generating element according to an embodiment of the present invention, wherein the sound signal SN shown in coarse line of FIG. 18 is a sinusoidal wave for example, and the air pulses AP are shown in fine line. As shown in FIG. 18, the magnitude of the SPL of each air pulse AP are related to the magnitude of the corresponding time-sample STS of the sound signal SN, wherein the time-sample STS of the sound signal SN represents an instantaneous value of the sound signal SN sampled at a sampling time instant. In other words, one wave of the sound signal SN is reproduced by a plurality of air pulses AP. Furthermore, if the lengths of the pulse cycles 130 of the air pulses AP are the same, the number of the air pulses AP reproducing one wave of the sound signal SN is decreased as the audio frequency of the sound signal SN is increased. In this embodiment, in order to make one wave of the sound signal SN be reproduced by the air pulses AP with the sufficient number, the pulse rate of the air pulses AP is higher than the maximum human audible frequency or higher than twice of the maximum human audible frequency, but not limited thereto.

Figure 19:
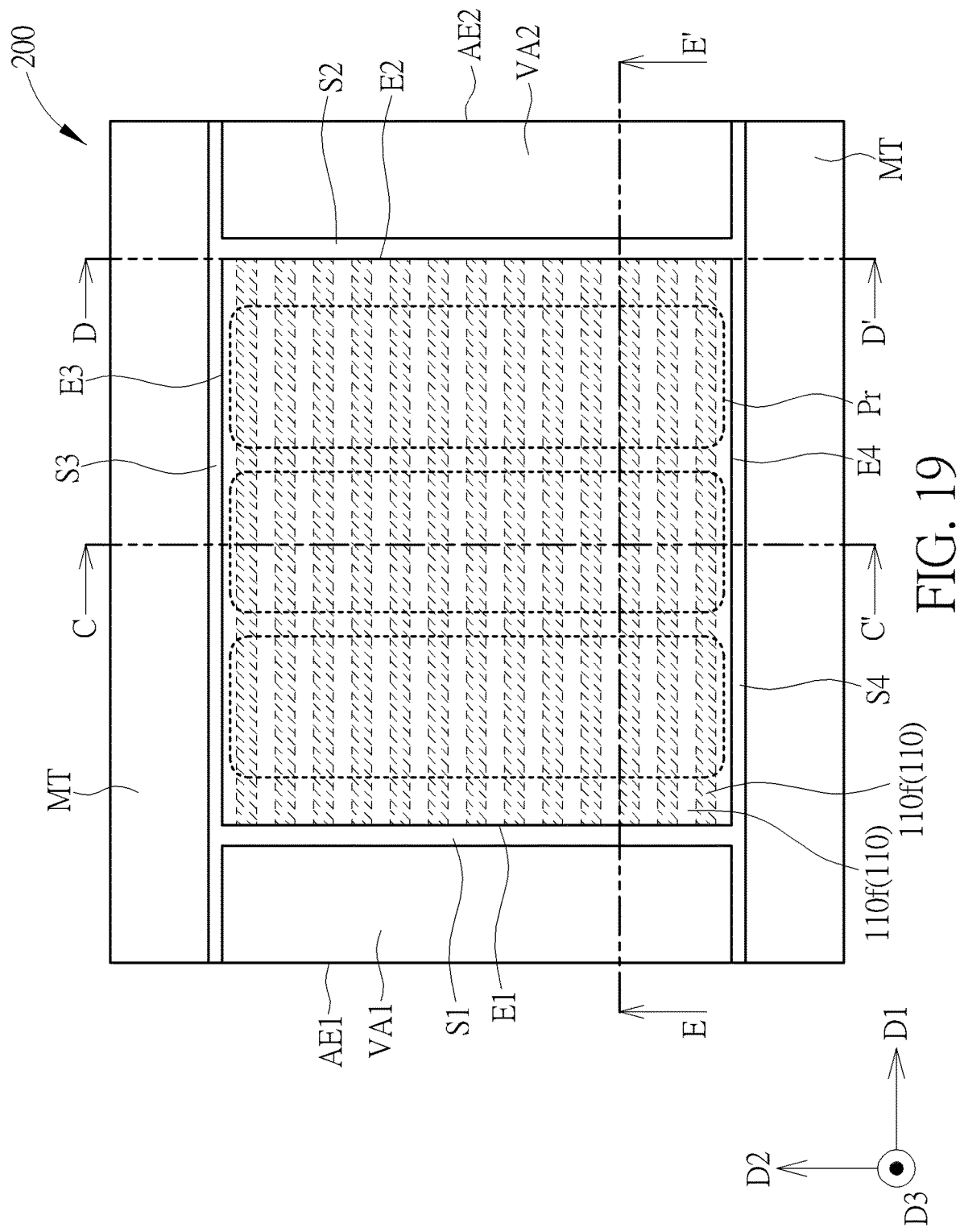
FIG. 19 is a schematic diagram of an air pulse generating element of a sound producing device according to a second embodiment of the present invention.
Figure 20:
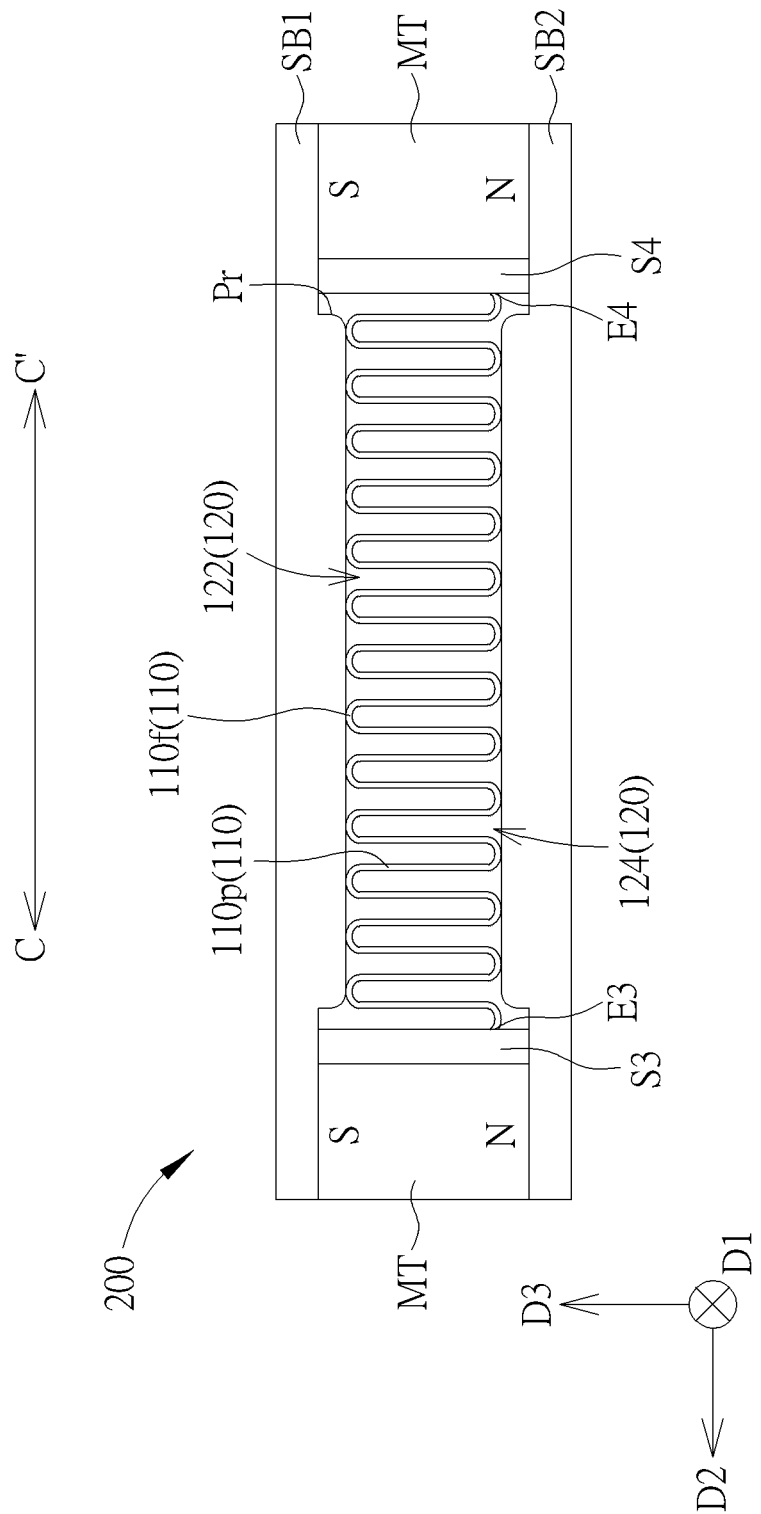
FIG. 20 is a schematic diagram of a cross sectional view taken along a cross-sectional line C-C' in FIG. 19.
Figure 21:
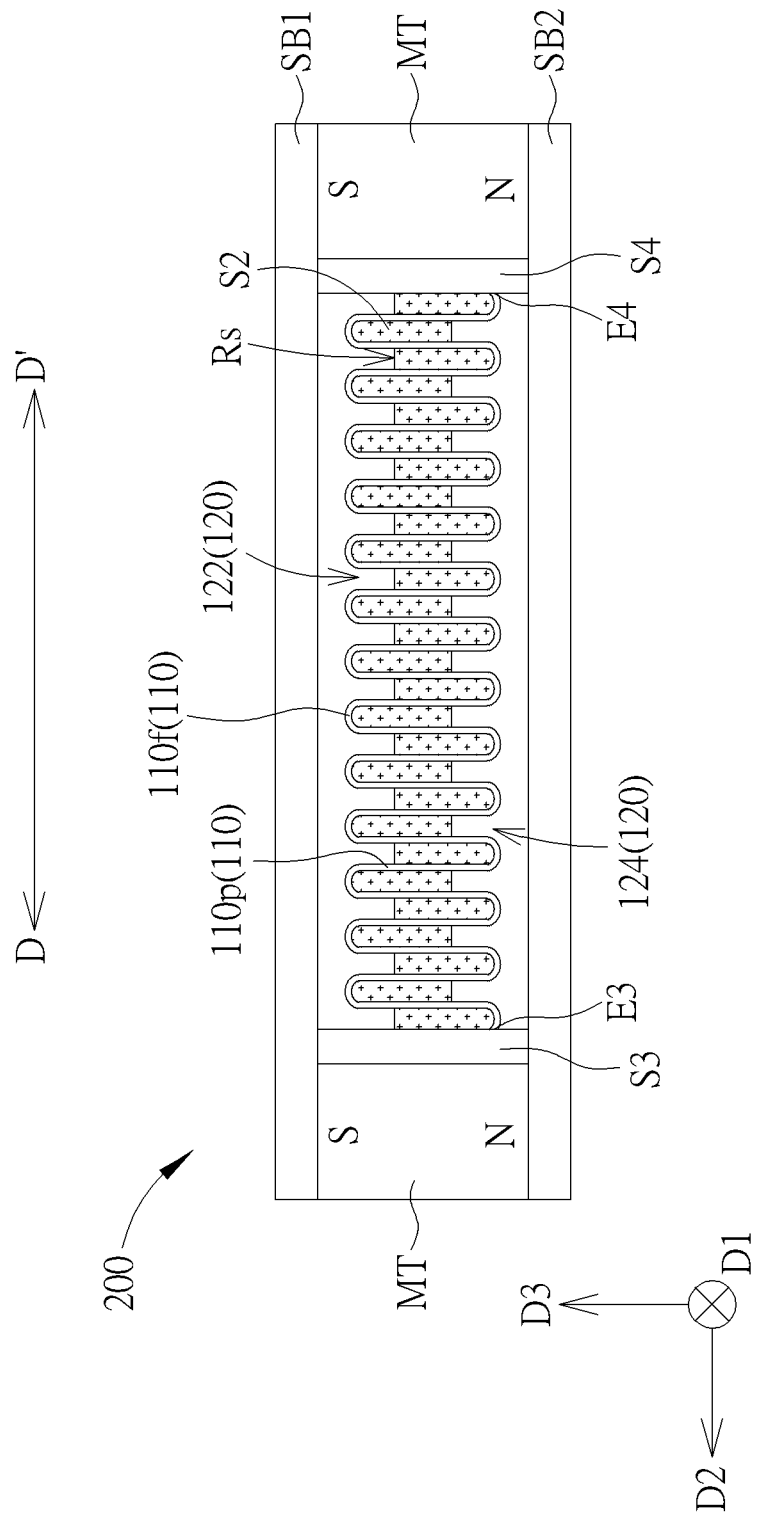
FIG. 21 is a schematic diagram of a cross sectional view taken along a cross-sectional line D-D' in FIG. 19.
Figure 22:
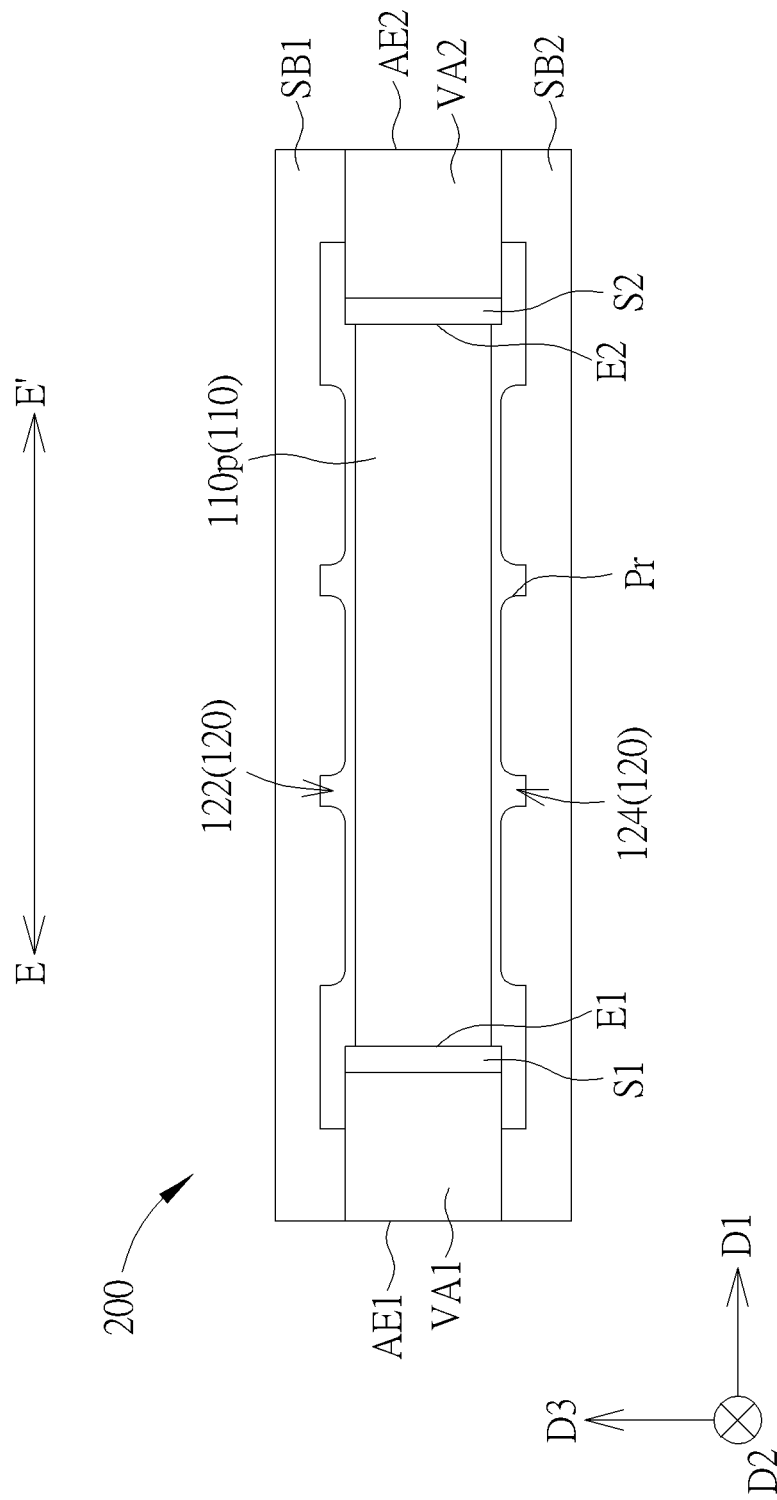
FIG. 22 is a schematic diagram of a cross sectional view taken along a cross-sectional line E-E' in FIG. 19.

Referring to FIG. 19 to FIG. 22, FIG. 19 is a schematic diagram of an air pulse generating element of a sound producing device according to a second embodiment of the present invention, FIG. 20 is a schematic diagram of a cross sectional view taken along a cross-sectional line C-C' in FIG. 19, FIG. 21 is a schematic diagram of a cross sectional view taken along a cross-sectional line D-D' in FIG. 19, and FIG. 22 is a schematic diagram of a cross sectional view taken along a cross-sectional line E-E' in FIG. 19. As shown in FIG. 19 to FIG. 22, the difference between this embodiment and the first embodiment is the designs of the first spacer S1 and the second spacer S2 of the air pulse generating element 200 of this embodiment. In FIG. 21, the first spacer S1 has a plurality of recess structures Rs, and the second spacer S2 also has a plurality of recess structures Rs. In other words, patterns of the first spacer S1 and the second spacer S2 are corresponding to the membrane 110 in the cross-section-view of FIG. 21. The recess structures Rs are configured to be a plurality of air passages, such that the air passage close to the spacer is enlarged, which makes the air flowing along the third direction D3 be decreased. Thus, most of the air may directly flow along the first direction D1 to pass through the spacers S1-S2, and the airflow in the air pulse generating element 200 flows more smoothly than the airflow of the first embodiment.

Moreover, another difference between this embodiment and the first embodiment is the design of the protrusions Pr of the first plate SB1 and the second plate SB2. In FIG. 19 to FIG. 22, each protrusion Pr may be corresponding to all of the folded parts 110f of the membrane 110; that is to say, a length of each protrusion Pr is close to a length of the folded membrane 110, but not limited thereto. Moreover, the width of the protrusion Pr in this embodiment is greater than the width of the protrusion Pr in the first embodiment. Thus, in FIG. 19, a ratio of the sum of the projected areas of the protrusions Pr to the projected area of the folded membrane 110 is high. Thereby, the protrusions Pr may make the air flowing along the third direction D3 be decreased, which makes the airflow in the air pulse generating element 200 flow more smoothly than the airflow of the first embodiment. As the result, most of the air may directly flow along the first direction D1 in the air pulse generating element 200.

Figure 23:
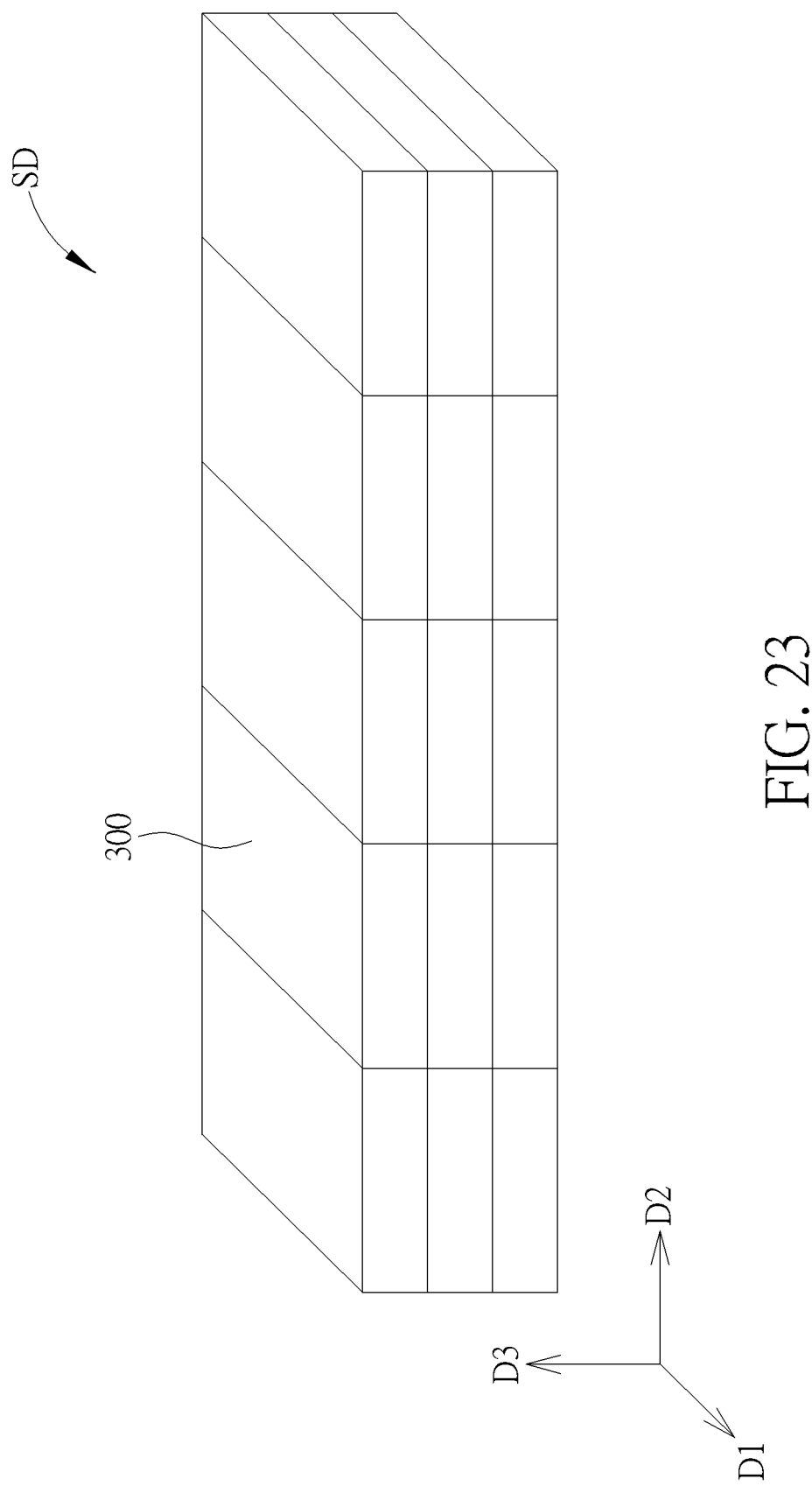
FIG. 23 is a schematic diagram of a plurality of air pulse generating elements of a sound producing device according to a third embodiment of the present invention.
Figure 24:
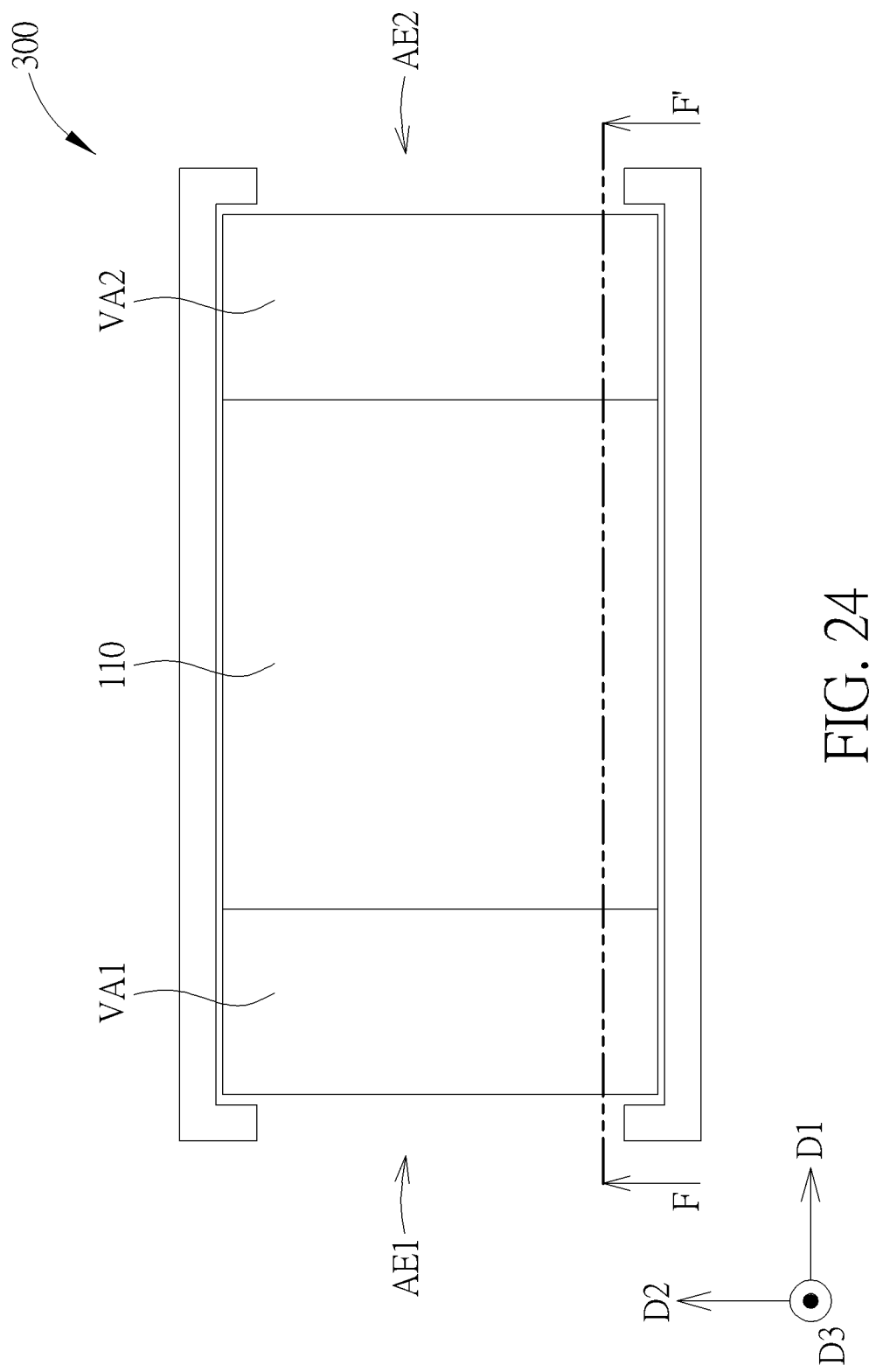
FIG. 24 is a schematic diagram of a top view of an air pulse generating element of the sound producing device according to the third embodiment of the present invention.
Figure 25:
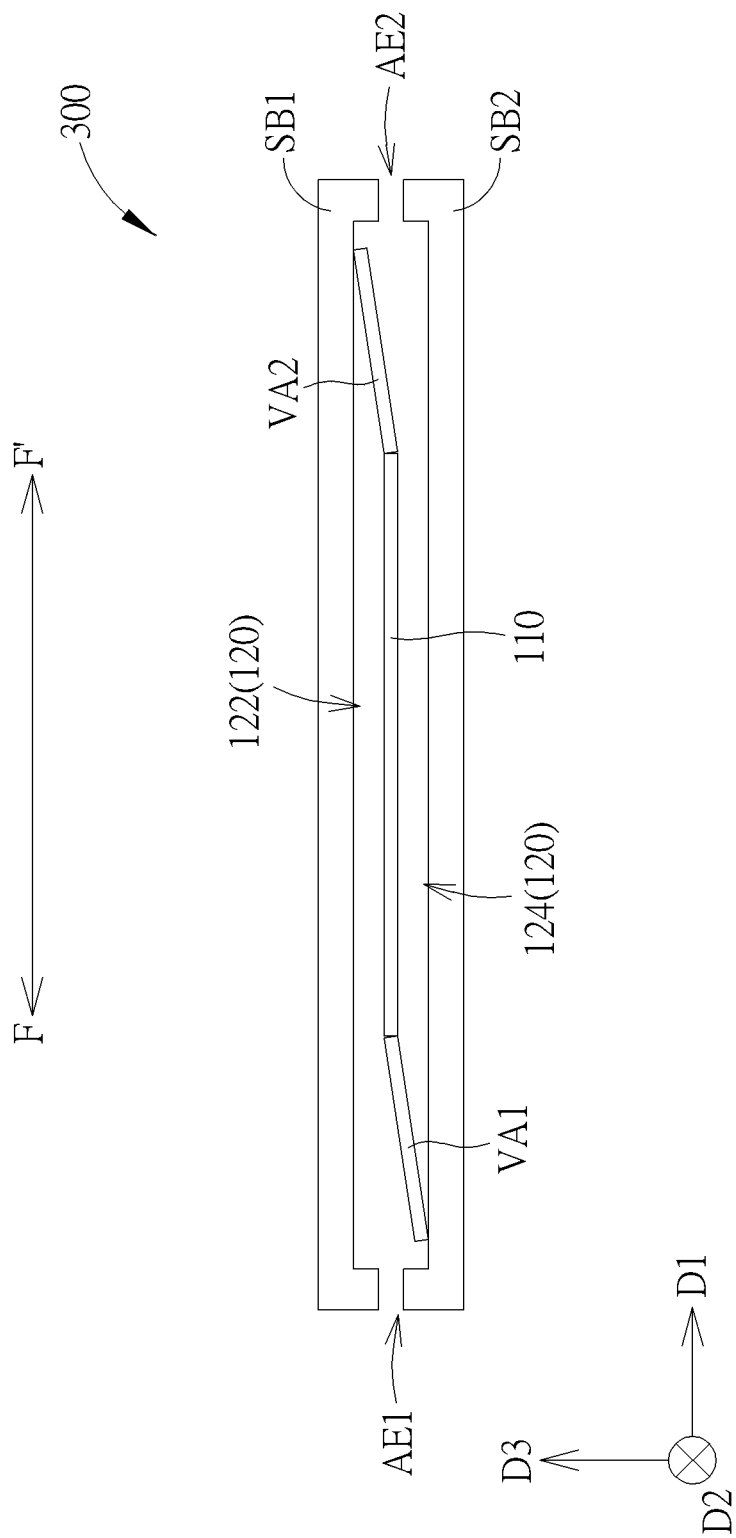
FIG. 25 is a schematic diagram of a cross sectional view taken along a cross-sectional line F-F' in FIG. 24.

Referring to FIG. 23 to FIG. 25, FIG. 23 is a schematic diagram of a plurality of air pulse generating elements of a sound producing device according to a third embodiment of the present invention, FIG. 24 is a schematic diagram of a top view of an air pulse generating element of the sound producing device according to the third embodiment of the present invention, and FIG. 25 is a schematic diagram of a cross sectional view taken along a cross-sectional line F-F' in FIG. 24. As shown in FIG. 23, the sound producing device SD of this embodiment includes a plurality of air pulse generating elements 300 (such as 2-20 air pulse generating elements 300), and the air pulse generating elements 300 are stacked. For example, in FIG. 23, the sound producing device SD includes 15 air pulse generating elements 300, but not limited thereto. As shown in FIG. 24 and FIG. 25, another type of the air pulse generating element 300 different from the first embodiment and the second embodiment is provided. In this embodiment, the air pulse generating element 300 includes an air chamber 120 (having a first sub-chamber 122 and a second sub-chamber 124), a membrane 110, a first air entrance AE1, a second air entrance AE2, a first valve VA1, a second valve VA2, a first plate SB1 and a second plate SB2, the position relations of these components may be referred to the first embodiment, and will not be redundantly described.

The membrane 110 of this embodiment is a plane membrane and has a rectangular shape, but not limited thereto.

Figure 26:
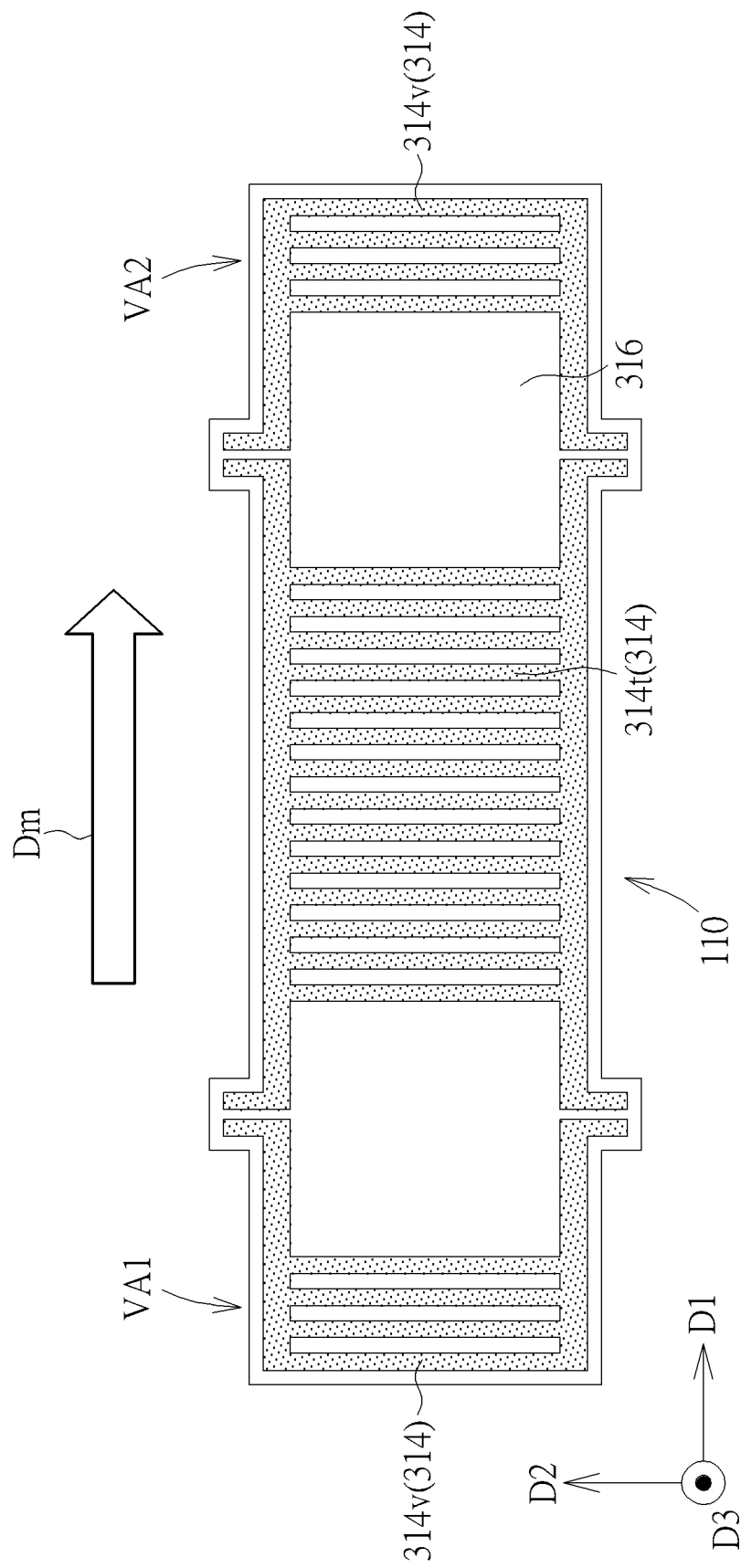
FIG. 26 is a schematic diagram of a top view of a membrane of the air pulse generating element of the sound producing device according to the third embodiment of the present invention.

Similarly, the membrane 110 needs to be actuated for producing the air move volume to generate the air pulse. In this embodiment, the membrane 110 can be actuated to move along a direction parallel to the third direction D3, but not limited thereto. Then, the membrane 110 may be actuated by any suitable actuating means included in or disposed on the membrane 110. As an example, as shown in FIG. 26 showing the membrane 110 according to the third embodiment in top view, the membrane 110 includes a membrane substrate 316 and a conductive layer 314 disposed on the membrane substrate 316, and the conductive layer 314 may include at least one membrane conductive trace 314t along the second direction D2. When actuating the membrane 110, the control unit 50 provides the suitable driving current for the membrane conductive trace 314t, and the air pulse generating element 300 provides a magnetic field where directions of magnetic flux lines are substantially parallel to the first direction D1, such that the membrane 110 may be actuated to move along the third direction D3. In this case, if the directions of the magnetic flux lines of the magnetic field are substantially along the first direction D1 (as shown in a magnetic field direction Dm of FIG. 26), when the driving current flows in the membrane conductive trace 314t along a direction opposite to the second direction D2, the membrane 110 may be actuated to move along the third direction D3, such that the membrane 110 is in a first actuating status; when the driving current flows in the membrane conductive trace 314t along the second direction D2, the membrane 110 may be actuated to move along a direction opposite to the third direction D3, such that the membrane 110 is in a second actuating status.

Figure 27:
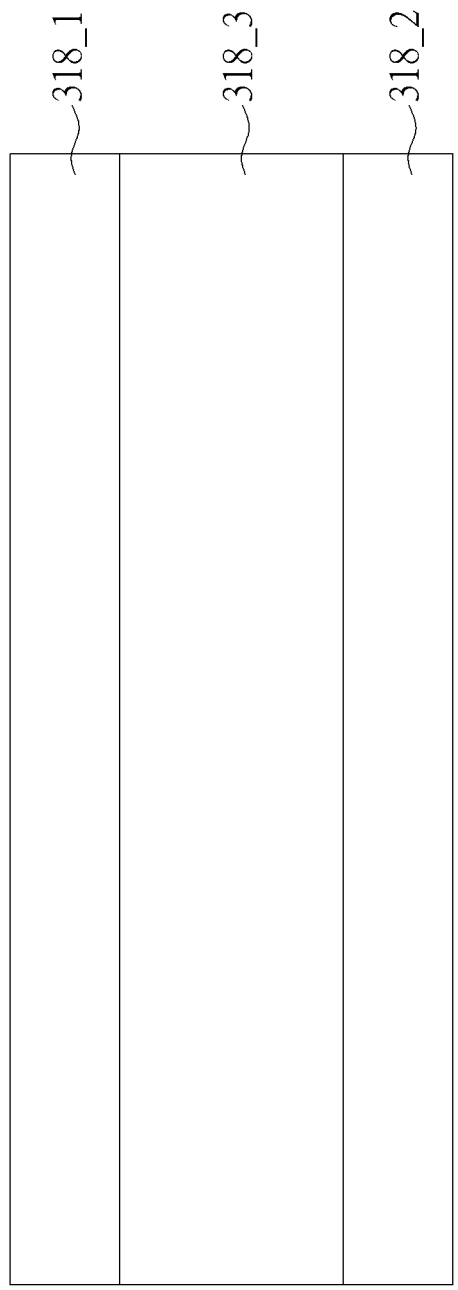
FIG. 27 is a schematic diagram of a cross sectional view of membrane of the air pulse generating element of the sound producing device according to a variant embodiment of the third embodiment of the present invention.

In addition, other suitable actuating means included in or disposed on the membrane 110 is provided to cause the movement of the membrane 110, wherein the actuating means include such as a piezoelectric material, a planar coil or a conducting plate, but not limited thereto. For another example, as shown in FIG. 27 showing the membrane 110 according to a variant embodiment in cross-sectional view, two voltage-providing layers 318_1-318_2 may be disposed on opposite side of a piezoelectric material layer 318_3, these layers may be disposed on the membrane substrate 316, and the piezoelectric material layer 318_3 may actuate the membrane 110 when the voltage-providing layers 318_1-318_2 receive driving voltages. In still another embodiment, the conductive layer 314 of the membrane 110 may include a planar coil, the air pulse generating element 300 provides a magnetic field where directions of magnetic flux lines are substantially parallel to the third direction D3, and the suitable driving current may be applied on the planar coils for generating a suitable magnetic field to actuate the membrane 110 (i.e. the membrane 110 may be actuated by the magnetic force). In still another embodiment, the conductive layer 314 of the membrane 110 may include a conducting plate, the air pulse generating element 300 provides an electrostatic field where directions of electrostatic flux lines are substantially parallel to the third direction D3, and the suitable driving voltage may be applied on the conducting plate for actuating the membrane 110 (i.e. the membrane 110 may be actuated by the electrostatic force).

Furthermore, the valve of this embodiment may have any suitable structure. For example, in FIG. 26, each of the first valve VA1 and the second valve VA2 may have at least one valve conductive trace 314v along the second direction D2. When controlling the first valve VA1 and the second valve VA2 of this embodiment, the control unit 50 provides the suitable valve control signals (i.e. currents in this embodiment) for the valve conductive traces 314v of the first valve VA1 and the second valve VA2, and the air pulse generating element 300 provides a magnetic field where directions of magnetic flux lines are substantially parallel to the first direction D1, such that the first valve VA1 and the second valve VA2 may be actuated to move along the third direction D3. In this case, if the directions of the magnetic flux lines of the magnetic field are substantially along the first direction D1 (as shown in a magnetic field direction Dm of FIG. 26), when the current flows in the valve conductive trace 314v of the first valve VA1 along the second direction D2, and the current flows in the valve conductive trace 314v of the second valve VA2 along a direction opposite to the second direction D2, the first valve VA1 is actuated to move along a direction opposite to the third direction D3, and the second valve VA2 is actuated to move along the third direction D3, such that the valve operation status is the first path status (as shown in FIG. 25); when the current flows in the valve conductive trace 314v of the first valve VA1 along a direction opposite to the second direction D2, and the current flows in the valve conductive trace 314v of the second valve VA2 along the second direction D2, the first valve VA1 is actuated to move along the third direction D3, and the second valve VA2 is actuated to move along a direction opposite to the third direction D3, such that the valve operation status is the second path status, but not limited thereto. In another embodiment, the first valve VA1 and the second valve VA2 may have the structure shown in FIG. 8 or FIG. 13. Moreover, in this embodiment, the first valve VA1 and the second valve VA2 may be connected to the membrane 110, and the first valve VA1, the second valve VA2 and the membrane 110 may be manufactured in the same process and formed of the same materials (i.e. the valve conductive traces 314v and the membrane conductive trace 314t may be formed out of one piece of the conductive layer 314), but not limited thereto. Note that four operation modes of the air pulse generating element 300 determined by the membrane status and the valve status may be referred to the first embodiment and the Table 1, and will not be redundantly described.

Figure 28:
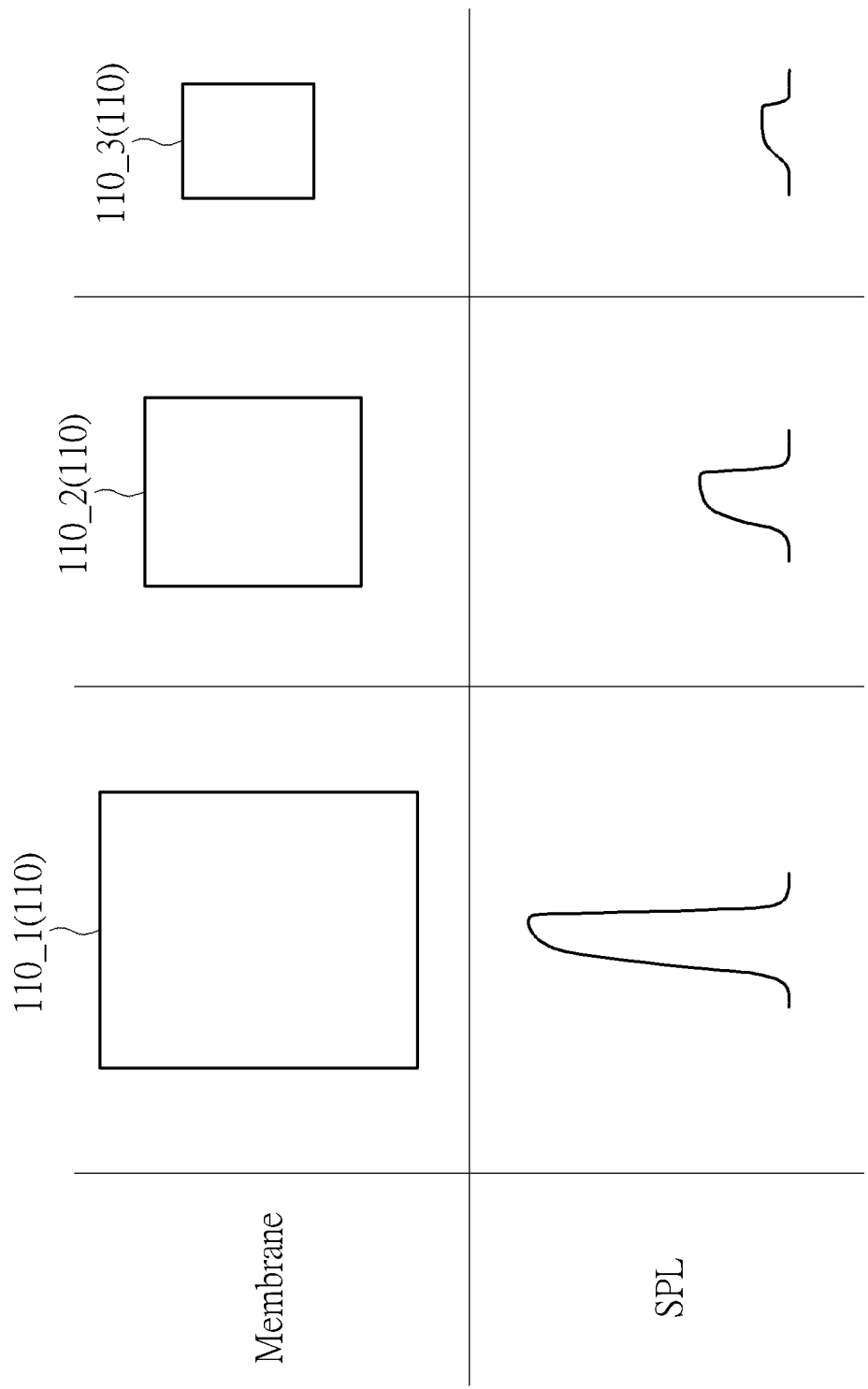
FIG. 28 is a schematic diagram of the membranes with different sizes in different air pulse generating element and sound pressure levels of air pulses generated by thereof.

Particularly, the sizes of the membranes 110 of the air pulse generating elements 300 of the sound producing device SD may be different. In this embodiment, the sound producing device SD may have three sizes of the membranes 110 shown in FIG. 28. For example, in FIG. 23, each of 13 air pulse generating elements 300 has the largest size of the membrane 110 (a largest size membrane 110_1) shown in FIG. 28, 1 air pulse generating element 300 has the middle size of the membrane 110 (a middle size membrane 110_2) shown in FIG. 28, and 1 air pulse generating element 300 has the smallest size of the membrane 110 (a largest size membrane 110_3) shown in FIG. 28, but not limited thereto. In another embodiment, the sound producing device SD may have only one size of the membrane 110, two sizes of the membranes 110 or more than three sizes of the membranes 110. Then, the predetermined magnitudes of SPLs (or the predetermined air move volumes) of the air pulses generated by different membranes 110 are different due to their different sizes. In this embodiment, the predetermined magnitude of SPL of the middle size membrane 110_2 may be ⅓ times of the predetermined magnitude of SPL of the largest size membrane 110_1, and the predetermined magnitude of SPL of the smallest size membrane 110_3 may be ⅑ times of the predetermined magnitude of SPL of the largest size membrane 110_1, but not limited thereto.

Moreover, the air pulse generating elements 300 are grouped into a plurality of groups. In this embodiment, the air pulse generating elements 300 may be grouped into five groups (P2, P1, P0, F1 and F2), wherein the group P2 includes 9 air pulse generating elements 300 each having the largest size membrane 110_1, the group P1 includes 3 air pulse generating elements 300 each having the largest size membrane 110_1, the group P0 includes 1 air pulse generating element 300 having the largest size membrane 110_1, the group F1 includes 1 air pulse generating element 300 having the middle size membrane 110_2, and the group F2 includes 1 air pulse generating element 300 having the smallest size membrane 110_3, but not limited thereto. In this embodiment, the air pulse generating elements 300 in the same group may receive the same driving signal (i.e. driving current in this embodiment) and the same valve controlling signals (i.e. valve controlling currents in this embodiment), such that each of the air pulse generating elements 300 in the same group may generated the same air pulse (the same magnitude and the same polarity).

In this embodiment, if the air pulse generating element 300 needs to generate the positive pulse or the negative pulse, the air pulse generating element 300 generates the air pulse having SPL with the predetermined magnitude; if the air pulse generating element 300 needs to generate the null pulse, the first airflow flowing through the first air entrance AE1 and the second airflow flowing through the second air entrance AE2 have zero SPL (no air mass velocity). That is to say, the air pulse generating element 300 of this embodiment only generates three types of air pulses: the positive pulse having the SPL with the predetermined magnitude (corresponding to the "+1" state), the negative pulse having the SPL with the predetermined magnitude (corresponding to the "−1" state) and the null pulse (corresponding to the "0" state), the driving signal (i.e. driving current in this embodiment) provided to the membrane 110 of the air pulse generating element 300 is selected from three predetermined values respectively corresponding to three types of air pulses, and the driving time of the driving signal is also predetermined. Note that the membranes 110 having different sizes may be actuated by the same driving signal or different driving signals, and the actuating time of the membranes 110 having different sizes may be the same or different. Therefore, magnitudes of the SPLs of the air pulses generated by the groups P2-P0 and F1-F2 are respectively denoted as $SPL_{P0}$, $SPL_{P1}$, $SPL_{P2}$, $SPL_{F1}$ and $SPL_{F2}$, and $SPL_{P0}:SPL_{P1}:SPL_{P2}:SPL_{F1}:SPL_{F2}=9:3:1:\frac{1}{3}:\frac{1}{9}$ when generating the positive pulses or the negative pulses.

Figure 29:
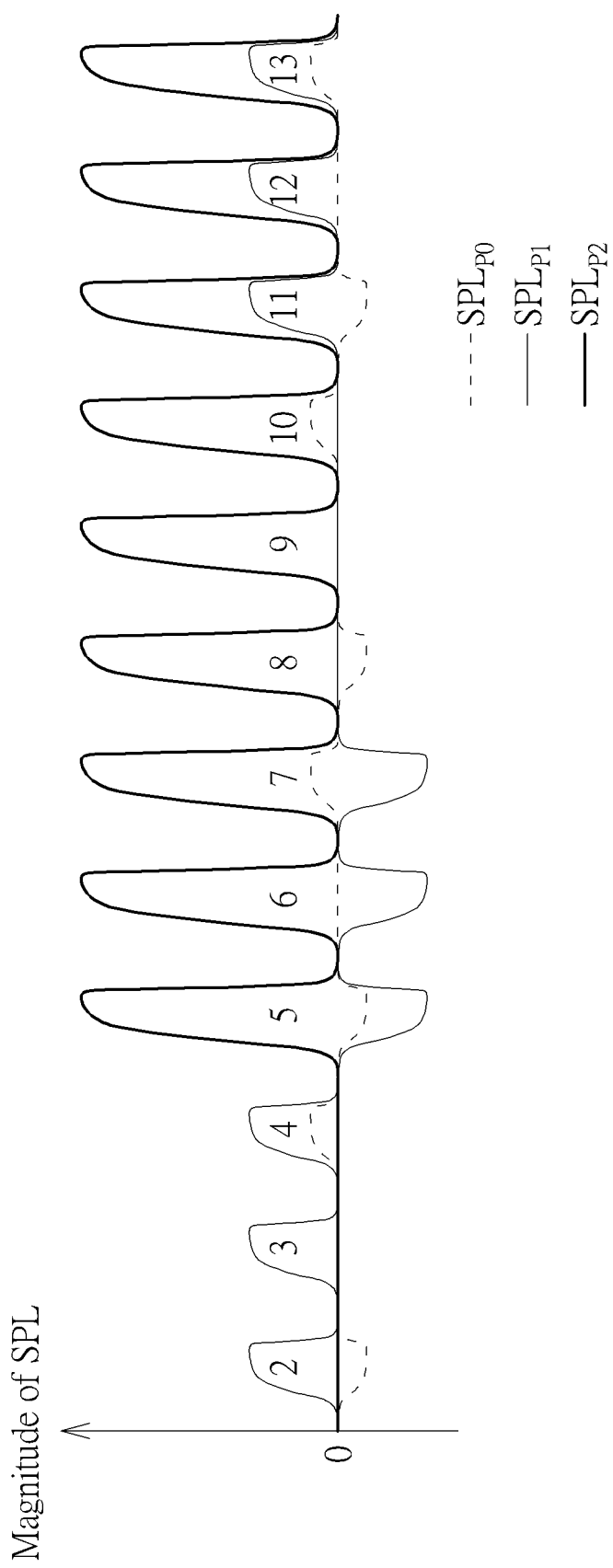
FIG. 29 is a schematic diagram of a series of sound pressure levels of air pulses according to an embodiment of the present invention.

Referring to FIG. 29, FIG. 29 is a schematic diagram of a series of sound pressure levels of air pulses according to an embodiment of the present invention, wherein the series of sound pressure levels of air pulses are generated by the groups P2-P0 for example. As shown in FIG. 29, the air pulse generating group P2 starts with 3 null pulses, and finishes with 9 consecutive positive pulses; the air pulse generating group P1 starts with 3 positive pulses, followed by 3 negative pulses and 3 null pulses, and finishes with 3 positive pulses; and the air pulse generating group P0 repeatedly generates a negative pulse, a null pulse and a positive pulse, in 4 iterations. Therefore, the resulting aggregated SPLs generated by the groups P2-P0 over the consecutive 12 cycles has a magnitude ratio of 2:3:4:5:6:7:8:9:10:11:12:13, as shown in scalar form in FIG. 29. As the result, each time-sample STS of the sound signal may be corresponding to a compositing air pulse generated by all of the air pulse generating elements 300 of sound producing device SD, such that the sound signal is reproduced by the compositing air pulses, as shown in FIG. 18. In addition, since the sound producing device SD of this embodiment has five groups P2-P0 and F1-F2, the sound producing device SD may produce $3^5=243$ quantization SPL levels, but not limited thereto. The number of the groups may be adjusted based on requirements; for example, the number of the groups is enhanced when the number of quantization SPL levels need to be increased.

Figure 30:
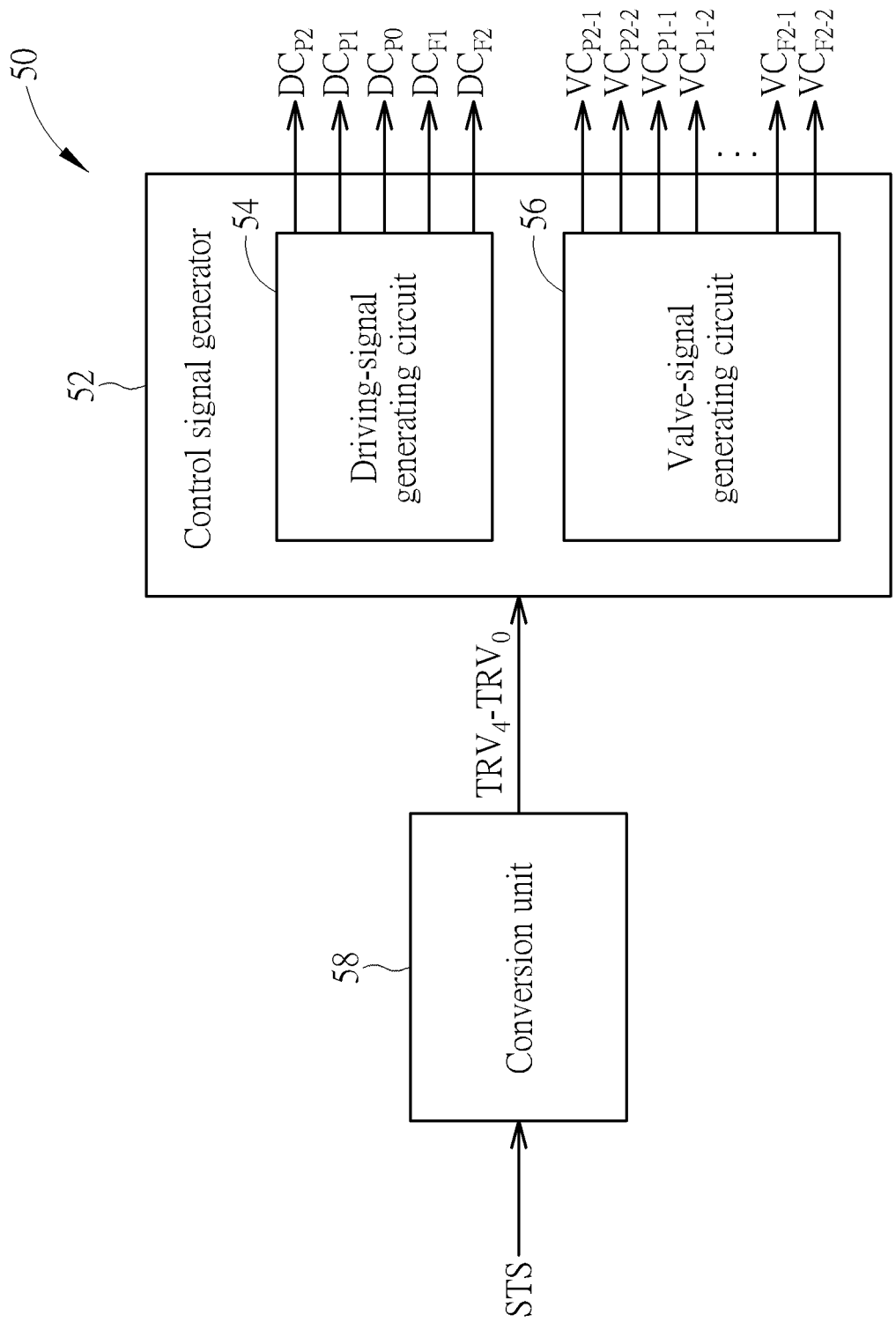
FIG. 30 is a schematic diagram of a control unit of the sound producing device according to the third embodiment of the present invention.

Referring to FIG. 30, FIG. 30 is a schematic diagram of a control unit of the sound producing device according to the third embodiment of the present invention. As shown in FIG. 30, the control unit 50 of this embodiment may include a conversion unit 58, a driving-signal generating circuit 54 and a valve-signal generating circuit 56, and the conversion unit 58 is electrically connected to the driving-signal generating circuit 54 and the valve-signal generating circuit 56. The conversion unit 58 is configured to convert a time-sample STS of the sound signal as a plurality of values respectively corresponding to the groups of the sound producing device SD, and configured to transmit to the driving-signal generating circuit 54 and the valve-signal generating circuit 56, wherein each of the values may be selected from one of "+1", "−1" and "0", but not limited thereto. According to these values, the driving-signal generating circuit 54 is configured to generate the driving signals respectively corresponding to the membranes 110 of the air pulse generating elements 300, and the valve-signal generating circuit 56 is configured to generate the valve control signals respectively corresponding to the valves of the air pulse generating elements 300. In this embodiment, the conversion unit 58 may convert a time-sample STS of the sound signal as the values $TRV_4$, $TRV_3$, $TRV_2$, $TRV_1$ and $TRV_0$ respectively corresponding to the groups P2-P0 and F1-F2 of the sound producing device SD, the driving-signal generating circuit 54 correspondingly generates the driving currents $DC_{P2}$, $DC_{P1}$, $DC_{P0}$, $DC_{F1}$ and $DC_{F2}$ (served as the driving signals) and transmits the driving currents $DC_{P2}$, $DC_{P1}$, $DC_{P0}$, $DC_{F1}$ and $DC_{F2}$ to the corresponding groups P2-P0 and F1-F2 of the sound producing device SD for actuating the membranes 110, and the valve-signal generating circuit 56 correspondingly generates the valve controlling currents $VC_{P2-1}$, $VC_{P2-2}$, $VC_{P1-1}$, $VC_{P1-2}$, . . . , $VC_{F2-2}$ (served as the valve controlling signals) and transmits the valve controlling currents $VC_{P2-1}$, $VC_{P2-2}$, $VC_{P1-1}$, $VC_{P1-2}$, . . . , $VC_{F2-2}$ to the corresponding groups P2-P0 and F1-F2 of the sound producing device SD for actuating the valves (i.e. the first valves VA1 and the second valves VA2). For example, if the $TRV_2$ is "+1", the magnitude of the driving current $DC_{P0}$ applied on the membrane 110 of the air pulse generating element 300 belonging to the group P0 can actuate the membrane 110 for generating the SPL with the predetermined magnitude, and the valve controlling currents $VC_{P0-1}$ and $VC_{P0-2}$ respectively applied on the first valve VA1 and the second valve VA2 of the air pulse generating element 300 belonging to the group P0 and the flowing direction (or the sign) of the driving current $DC_{P0}$ applied on the membrane 110 of the air pulse generating element 300 belonging to the group P0 can make the air pulse generating element 300 be a suitable operation mode (e.g. the membrane status is the first actuating status and the valve status is the first path status, or the membrane status is the second actuating status and the valve status is the second path status), such that the positive pulse having the SPL with the predetermined magnitude can be generated.

The air-pulse-generating method of the sound producing device SD of this embodiment is not limited by above. Any other suitable air-pulse-generating method may be used in the present invention. In an embodiment, each of the air pulse generating elements 300 includes the membrane 110 with the same size, and the control unit 50 generates the suitable driving signals to make $SPL_{P0}:SPL_{P1}:SPL_{P2}:SPL_{F1}:SPL_{F2}$ be 9:3:1:⅓:⅑ when generating the positive pulses or the negative pulses. In another embodiment, each of the air pulse generating elements 300 includes the membrane 110 with the same size, and the driving method of the sound producing device SD may be the same as the first embodiment, wherein the magnitude of the driving current applied on the membrane 110 of one of the air pulse generating elements 300 is proportional to the magnitude of the time-sample STS of the sound signal.

Figure 31:
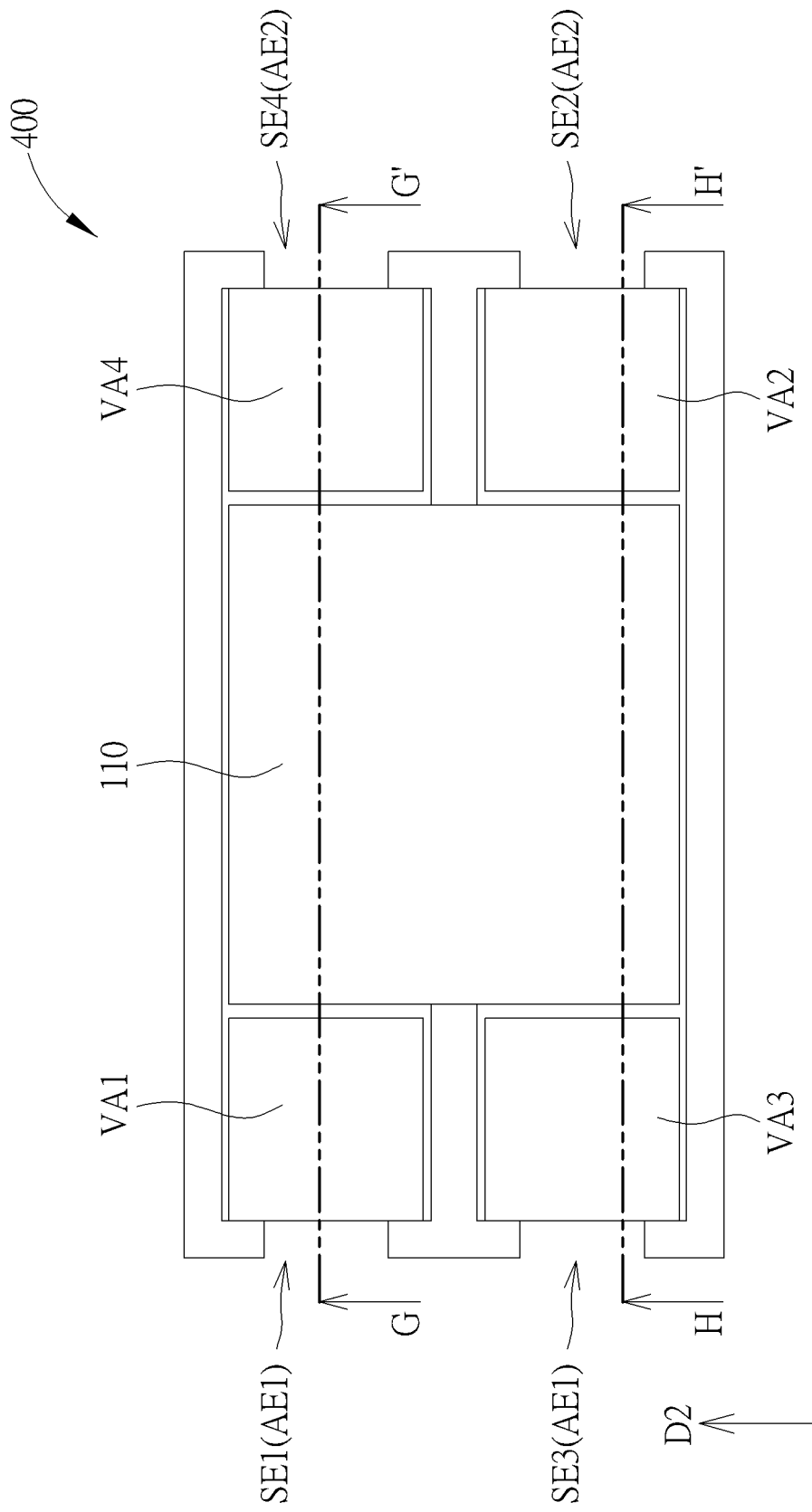
FIG. 31 is a schematic diagram of a top view of an air pulse generating element of the sound producing device according to the fourth embodiment of the present invention.
Figure 32:
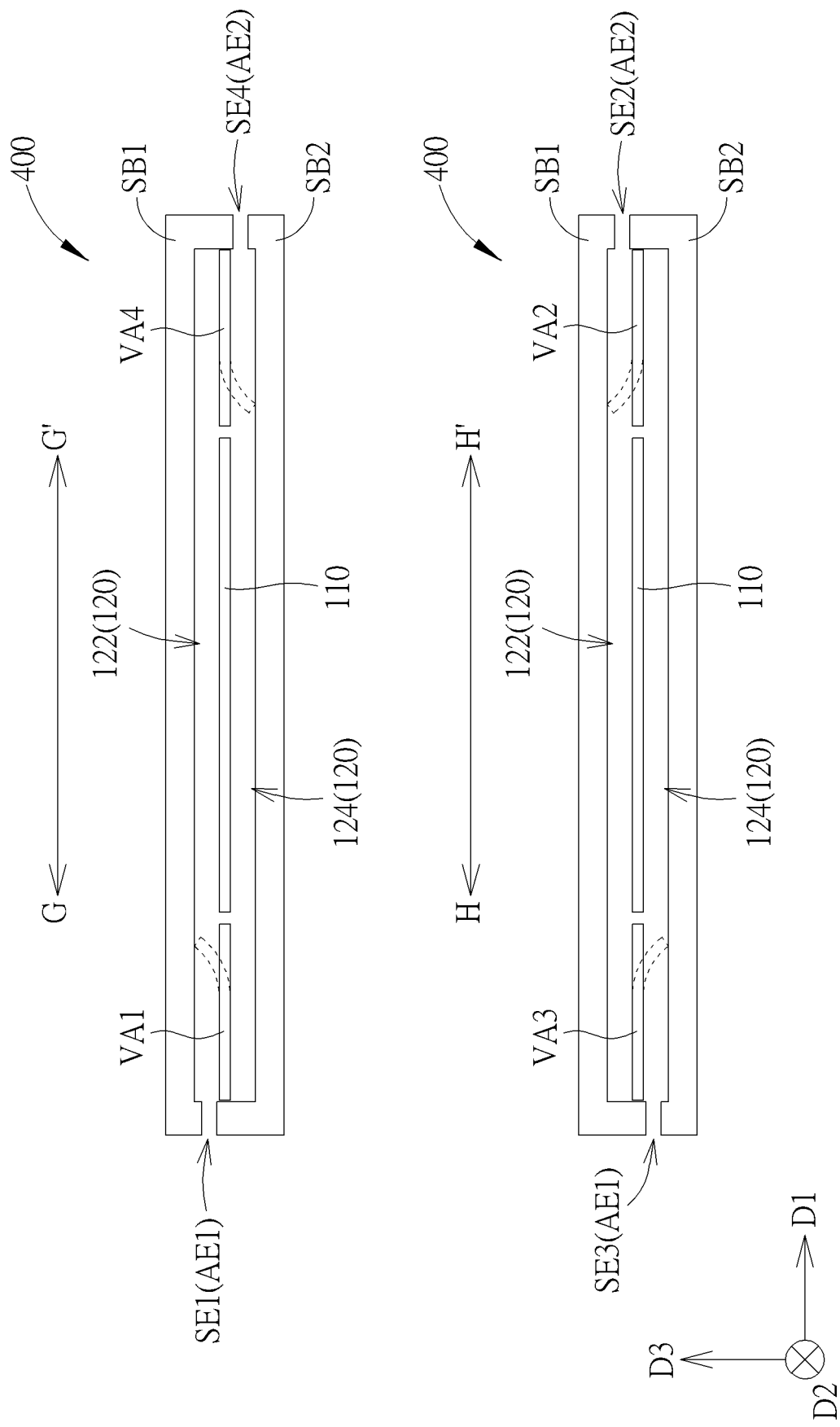
FIG. 32 is a schematic diagram of a cross sectional view taken along cross-sectional lines G-G', H-H' in FIG. 31.

Referring to FIG. 31 and FIG. 32, FIG. 31 is a schematic diagram of a top view of an air pulse generating element of the sound producing device according to the fourth embodiment of the present invention, and FIG. 32 is a schematic diagram of a cross sectional view taken along cross-sectional lines G-G', H-H' in FIG. 31, wherein the dash lines of FIG. 32 show the close state of valves VA1-VA4. As shown in FIG. 31 and FIG. 32, the difference between this embodiment and the third embodiment is the number of the valves and a design of the air entrances AE1-AE2 in one air pulse generating element 400. In this embodiment, the air pulse generating element 400 includes a first valve VA1, a second valve VA2, a third valve VA3 and a fourth valve VA4, the first air entrance AE1 has a first sub-entrance SE1 and a third sub-entrance SE3, and the second air entrance AE2 has a second sub-entrance SE2 and a fourth sub-entrance SE4, wherein the first valve VA1 is corresponding to the first sub-entrance SE1 of the first air entrance AE1 and disposed between the first air entrance AE1 and the membrane 110, the second valve VA2 is corresponding to the second sub-entrance SE2 of the second air entrance AE2 and disposed between the second air entrance AE2 and the membrane 110, the third valve VA3 is corresponding to the third sub-entrance SE3 of the first air entrance AE1 and disposed between the first air entrance AE1 and the membrane 110, and the fourth valve VA4 is corresponding to the fourth sub-entrance SE4 of the second air entrance AE2 and disposed between the second air entrance AE2 and the membrane 110. Furthermore, the first valve VA1 controls the air path between the first sub-chamber 122 and the first sub-entrance SE1 of the first air entrance AE1, the second valve VA2 controls the air path between the first sub-chamber 122 and the second sub-entrance SE2 of the second air entrance AE2, the third valve VA3 controls the air path between the second sub-chamber 124 and the third sub-entrance SE3 of the first air entrance AE1, and the fourth valve VA4 controls the air path between the second sub-chamber 124 and the fourth sub-entrance SE4 of the second air entrance AE2.

The first valve VA1 is controlled to determine the open state and the closed state of the first sub-entrance SE1 of the first air entrance AE1, and the third valve VA3 is controlled to determine the open state and the closed state of the third sub-entrance SE3 of the first air entrance AE1, such that the first valve VA1 and the third valve VA3 are configured to control the path of the first airflow passing through the first air entrance AE1. The second valve VA2 is controlled to determine the open state and the closed state of the second sub-entrance SE2 of the second air entrance AE2, and the fourth valve VA4 is controlled to determine the open state and the closed state of the fourth sub-entrance SE4 of the second air entrance AE2, such that the second valve VA2 and the fourth valve VA4 are configured to control the path of the second airflow passing through the second air entrance AE2. In the first path status, the first valve VA1 is controlled to make the first sub-entrance SE1 of the first air entrance AE1 be the open state, the third valve VA3 is controlled to make the third sub-entrance SE3 of the first air entrance AE1 be the closed state, the second valve VA2 is controlled to make the second sub-entrance SE2 of the second air entrance AE2 be the closed state, and fourth valve VA4 is controlled to make the fourth sub-entrance SE4 of the second air entrance AE2 be the open state, such that the first airflow may flow into or flow out of the first sub-chamber 122 through the first sub-entrance SE1 of the first air entrance AE1, and the second airflow may flow into or flow out of the second sub-chamber 124 through the fourth sub-entrance SE4 of the second air entrance AE2. In the second path status, the first valve VA1 is controlled to make the first sub-entrance SE1 of the first air entrance AE1 be the closed state, the third valve VA3 is controlled to make the third sub-entrance SE3 of the first air entrance AE1 be the open state, the second valve VA2 is controlled to make the second sub-entrance SE2 of the second air entrance AE2 be the open state, and fourth valve VA4 is controlled to make the fourth sub-entrance SE4 of the second air entrance AE2 be the closed state, such that the first airflow may flow into or flow out of the second sub-chamber 124 through the third sub-entrance SE3 of the first air entrance AE1, and the second airflow may flow into or flow out of the first sub-chamber 122 through the second sub-entrance SE2 of the second air entrance AE2.

Figure 33:
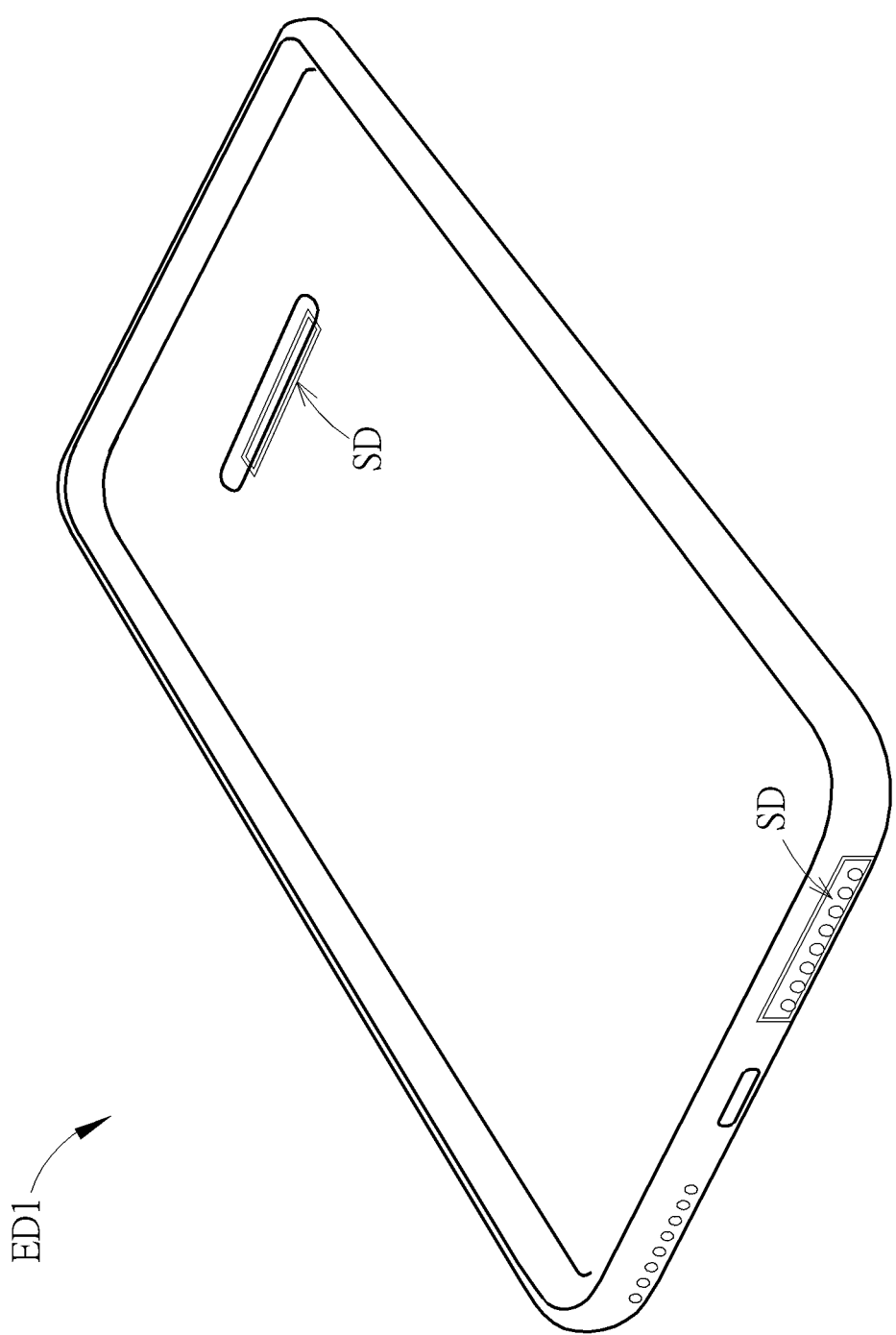
FIG. 33 is a schematic diagram of an electronic device according to an embodiment of the present invention.
Figure 34:
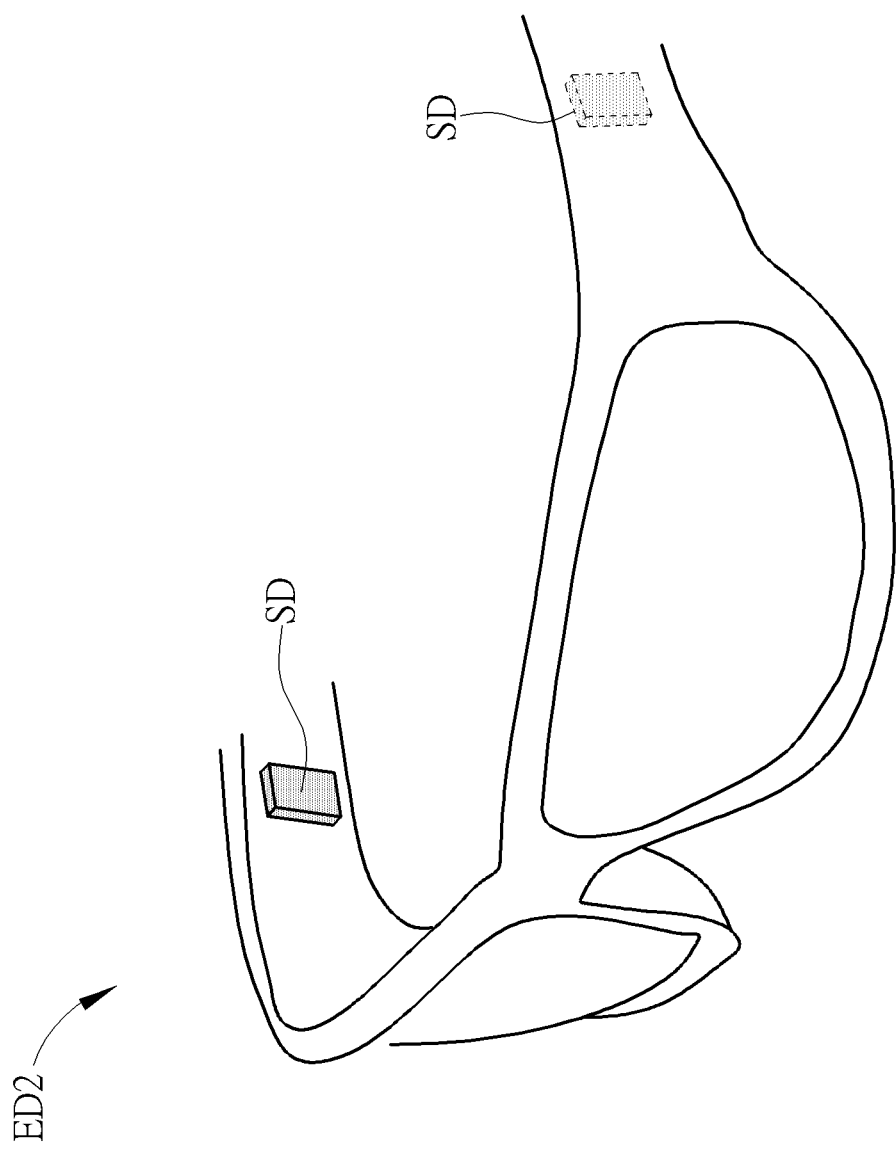
FIG. 34 is a schematic diagram of an electronic device according to another embodiment of the present invention.

In the present invention, since the pulse rate of the air pulse is higher than the maximum human audible frequency, the air move volume for each air pulse is reduced, such that the back enclosure volume of the sound producing device SD can be reduced compared to the enclosure volume of conventional speakers. Moreover, since the sound producing device SD of the present invention is very small (the dimension of the foldable membrane of the first embodiment may be 3 mm*1100 μm*750 μm, the dimension of each air pulse generating element 300 of the third embodiment may be 5 mm*2 mm*0.35 mm, and the dimension of 15 air pulse generating element 300 of the third embodiment shown in FIG. 23 may be 5 mm*10 mm*1.1 mm), the sound producing device SD may be utilized in any suitable device (such as smartphone, tablet notebook, smartwatche, smartglass or even earphone) or disposed at any suitable place (such as ear canal). For instance, as shown in FIG. 33, two sound producing devices SD are disposed in an electronic device ED1 (i.e. smartphone) to be two speakers; for another instance, as shown in FIG. 34, two sound producing devices SD are disposed on an electronic device ED2 (i.e. smartglass) to be two speakers, but not limited thereto.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A sound producing device, comprising:
    at least one air pulse generating element, each of the at least one air pulse generating element comprising:
        an air chamber;
        a membrane disposed in the air chamber and having a plurality side edges;
        a first air entrance disposed at a side of the membrane in a first direction and adjacent to one of the side edges of the membrane; and
        a first valve disposed between the first air entrance and the membrane; and
    a control unit configured to generate at least one driving signal, wherein the driving signal controls a movement of the membrane of the air pulse generating element, such that the air pulse generating element generates an air pulse in response to the corresponding driving signal;

wherein during an operation of the sound producing device, a first airflow corresponding to the air pulse flows into or flows out of the air chamber through the first air entrance, the first airflow passes through the first air entrance substantially along a direction parallel to the first direction, the first direction is substantially perpendicular to a direction of the movement of the membrane, and the first valve is configured to control a path of the first airflow.

2. The sound producing device of claim 1, wherein the membrane is a foldable membrane and comprises:
a flexible membrane substrate; and
a conductive layer disposed on the flexible membrane substrate, wherein the control unit is electrically connected to the conductive layer of the membrane.

3. The sound producing device of claim 2, wherein the membrane has a plurality of planar parts and a plurality of folded parts, each of the folded parts is situated between two adjacent planar parts among the plurality of planar parts, the planar parts are arranged along a second direction substantially perpendicular to the first direction, the conductive layer of the membrane comprises a plurality of trace extending patterns, and each of the trace extending patterns is situated on one of the planar parts, wherein during the operation of the sound producing device, the direction of the movement of the membrane is parallel to the second direction.

4. The sound producing device of claim 3, wherein the trace extending patterns extends along the first direction.

5. The sound producing device of claim 3, wherein the conductive layer further comprises a plurality of trace connecting patterns, each of the trace connecting patterns is electrically connected between two of the trace extending patterns respectively situated on two different planar parts of the planar parts, and each of the trace connecting patterns crosses over one of the folded parts of the membrane.

6. The sound producing device of claim 5, wherein the trace extending patterns comprise a plurality of first trace extending patterns and a plurality of second trace extending patterns, the trace connecting patterns comprises a plurality of first trace connecting patterns and a plurality of second trace connecting patterns, the first trace extending patterns and the first trace connecting patterns form a first trace, the second trace extending patterns and the second trace connecting patterns form a second trace, and the air pulse generating element further comprises a connecting line crossing over the membrane and electrically connected between an end of the first trace and an end of the second trace.

7. The sound producing device of claim 3, wherein during the operation of the sound producing device, the sound producing device provides a magnetic field where directions of magnetic flux lines are substantially parallel to a third direction not parallel to the second direction nor the first direction.

8. The sound producing device of claim 7, wherein the air pulse generating element further comprises a first plate and a second plate opposite to the first plate, the air chamber is formed between the first plate and the second plate, and the magnetic field is provided by the first plate and the second plate.

9. The sound producing device of claim 3, wherein the air pulse generating element further comprises a first plate and a second plate opposite to the first plate, the air chamber is formed between the first plate and the second plate, and each of the first plate and the second plate has at least one protrusion configured to be in contact with at least one of the folded parts.

10. The sound producing device of claim 3, wherein the air pulse generating element further comprises a first spacer disposed between the membrane and the first air entrance, the first spacer is connected to one of the side edges of the membrane, and the first spacer has a plurality of recess structures configured to be a plurality of air passages.

11. The sound producing device of claim 1, wherein the air pulse generating element comprises an actuating means comprised in or disposed on the membrane and configured to cause the movement of the membrane, and the actuating means comprises a piezoelectric material, a planar coil or a conducting plate.

12. The sound producing device of claim 1, wherein the air chamber comprises a first sub-chamber and a second sub-chamber separated by the membrane, and the first airflow corresponding to the air pulse flows into the first sub-chamber through the first air entrance, flows into the second sub-chamber through the first air entrance, flows out of the first sub-chamber through the first air entrance, or flows out of the second sub-chamber through the first air entrance.

13. The sound producing device of claim 12, wherein the first valve is connected to the first sub-chamber, the second sub-chamber and the first air entrance, the first valve comprises a first blocking structure, the first blocking structure is configured to make an air path between the first air entrance and the first sub-chamber be an open state and make an air path between the first air entrance and the second sub-chamber be a closed state during a first path status, and configured to make the air path between the first air entrance and the first sub-chamber be a closed state and make the air path between the first air entrance and the second sub-chamber be an open state during a second path status.

14. The sound producing device of claim 13, wherein the first valve comprises:
a holding structure; and
a supporting structure connected between the holding structure and the first blocking structure;
wherein the first blocking structure is capable of rotating to change a valve status from the first path status to the second path status or from the second path status to the first path status.

15. The sound producing device of claim 14, wherein the first blocking structure comprises:
a blocking plate; and
a planar coil disposed on the blocking plate;
wherein the first blocking structure rotates in response to a valve control current applied on the planar coil.

16. The sound producing device of claim 14, wherein the supporting structure is deformable, and at least a portion of the first blocking structure has a displacement in the first path status or in the second path status due to the deformation of the supporting structure.

17. The sound producing device of claim 13, wherein a valve-actuating means is comprised in or disposed on the first blocking structure of the first valve, and the valve-actuating means comprises a piezoelectric material, a planar coil or a conducting plate.

18. The sound producing device of claim 1, wherein the first valve is connected to the membrane.

19. The sound producing device of claim 1, wherein the air pulse generating element further comprises:

a second air entrance disposed at another side of the membrane in the first direction and adjacent to another side edge of the membrane, wherein the membrane is situated between the first air entrance and the second air entrance; and a second valve disposed between the second air entrance and the membrane;

wherein during the operation of the sound producing device, a second airflow corresponding to the air pulse flows into or flows out of the air chamber through the second air entrance, the second airflow passes through the second air entrance substantially along a direction parallel to the first direction, and the second valve is configured to control a path of the second airflow.

20. The sound producing device of claim 19, wherein the air chamber comprises a first sub-chamber and a second sub-chamber separated by the membrane, the first valve is connected to the first sub-chamber, the second sub-chamber and the first air entrance, the second valve is connected to the first sub-chamber, the second sub-chamber and the second air entrance, when the first valve makes an air path between the first air entrance and the first sub-chamber be an open state and makes an air path between the first air entrance and the second sub-chamber be a closed state, the second valve makes an air path between the second air entrance and the first sub-chamber be a closed state and makes an air path between the second air entrance and the second sub-chamber be an open state, and when the first valve makes the air path between the first air entrance and the first sub-chamber be a closed state and makes the air path between the first air entrance and the second sub-chamber be an open state, the second valve makes the air path between the second air entrance and the first sub-chamber be an open state and makes the air path between the second air entrance and the second sub-chamber be a closed state.

21. The sound producing device of claim 19, wherein when the first airflow flows into the air chamber through the first air entrance, the second airflow flows out of the air chamber through the second air entrance, and when the first airflow flows out of the air chamber through the first air entrance, the second airflow flows into the air chamber through the second air entrance.

22. The sound producing device of claim 19, wherein the air pulse generating element further comprises:

a third valve disposed between the first air entrance and the membrane and configured to control the path of the first airflow; and a fourth valve disposed between the second air entrance and the membrane and configured to control the path of the second airflow;

wherein the air chamber comprises a first sub-chamber and a second sub-chamber separated by the membrane, the first valve is connected to the first sub-chamber and the first air entrance, the second valve is connected to the first sub-chamber and the second air entrance, the third valve is connected to the second sub-chamber and the first air entrance, and the fourth valve is connected to the second sub-chamber and the second air entrance.

23. The sound producing device of claim 1, wherein the sound producing device comprises a plurality of air pulse generating elements, and a sound pressure level is formed of a combination of the air pulses generated by the plurality of air pulse generating elements.

24. The sound producing device of claim 1, wherein the air pulse generating element generates a plurality of air pulses with a pulse rate, and the pulse rate is higher than a maximum human audible frequency.

25. The sound producing device of claim 1, wherein the air pulse within a pulse cycle is a positive pulse, a negative pulse or a null pulse, a flowing direction of the first airflow corresponding to the positive pulse and a flowing direction of the first airflow corresponding to the negative pulse are opposite based on the first air entrance, and the first airflow corresponding to the null pulse has no air mass velocity.

26. The sound producing device of claim 1, wherein the driving signal comprises a PWM-part and an AM-part.

27. The sound producing device of claim 1, wherein the control unit comprises a driving-current generating circuit configured to generate a driving current, and the driving current is generated according to one of time-samples of a sound signal.

28. The sound producing device of claim 27, wherein the driving-current generating circuit further comprises a switching component, a digital to analog converter (DAC) and a mapping component, the digital to analog converter is electrically connected between the switching component and the mapping component.

* * * * *